(12) United States Patent
Mason et al.

(10) Patent No.: US 12,478,837 B2
(45) Date of Patent: *Nov. 25, 2025

(54) METHOD AND SYSTEM FOR MONITORING ACTUAL PATIENT TREATMENT PROGRESS USING SENSOR DATA

(71) Applicant: ROM TECHNOLOGIES, INC., Brookfield, CT (US)

(72) Inventors: Steven Mason, Las Vegas, NV (US); Daniel Posnack, Fort Lauderdale, FL (US); Peter Arn, Roxbury, CT (US); Wendy Para, Las Vegas, NV (US); S. Adam Hacking, Nashua, NH (US); Micheal Mueller, Oil City, PA (US); Joseph Guaneri, Brookfield, CT (US); Jonathan Greene, Denver, CO (US)

(73) Assignee: ROM Technologies, Inc., Brookfield, CT (US)

( * ) Notice: Subject to any disclaimer, the term of this patent is extended or adjusted under 35 U.S.C. 154(b) by 739 days.

This patent is subject to a terminal disclaimer.

(21) Appl. No.: 17/834,545

(22) Filed: Jun. 7, 2022

(65) Prior Publication Data

US 2022/0314075 A1 Oct. 6, 2022

Related U.S. Application Data

(63) Continuation-in-part of application No. 17/739,906, filed on May 9, 2022, and a continuation of
(Continued)

(51) Int. Cl.
*G16H 10/60* (2018.01)
*A63B 21/005* (2006.01)
(Continued)

(52) U.S. Cl.
CPC ...... *A63B 24/0075* (2013.01); *A63B 21/0058* (2013.01); *A63B 24/0062* (2013.01);
(Continued)

(58) Field of Classification Search
CPC .... A63B 2022/0094; A63B 2024/0093; A63B 21/0058; A63B 21/0059; A63B 22/0605;
(Continued)

(56) References Cited

U.S. PATENT DOCUMENTS 823,712 A 6/1906 Uhlmann
4,499,900 A 2/1985 Petrofsky et al.
(Continued)

FOREIGN PATENT DOCUMENTS

CA 3193419 A1 3/2022
CN 2885238 Y 4/2007
(Continued)

OTHER PUBLICATIONS

Barrett et al., "Artificial intelligence supported patient self-care in chronic heart failure: a paradigm shift from reactive to predictive, preventive and personalised care," EPMA Journal (2019), pp. 445-464.
(Continued)

*Primary Examiner* — George Manuel
(74) *Attorney, Agent, or Firm* — Dickinson Wright PLLC; Jonathan H. Harder; Stephen A. Mason

(57) ABSTRACT

A method includes receiving treatment data pertaining to a user capable of using a treatment device to perform a treatment plan and receiving activity data pertaining to the user while the user engages in at least one activity. The method also includes generating treatment information using the treatment data and the activity data and writing to an associated memory, for access by a healthcare professional, the treatment information. The method also includes
(Continued)

modifying at least one aspect of the treatment plan in response to receiving, from the healthcare professional, treatment plan input including at least one modification to the at least one aspect of the treatment plan.

20 Claims, 19 Drawing Sheets

Related U.S. Application Data application No. PCT/US2022/022579, filed on Mar. 30, 2022, said application No. 17/739,906 is a continuation of application No. 17/150,938, filed on Jan. 15, 2021, now Pat. No. 11,325,005, which is a continuation-in-part of application No. 17/021,895, filed on Sep. 15, 2020, now Pat. No. 11,071,597.

(60) Provisional application No. 63/208,372, filed on Jun. 8, 2021, provisional application No. 62/910,232, filed on Oct. 3, 2019.

(51) Int. Cl.
    *A63B 24/00* (2006.01)
    *G06N 20/00* (2019.01)
    *G16H 20/30* (2018.01)
    *A63B 22/00* (2006.01)
    *A63B 22/06* (2006.01)

(52) U.S. Cl.
    CPC .............. *G06N 20/00* (2019.01); *G16H 10/60* (2018.01); *G16H 20/30* (2018.01); *A63B 2022/0094* (2013.01); *A63B 22/0605* (2013.01); *A63B 2024/0093* (2013.01)

(58) Field of Classification Search
    CPC ............ A63B 22/0694; A63B 2220/56; A63B 2230/045; A63B 2230/062; A63B 2230/201; A63B 2230/202; A63B 2230/305; A63B 2230/431; A63B 2230/50; A63B 24/0062; A63B 24/0075; A63B 24/0087; G06N 20/00; G16H 10/60; G16H 20/30; G16H 50/20
    See application file for complete search history.

(56) References Cited

U.S. PATENT DOCUMENTS

| | | |
|---|---|---|
| 4,822,032 A | 4/1989 | Whitmore et al. |
| 4,860,763 A | 8/1989 | Schminke |
| 4,869,497 A | 9/1989 | Stewart et al. |
| 4,932,650 A | 6/1990 | Bingham et al. |
| 5,137,501 A | 8/1992 | Mertesdorf |
| 5,161,430 A | 11/1992 | Febey |
| 5,202,794 A | 4/1993 | Schnee et al. |
| 5,240,417 A | 8/1993 | Smithson et al. |
| 5,247,853 A | 9/1993 | Dalebout |
| 5,256,117 A | 10/1993 | Potts et al. |
| D342,299 S | 12/1993 | Birrell et al. |
| 5,282,748 A | 2/1994 | Little |
| 5,284,131 A | 2/1994 | Gray |
| 5,316,532 A | 5/1994 | Butler |
| 5,318,487 A | 6/1994 | Golen |
| 5,324,241 A | 6/1994 | Artigues et al. |
| 5,336,147 A | 8/1994 | Sweeney, III |
| 5,338,272 A | 8/1994 | Sweeney, III |
| 5,356,356 A | 10/1994 | Hildebrandt |
| 5,361,649 A | 11/1994 | Slocum, Jr. |
| D359,777 S | 6/1995 | Hildebrandt |
| 5,429,140 A | 7/1995 | Burdea et al. |
| 5,458,022 A | 10/1995 | Mattfeld et al. |
| 5,487,713 A | 1/1996 | Butler |
| 5,566,589 A | 10/1996 | Buck |
| 5,580,338 A | 12/1996 | Scelta et al. |
| 5,676,349 A | 10/1997 | Wilson |
| 5,685,804 A | 11/1997 | Whan-Tong et al. |
| 5,738,636 A | 4/1998 | Saringer et al. |
| 5,860,941 A | 1/1999 | Saringer et al. |
| 5,950,813 A | 9/1999 | Hoskins et al. |
| 6,007,459 A | 12/1999 | Burgess |
| D421,075 S | 2/2000 | Hildebrandt |
| 6,053,847 A | 4/2000 | Stearns et al. |
| 6,077,201 A | 6/2000 | Cheng |
| 6,102,834 A | 8/2000 | Chen |
| 6,110,130 A | 8/2000 | Kramer |
| 6,155,958 A | 12/2000 | Goldberg |
| 6,162,189 A | 12/2000 | Girone et al. |
| 6,182,029 B1 | 1/2001 | Friedman |
| D438,580 S | 3/2001 | Shaw |
| 6,253,638 B1 | 7/2001 | Bermudez |
| 6,267,735 B1 | 7/2001 | Blanchard et al. |
| 6,273,863 B1 | 8/2001 | Avni et al. |
| D450,100 S | 11/2001 | Hsu |
| D450,101 S | 11/2001 | Hsu |
| D451,972 S | 12/2001 | Easley |
| D452,285 S | 12/2001 | Easley |
| D454,605 S | 3/2002 | Lee |
| 6,371,891 B1 | 4/2002 | Speas |
| D459,776 S | 7/2002 | Lee |
| 6,413,190 B1 | 7/2002 | Wood et al. |
| 6,430,436 B1 | 8/2002 | Richter |
| 6,436,058 B1 | 8/2002 | Krahner et al. |
| 6,450,923 B1 | 9/2002 | Vatti |
| 6,474,193 B1 | 11/2002 | Farney |
| 6,491,649 B1 | 12/2002 | Ombrellaro |
| 6,514,085 B2 | 2/2003 | Slattery et al. |
| 6,535,861 B1 | 3/2003 | OConnor et al. |
| 6,543,309 B2 | 4/2003 | Heim |
| 6,589,139 B1 | 7/2003 | Butterworth |
| 6,601,016 B1 | 7/2003 | Brown et al. |
| 6,602,191 B2 | 8/2003 | Quy |
| 6,613,000 B1 | 9/2003 | Reinkensmeyer et al. |
| 6,626,800 B1 | 9/2003 | Casler |
| 6,626,805 B1 | 9/2003 | Lightbody |
| 6,640,122 B2 | 10/2003 | Manoli |
| 6,640,662 B1 | 11/2003 | Baxter |
| 6,652,425 B1 | 11/2003 | Martin et al. |
| 6,820,517 B1 | 11/2004 | Farney |
| 6,865,969 B2 | 3/2005 | Stevens |
| 6,890,312 B1 | 5/2005 | Priester et al. |
| 6,895,834 B1 | 5/2005 | Baatz |
| 6,902,513 B1 | 6/2005 | McClure |
| 7,058,453 B2 | 6/2006 | Nelson et al. |
| 7,063,643 B2 | 6/2006 | Arai |
| 7,156,665 B1 | 1/2007 | OConnor et al. |
| 7,156,780 B1 | 1/2007 | Fuchs et al. |
| 7,169,085 B1 | 1/2007 | Killin et al. |
| 7,204,788 B2 | 4/2007 | Andrews |
| 7,209,886 B2 | 4/2007 | Kimmel |
| 7,226,394 B2 | 6/2007 | Johnson |
| RE39,904 E | 10/2007 | Lee |
| 7,406,003 B2 | 7/2008 | Burkhardt et al. |
| 7,507,188 B2 | 3/2009 | Nurre |
| 7,594,879 B2 | 9/2009 | Johnson |
| 7,628,730 B1 | 12/2009 | Watterson et al. |
| D610,635 S | 2/2010 | Hildebrandt |
| 7,778,851 B2 | 8/2010 | Schoenberg et al. |
| 7,809,601 B2 | 10/2010 | Shaya et al. |
| 7,815,551 B2 | 10/2010 | Merli |
| 7,833,135 B2 | 11/2010 | Radow et al. |
| 7,837,472 B1 | 11/2010 | Elsmore et al. |
| 7,890,342 B1 | 2/2011 | Yruko |
| 7,955,219 B2 | 6/2011 | Birrell et al. |
| 7,969,315 B1 | 6/2011 | Ross et al. |
| 7,988,599 B2 | 8/2011 | Ainsworth et al. |
| 8,012,107 B2 | 9/2011 | Einav et al. |
| 8,021,270 B2 | 9/2011 | D'Eredita |
| 8,038,578 B2 | 10/2011 | Olrik et al. |
| 8,079,937 B2 | 12/2011 | Bedell |
| 8,113,991 B2 | 2/2012 | Kutliroff |
| 8,172,724 B2 | 5/2012 | Solomon |

(56) References Cited

U.S. PATENT DOCUMENTS

| | | |
|---|---|---|
| 8,177,732 B2 | 5/2012 | Einav et al. |
| 8,287,434 B2 | 10/2012 | Zavadsky et al. |
| 8,298,123 B2 | 10/2012 | Hickman |
| 8,371,990 B2 | 2/2013 | Shea |
| 8,419,593 B2 | 4/2013 | Ainsworth et al. |
| 8,465,398 B2 | 6/2013 | Lee et al. |
| 8,503,086 B2 | 8/2013 | French |
| 8,506,458 B2 | 8/2013 | Dugan |
| 8,515,777 B1 | 8/2013 | Rajasenan |
| 8,540,515 B2 | 9/2013 | Williams et al. |
| 8,540,516 B2 | 9/2013 | Williams et al. |
| 8,556,778 B1 | 10/2013 | Dugan |
| 8,607,465 B1 | 12/2013 | Edwards |
| 8,613,689 B2 | 12/2013 | Dyer et al. |
| 8,615,529 B2 | 12/2013 | Reiner |
| 8,672,812 B2 | 3/2014 | Dugan |
| 8,751,264 B2 | 6/2014 | Beraja et al. |
| 8,784,273 B2 | 7/2014 | Dugan |
| 8,818,496 B2 | 8/2014 | Dziubinski et al. |
| 8,823,448 B1 | 9/2014 | Shen |
| 8,845,493 B2 | 9/2014 | Watterson et al. |
| 8,849,681 B2 | 9/2014 | Hargrove et al. |
| 8,864,628 B2 | 10/2014 | Boyette et al. |
| 8,893,287 B2 | 11/2014 | Gjonej et al. |
| 8,911,327 B1 | 12/2014 | Boyette |
| 8,979,711 B2 | 3/2015 | Dugan |
| 9,004,598 B2 | 4/2015 | Weber |
| 9,044,630 B1 | 6/2015 | Lampert et al. |
| 9,167,281 B2 | 10/2015 | Petrov et al. |
| D744,050 S | 11/2015 | Colburn |
| 9,248,071 B1 | 2/2016 | Brenda |
| 9,256,711 B2 | 2/2016 | Horseman |
| 9,272,091 B2 | 3/2016 | Skelton |
| 9,272,185 B2 | 3/2016 | Dugan |
| 9,283,434 B1 | 3/2016 | Wu |
| 9,295,878 B2 | 3/2016 | Corbalis et al. |
| 9,311,789 B1 | 4/2016 | Gwin |
| 9,312,907 B2 | 4/2016 | Auchinleck et al. |
| 9,367,668 B2 | 6/2016 | Flynt et al. |
| 9,409,054 B2 | 8/2016 | Dugan |
| 9,443,205 B2 | 9/2016 | Wall |
| 9,474,935 B2 | 10/2016 | Abbondanza et al. |
| 9,480,873 B2 | 11/2016 | Chuang |
| 9,481,428 B2 | 11/2016 | Gros |
| 9,514,277 B2 | 12/2016 | Hassing et al. |
| 9,566,472 B2 | 2/2017 | Dugan |
| 9,579,056 B2 | 2/2017 | Rosenbek et al. |
| 9,629,558 B2 | 4/2017 | Yuen et al. |
| 9,640,057 B1 | 5/2017 | Ross |
| 9,707,147 B2 | 7/2017 | Levital et al. |
| 9,713,744 B2 | 7/2017 | Suzuki |
| D794,142 S | 8/2017 | Zhou |
| 9,717,947 B2 | 8/2017 | Lin |
| 9,737,761 B1 | 8/2017 | Govindarajan |
| 9,757,612 B2 | 9/2017 | Weber |
| 9,773,330 B1 | 9/2017 | Douglas |
| 9,782,621 B2 | 10/2017 | Chiang et al. |
| 9,802,076 B2 | 10/2017 | Murray et al. |
| 9,802,081 B2 | 10/2017 | Ridgel et al. |
| 9,813,239 B2 | 11/2017 | Chee et al. |
| 9,827,445 B2 | 11/2017 | Marcos et al. |
| 9,849,337 B2 | 12/2017 | Roman et al. |
| 9,868,028 B2 | 1/2018 | Shin |
| 9,872,087 B2 | 1/2018 | DelloStritto et al. |
| 9,872,637 B2 | 1/2018 | Kording et al. |
| 9,914,053 B2 | 3/2018 | Dugan |
| 9,919,198 B2 | 3/2018 | Romeo et al. |
| 9,937,382 B2 | 4/2018 | Dugan |
| 9,939,784 B1 | 4/2018 | Berardinelli |
| 9,974,478 B1 | 5/2018 | Brokaw |
| 9,977,587 B2 | 5/2018 | Mountain |
| 9,993,181 B2 | 6/2018 | Ross |
| 9,997,082 B2 | 6/2018 | Kaleal |
| 10,004,946 B2 | 6/2018 | Ross |
| 10,026,052 B2 | 7/2018 | Brown et al. |
| D826,349 S | 8/2018 | Oblamski |
| 10,055,550 B2 | 8/2018 | Goetz |
| 10,058,473 B2 | 8/2018 | Oshima et al. |
| 10,074,148 B2 | 9/2018 | Cashman et al. |
| 10,089,443 B2 | 10/2018 | Miller et al. |
| 10,111,643 B2 | 10/2018 | Shulhauser et al. |
| 10,130,311 B1 | 11/2018 | De Sapio et al. |
| 10,137,328 B2 | 11/2018 | Baudhuin |
| 10,143,395 B2 | 12/2018 | Chakravarthy et al. |
| 10,155,134 B2 | 12/2018 | Dugan |
| 10,159,872 B2 | 12/2018 | Sasaki et al. |
| 10,173,094 B2 | 1/2019 | Gomberg et al. |
| 10,173,095 B2 | 1/2019 | Gomberg et al. |
| 10,173,096 B2 | 1/2019 | Gomberg et al. |
| 10,173,097 B2 | 1/2019 | Gomberg et al. |
| 10,198,928 B1 | 2/2019 | Ross et al. |
| 10,226,663 B2 | 3/2019 | Gomberg et al. |
| 10,231,664 B2 | 3/2019 | Ganesh |
| 10,244,990 B2 | 4/2019 | Hu et al. |
| 10,258,823 B2 | 4/2019 | Cole |
| 10,322,315 B2 | 6/2019 | Foley et al. |
| 10,325,070 B2 | 6/2019 | Beale et al. |
| 10,327,697 B1 | 6/2019 | Stein et al. |
| 10,362,940 B2 | 7/2019 | Tran |
| 10,369,021 B2 | 8/2019 | Zoss et al. |
| 10,380,866 B1 | 8/2019 | Ross et al. |
| 10,413,222 B1 | 9/2019 | Kayyali |
| 10,413,238 B1 | 9/2019 | Cooper |
| 10,424,033 B2 | 9/2019 | Romeo |
| 10,430,552 B2 | 10/2019 | Mihai |
| D866,957 S | 11/2019 | Ross et al. |
| 10,468,131 B2 | 11/2019 | Macoviak et al. |
| 10,475,323 B1 | 11/2019 | Ross |
| 10,475,537 B2 | 11/2019 | Purdie et al. |
| 10,492,977 B2 | 12/2019 | Kapure et al. |
| 10,507,358 B2 | 12/2019 | Kinnunen et al. |
| 10,542,914 B2 | 1/2020 | Forth et al. |
| 10,546,467 B1 | 1/2020 | Luciano, Jr. et al. |
| 10,569,122 B2 | 2/2020 | Johnson |
| 10,572,626 B2 | 2/2020 | Balram |
| 10,576,331 B2 | 3/2020 | Kuo |
| 10,581,896 B2 | 3/2020 | Nachenberg |
| 10,625,114 B2 | 4/2020 | Ercanbrack |
| 10,646,746 B1 | 5/2020 | Gomberg et al. |
| 10,660,534 B2 | 5/2020 | Lee et al. |
| 10,678,890 B2 | 6/2020 | Bitran et al. |
| 10,685,092 B2 | 6/2020 | Paparella et al. |
| 10,741,285 B2 | 8/2020 | Moturu |
| 10,777,200 B2 | 9/2020 | Will et al. |
| D899,605 S | 10/2020 | Ross et al. |
| 10,792,495 B2 | 10/2020 | Izvorski et al. |
| 10,814,170 B2 | 10/2020 | Wang et al. |
| 10,857,426 B1 | 12/2020 | Neumann |
| 10,867,695 B2 | 12/2020 | Neagle |
| 10,874,905 B2 | 12/2020 | Belson et al. |
| D907,143 S | 1/2021 | Ach et al. |
| 10,881,911 B2 | 1/2021 | Kwon et al. |
| 10,918,332 B2 | 2/2021 | Belson et al. |
| 10,931,643 B1 | 2/2021 | Neumann |
| 10,987,176 B2 | 4/2021 | Poltaretskyi et al. |
| 10,991,463 B2 | 4/2021 | Kutzko et al. |
| 11,000,735 B2 | 5/2021 | Orady et al. |
| 11,045,709 B2 | 6/2021 | Putnam |
| 11,065,170 B2 | 7/2021 | Yang et al. |
| 11,065,527 B2 | 7/2021 | Putnam |
| 11,069,436 B2 | 7/2021 | Mason et al. |
| 11,071,597 B2 | 7/2021 | Posnack et al. |
| 11,075,000 B2 | 7/2021 | Mason et al. |
| D928,635 S | 8/2021 | Hacking et al. |
| 11,087,865 B2 | 8/2021 | Mason et al. |
| 11,094,400 B2 | 8/2021 | Riley et al. |
| 11,101,028 B2 | 8/2021 | Mason et al. |
| 11,107,591 B1 | 8/2021 | Mason |
| 11,139,060 B2 | 10/2021 | Mason et al. |
| 11,185,735 B2 | 11/2021 | Arn et al. |
| 11,185,738 B1 | 11/2021 | McKirdy et al. |
| D939,096 S | 12/2021 | Lee |
| D939,644 S | 12/2021 | Ach et al. |
| D940,797 S | 1/2022 | Ach et al. |

(56) References Cited

U.S. PATENT DOCUMENTS

| | | |
|---|---|---|
| D940,891 S | 1/2022 | Lee |
| 11,229,727 B2 | 1/2022 | Tatonetti |
| 11,229,788 B1 | 1/2022 | John |
| 11,265,234 B2 | 3/2022 | Guaneri et al. |
| 11,270,795 B2 | 3/2022 | Mason et al. |
| 11,272,879 B2 | 3/2022 | Wiedenhoefer et al. |
| 11,278,766 B2 | 3/2022 | Lee |
| 11,282,599 B2 | 3/2022 | Mason et al. |
| 11,282,604 B2 | 3/2022 | Mason et al. |
| 11,282,608 B2 | 3/2022 | Mason et al. |
| 11,284,797 B2 | 3/2022 | Mason et al. |
| D948,639 S | 4/2022 | Ach et al. |
| 11,295,848 B2 | 4/2022 | Mason et al. |
| 11,298,284 B2 | 4/2022 | Bayerlein |
| 11,309,085 B2 | 4/2022 | Mason et al. |
| 11,317,975 B2 | 5/2022 | Mason et al. |
| 11,325,005 B2 | 5/2022 | Mason et al. |
| 11,328,807 B2 | 5/2022 | Mason et al. |
| 11,337,648 B2 | 5/2022 | Mason |
| 11,347,829 B1 | 5/2022 | Sclar et al. |
| 11,348,683 B2 | 5/2022 | Guaneri et al. |
| 11,370,328 B2 | 6/2022 | Main |
| 11,376,470 B2 | 7/2022 | Weldemariam |
| 11,404,150 B2 | 8/2022 | Guaneri et al. |
| 11,410,768 B2 | 8/2022 | Mason et al. |
| 11,422,841 B2 | 8/2022 | Jeong |
| 11,437,137 B1 | 9/2022 | Harris |
| 11,495,355 B2 | 11/2022 | McNutt et al. |
| 11,508,258 B2 | 11/2022 | Nakashima et al. |
| 11,508,482 B2 | 11/2022 | Mason et al. |
| 11,515,021 B2 | 11/2022 | Mason |
| 11,515,028 B2 | 11/2022 | Mason |
| 11,524,210 B2 | 12/2022 | Kim et al. |
| 11,527,326 B2 | 12/2022 | McNair et al. |
| 11,532,402 B2 | 12/2022 | Farley et al. |
| 11,534,654 B2 | 12/2022 | Silcock et al. |
| D976,339 S | 1/2023 | Li |
| 11,541,274 B2 | 1/2023 | Hacking |
| 11,553,969 B1 | 1/2023 | Lang et al. |
| 11,621,067 B1 | 4/2023 | Nolan |
| 11,636,944 B2 | 4/2023 | Hanrahan et al. |
| 11,654,327 B2 | 5/2023 | Phillips et al. |
| 11,663,673 B2 | 5/2023 | Pyles |
| 11,673,024 B2 | 6/2023 | Omid-Zohoor |
| 11,701,548 B2 | 7/2023 | Posnack et al. |
| 11,776,676 B2 | 10/2023 | Savolainen |
| 11,944,579 B2 | 4/2024 | Sankai |
| 11,957,960 B2 | 4/2024 | Bissonnette et al. |
| 12,004,871 B1 | 6/2024 | Fazeli |
| 12,057,210 B2 | 8/2024 | Akinola et al. |
| 12,205,704 B2 | 1/2025 | Hosoi et al. |
| 2001/0044573 A1 | 11/2001 | Manoli |
| 2002/0010596 A1 | 1/2002 | Matory |
| 2002/0072452 A1 | 6/2002 | Torkelson |
| 2002/0143279 A1 | 10/2002 | Porter et al. |
| 2002/0160883 A1 | 10/2002 | Dugan |
| 2002/0183599 A1 | 12/2002 | Castellanos |
| 2003/0013072 A1 | 1/2003 | Thomas |
| 2003/0036683 A1 | 2/2003 | Kehr et al. |
| 2003/0064860 A1 | 4/2003 | Yamashita et al. |
| 2003/0064863 A1 | 4/2003 | Chen |
| 2003/0083596 A1 | 5/2003 | Kramer et al. |
| 2003/0092536 A1 | 5/2003 | Romanelli et al. |
| 2003/0181832 A1 | 9/2003 | Carnahan et al. |
| 2004/0072652 A1 | 4/2004 | Alessandri et al. |
| 2004/0102931 A1 | 5/2004 | Ellis et al. |
| 2004/0106502 A1 | 6/2004 | Sher |
| 2004/0147969 A1 | 7/2004 | Mann et al. |
| 2004/0172093 A1 | 9/2004 | Rummerfield |
| 2004/0194572 A1 | 10/2004 | Kim |
| 2004/0197727 A1 | 10/2004 | Sachdeva et al. |
| 2004/0204959 A1 | 10/2004 | Moreano et al. |
| 2005/0015118 A1 | 1/2005 | Davis et al. |
| 2005/0020411 A1 | 1/2005 | Andrews |
| 2005/0043153 A1 | 2/2005 | Krietzman |
| 2005/0049122 A1 | 3/2005 | Vallone et al. |
| 2005/0085346 A1 | 4/2005 | Johnson |
| 2005/0085353 A1 | 4/2005 | Johnson |
| 2005/0115561 A1 | 6/2005 | Stahmann |
| 2005/0143641 A1 | 6/2005 | Tashiro |
| 2005/0274220 A1 | 12/2005 | Reboullet |
| 2006/0003871 A1 | 1/2006 | Houghton et al. |
| 2006/0046905 A1 | 3/2006 | Doody, Jr. et al. |
| 2006/0058648 A1 | 3/2006 | Meier |
| 2006/0064136 A1 | 3/2006 | Wang |
| 2006/0064329 A1 | 3/2006 | Abolfathi et al. |
| 2006/0129432 A1 | 6/2006 | Choi et al. |
| 2006/0199700 A1 | 9/2006 | LaStayo et al. |
| 2006/0247095 A1 | 11/2006 | Rummerfield |
| 2006/0277074 A1 | 12/2006 | Einav |
| 2007/0042868 A1 | 2/2007 | Fisher et al. |
| 2007/0118389 A1 | 5/2007 | Shipon |
| 2007/0118406 A1 | 5/2007 | Killin et al. |
| 2007/0137307 A1 | 6/2007 | Gruben et al. |
| 2007/0173392 A1 | 7/2007 | Stanford |
| 2007/0184414 A1 | 8/2007 | Perez |
| 2007/0194939 A1 | 8/2007 | Alvarez et al. |
| 2007/0219059 A1 | 9/2007 | Schwartz |
| 2007/0271065 A1 | 11/2007 | Gupta et al. |
| 2007/0287597 A1 | 12/2007 | Cameron |
| 2008/0021834 A1 | 1/2008 | Holla et al. |
| 2008/0077619 A1 | 3/2008 | Gilley et al. |
| 2008/0082356 A1 | 4/2008 | Friedlander et al. |
| 2008/0096726 A1 | 4/2008 | Riley et al. |
| 2008/0153592 A1 | 6/2008 | James-Herbert |
| 2008/0161166 A1 | 7/2008 | Lo |
| 2008/0161733 A1 | 7/2008 | Einav et al. |
| 2008/0183500 A1 | 7/2008 | Banigan |
| 2008/0281633 A1 | 11/2008 | Burdea et al. |
| 2008/0300914 A1 | 12/2008 | Karkanias et al. |
| 2008/0312040 A1 | 12/2008 | Ochi |
| 2009/0011907 A1 | 1/2009 | Radow et al. |
| 2009/0037334 A1 | 2/2009 | Hsu |
| 2009/0058635 A1 | 3/2009 | LaLonde et al. |
| 2009/0070138 A1 | 3/2009 | Langheier et al. |
| 2009/0157617 A1 | 6/2009 | Herlocker |
| 2009/0211395 A1 | 8/2009 | Mule |
| 2009/0270227 A1 | 10/2009 | Ashby et al. |
| 2009/0287503 A1 | 11/2009 | Angell et al. |
| 2009/0299766 A1 | 12/2009 | Friedlander et al. |
| 2010/0048358 A1 | 2/2010 | Tchao et al. |
| 2010/0062818 A1 | 3/2010 | Haughay, Jr. |
| 2010/0076786 A1 | 3/2010 | Dalton et al. |
| 2010/0121160 A1 | 5/2010 | Stark et al. |
| 2010/0173747 A1 | 7/2010 | Chen et al. |
| 2010/0216168 A1 | 8/2010 | Heinzman et al. |
| 2010/0234184 A1 | 9/2010 | Le Page et al. |
| 2010/0248899 A1 | 9/2010 | Bedell et al. |
| 2010/0248905 A1 | 9/2010 | Lu |
| 2010/0262052 A1 | 10/2010 | Lunau et al. |
| 2010/0268304 A1 | 10/2010 | Matos |
| 2010/0293003 A1 | 11/2010 | Abbo |
| 2010/0298102 A1 | 11/2010 | Bosecker et al. |
| 2010/0326207 A1 | 12/2010 | Topel |
| 2010/0332583 A1 | 12/2010 | Szabo |
| 2011/0010188 A1 | 1/2011 | Yoshikawa et al. |
| 2011/0047108 A1 | 2/2011 | Chakrabarty et al. |
| 2011/0082007 A1 | 4/2011 | Birrell |
| 2011/0087137 A1 | 4/2011 | Hanoun |
| 2011/0119212 A1 | 5/2011 | De Bruin et al. |
| 2011/0172059 A1 | 7/2011 | Watterson et al. |
| 2011/0195819 A1 | 8/2011 | Shaw et al. |
| 2011/0218462 A1 | 9/2011 | Smith |
| 2011/0218814 A1 | 9/2011 | Coats |
| 2011/0275483 A1 | 11/2011 | Dugan |
| 2011/0281249 A1 | 11/2011 | Gammell et al. |
| 2011/0306846 A1 | 12/2011 | Osorio |
| 2012/0041771 A1 | 2/2012 | Cosentino et al. |
| 2012/0065987 A1 | 3/2012 | Farooq et al. |
| 2012/0116258 A1 | 5/2012 | Lee |
| 2012/0130196 A1 | 5/2012 | Jain et al. |
| 2012/0130197 A1 | 5/2012 | Kugler et al. |
| 2012/0167709 A1 | 7/2012 | Chen et al. |
| 2012/0183939 A1 | 7/2012 | Aragones et al. |

(56) References Cited

U.S. PATENT DOCUMENTS

| | | |
|---|---|---|
| 2012/0190502 A1 | 7/2012 | Paulus et al. |
| 2012/0232438 A1 | 9/2012 | Cataldi et al. |
| 2012/0259648 A1 | 10/2012 | Mallon et al. |
| 2012/0259649 A1 | 10/2012 | Mallon et al. |
| 2012/0278759 A1 | 11/2012 | Curl et al. |
| 2012/0295240 A1 | 11/2012 | Walker et al. |
| 2012/0296455 A1 | 11/2012 | Ohnemus et al. |
| 2012/0310667 A1 | 12/2012 | Altman et al. |
| 2013/0066647 A1 | 3/2013 | Andrie |
| 2013/0083054 A1 | 4/2013 | Bayouk |
| 2013/0108594 A1 | 5/2013 | Martin-Rendon et al. |
| 2013/0110545 A1 | 5/2013 | Smallwood |
| 2013/0123071 A1 | 5/2013 | Rhea |
| 2013/0123667 A1 | 5/2013 | Komatireddy et al. |
| 2013/0137550 A1 | 5/2013 | Skinner et al. |
| 2013/0137552 A1 | 5/2013 | Kemp et al. |
| 2013/0158368 A1 | 6/2013 | Pacione |
| 2013/0165195 A1 | 6/2013 | Watterson |
| 2013/0178334 A1 | 7/2013 | Brammer |
| 2013/0211281 A1 | 8/2013 | Ross et al. |
| 2013/0253943 A1 | 9/2013 | Lee et al. |
| 2013/0274069 A1 | 10/2013 | Watterson et al. |
| 2013/0296987 A1 | 11/2013 | Rogers et al. |
| 2013/0318027 A1 | 11/2013 | Almogy et al. |
| 2013/0332616 A1 | 12/2013 | Landwehr |
| 2013/0345025 A1 | 12/2013 | van der Merwe |
| 2014/0006042 A1 | 1/2014 | Keefe et al. |
| 2014/0011640 A1 | 1/2014 | Dugan |
| 2014/0031174 A1 | 1/2014 | Huang |
| 2014/0062900 A1 | 3/2014 | Kaula et al. |
| 2014/0074179 A1 | 3/2014 | Heldman et al. |
| 2014/0089836 A1 | 3/2014 | Damani et al. |
| 2014/0108035 A1 | 4/2014 | Akbay |
| 2014/0113261 A1 | 4/2014 | Akiba |
| 2014/0113768 A1 | 4/2014 | Lin et al. |
| 2014/0135173 A1 | 5/2014 | Watterson |
| 2014/0155129 A1 | 6/2014 | Dugan |
| 2014/0163439 A1 | 6/2014 | Uryash et al. |
| 2014/0172442 A1 | 6/2014 | Broderick |
| 2014/0172460 A1 | 6/2014 | Kohli |
| 2014/0172514 A1 | 6/2014 | Schumann et al. |
| 2014/0188009 A1 | 7/2014 | Lange et al. |
| 2014/0194250 A1 | 7/2014 | Reich et al. |
| 2014/0194251 A1 | 7/2014 | Reich et al. |
| 2014/0200414 A1 | 7/2014 | Osorio |
| 2014/0207264 A1 | 7/2014 | Quy |
| 2014/0207486 A1 | 7/2014 | Carty et al. |
| 2014/0228649 A1 | 8/2014 | Rayner et al. |
| 2014/0246499 A1 | 9/2014 | Proud et al. |
| 2014/0256511 A1 | 9/2014 | Smith |
| 2014/0257837 A1 | 9/2014 | Walker et al. |
| 2014/0274565 A1 | 9/2014 | Boyette et al. |
| 2014/0274622 A1 | 9/2014 | Leonhard |
| 2014/0275816 A1 | 9/2014 | Sandmore |
| 2014/0303540 A1 | 10/2014 | Baym |
| 2014/0309083 A1 | 10/2014 | Dugan |
| 2014/0322686 A1 | 10/2014 | Kang |
| 2014/0347265 A1 | 11/2014 | Aimone et al. |
| 2014/0371816 A1 | 12/2014 | Matos |
| 2014/0372133 A1 | 12/2014 | Austrum et al. |
| 2015/0025816 A1 | 1/2015 | Ross |
| 2015/0045700 A1 | 2/2015 | Cavanagh et al. |
| 2015/0046192 A1 | 2/2015 | Raduchel |
| 2015/0051721 A1 | 2/2015 | Cheng |
| 2015/0065213 A1 | 3/2015 | Dugan |
| 2015/0073814 A1 | 3/2015 | Linebaugh |
| 2015/0088544 A1 | 3/2015 | Goldberg |
| 2015/0094192 A1 | 4/2015 | Skwortsow et al. |
| 2015/0099458 A1 | 4/2015 | Weisner et al. |
| 2015/0099952 A1 | 4/2015 | Lain et al. |
| 2015/0111644 A1 | 4/2015 | Larson |
| 2015/0112230 A1 | 4/2015 | Iglesias |
| 2015/0112702 A1 | 4/2015 | Joao et al. |
| 2015/0130830 A1 | 5/2015 | Nagasaki |
| 2015/0141200 A1 | 5/2015 | Murray et al. |
| 2015/0142142 A1 | 5/2015 | Aguilera et al. |
| 2015/0149217 A1 | 5/2015 | Kaburagi |
| 2015/0151162 A1 | 6/2015 | Dugan |
| 2015/0157938 A1 | 6/2015 | Domansky et al. |
| 2015/0161331 A1 | 6/2015 | Oleynik |
| 2015/0161876 A1 | 6/2015 | Castillo |
| 2015/0174446 A1 | 6/2015 | Chiang |
| 2015/0196804 A1 | 7/2015 | Koduri |
| 2015/0196805 A1 | 7/2015 | Koduri |
| 2015/0199494 A1 | 7/2015 | Koduri |
| 2015/0217056 A1 | 8/2015 | Kadavy et al. |
| 2015/0251074 A1 | 9/2015 | Ahmed et al. |
| 2015/0257679 A1 | 9/2015 | Ross |
| 2015/0265209 A1 | 9/2015 | Zhang |
| 2015/0290061 A1 | 10/2015 | Stafford et al. |
| 2015/0331997 A1 | 11/2015 | Joao |
| 2015/0335950 A1 | 11/2015 | Eder |
| 2015/0335951 A1 | 11/2015 | Eder |
| 2015/0339442 A1 | 11/2015 | Oleynik |
| 2015/0341812 A1 | 11/2015 | Dion et al. |
| 2015/0351664 A1 | 12/2015 | Ross |
| 2015/0351665 A1 | 12/2015 | Ross |
| 2015/0360069 A1 | 12/2015 | Marti et al. |
| 2015/0379232 A1 | 12/2015 | Mainwaring et al. |
| 2015/0379430 A1 | 12/2015 | Dirac et al. |
| 2016/0004820 A1 | 1/2016 | Moore |
| 2016/0007885 A1 | 1/2016 | Basta |
| 2016/0015995 A1 | 1/2016 | Leung et al. |
| 2016/0023081 A1 | 1/2016 | Popa-Simil et al. |
| 2016/0045170 A1 | 2/2016 | Migita |
| 2016/0081594 A1 | 3/2016 | Gaddipati |
| 2016/0086500 A1 | 3/2016 | Kaleal, III |
| 2016/0096073 A1 | 4/2016 | Rahman et al. |
| 2016/0117471 A1 | 4/2016 | Belt et al. |
| 2016/0132643 A1 | 5/2016 | Radhakrishna et al. |
| 2016/0140319 A1 | 5/2016 | Stark |
| 2016/0143593 A1 | 5/2016 | Fu et al. |
| 2016/0151670 A1 | 6/2016 | Dugan |
| 2016/0158534 A1 | 6/2016 | Guarraia et al. |
| 2016/0166833 A1 | 6/2016 | Bum |
| 2016/0166881 A1 | 6/2016 | Ridgel et al. |
| 2016/0193306 A1 | 7/2016 | Rabovsky et al. |
| 2016/0197918 A1 | 7/2016 | Turgeman et al. |
| 2016/0213924 A1 | 7/2016 | Coleman |
| 2016/0250519 A1 | 9/2016 | Watterson |
| 2016/0275259 A1 | 9/2016 | Nolan et al. |
| 2016/0287166 A1 | 10/2016 | Tran |
| 2016/0302666 A1 | 10/2016 | Shaya |
| 2016/0302721 A1 | 10/2016 | Wiedenhoefer et al. |
| 2016/0317869 A1 | 11/2016 | Dugan |
| 2016/0322078 A1 | 11/2016 | Bose et al. |
| 2016/0325140 A1 | 11/2016 | Wu |
| 2016/0332028 A1 | 11/2016 | Melnik |
| 2016/0345841 A1 | 12/2016 | Jang et al. |
| 2016/0354636 A1 | 12/2016 | Jang |
| 2016/0361025 A1 | 12/2016 | Reicher et al. |
| 2016/0361597 A1 | 12/2016 | Cole et al. |
| 2016/0373477 A1 | 12/2016 | Moyle |
| 2017/0004260 A1 | 1/2017 | Moturu et al. |
| 2017/0011179 A1 | 1/2017 | Arshad et al. |
| 2017/0032092 A1 | 2/2017 | Mink et al. |
| 2017/0033375 A1 | 2/2017 | Ohmori et al. |
| 2017/0042467 A1 | 2/2017 | Herr et al. |
| 2017/0046488 A1 | 2/2017 | Pereira |
| 2017/0065851 A1 | 3/2017 | Deluca et al. |
| 2017/0069223 A1 | 3/2017 | Cramer et al. |
| 2017/0080320 A1 | 3/2017 | Smith |
| 2017/0091422 A1 | 3/2017 | Kumar et al. |
| 2017/0095670 A1 | 4/2017 | Ghaffari et al. |
| 2017/0095692 A1 | 4/2017 | Chang et al. |
| 2017/0095693 A1 | 4/2017 | Chang et al. |
| 2017/0100637 A1 | 4/2017 | Princen et al. |
| 2017/0106242 A1 | 4/2017 | Dugan |
| 2017/0113092 A1 | 4/2017 | Johnson |
| 2017/0128769 A1 | 5/2017 | Long et al. |
| 2017/0132947 A1 | 5/2017 | Maeda et al. |
| 2017/0136296 A1 | 5/2017 | Barrera et al. |
| 2017/0136298 A1 | 5/2017 | Bae |
| 2017/0143261 A1 | 5/2017 | Wiedenhoefer et al. |

(56) References Cited

U.S. PATENT DOCUMENTS

| | | |
|---|---|---|
| 2017/0147752 A1 | 5/2017 | Toru |
| 2017/0147789 A1 | 5/2017 | Wiedenhoefer et al. |
| 2017/0148297 A1 | 5/2017 | Ross |
| 2017/0168555 A1 | 6/2017 | Munoz et al. |
| 2017/0169177 A1 | 6/2017 | Beale |
| 2017/0173391 A1 | 6/2017 | Wiebe |
| 2017/0181698 A1 | 6/2017 | Wiedenhoefer et al. |
| 2017/0190052 A1 | 7/2017 | Jaekel et al. |
| 2017/0202724 A1 | 7/2017 | De Rossi |
| 2017/0209766 A1 | 7/2017 | Riley et al. |
| 2017/0220751 A1 | 8/2017 | Davis |
| 2017/0228517 A1 | 8/2017 | Saliman et al. |
| 2017/0235882 A1 | 8/2017 | Orlov et al. |
| 2017/0235906 A1 | 8/2017 | Dorris et al. |
| 2017/0243028 A1 | 8/2017 | LaFever et al. |
| 2017/0258370 A1 | 9/2017 | Plotnik-Peleg et al. |
| 2017/0262604 A1 | 9/2017 | Francois |
| 2017/0265800 A1 | 9/2017 | Auchinleck et al. |
| 2017/0266501 A1 | 9/2017 | Sanders et al. |
| 2017/0270260 A1 | 9/2017 | Shetty |
| 2017/0278209 A1 | 9/2017 | Olsen et al. |
| 2017/0282015 A1 | 10/2017 | Wicks et al. |
| 2017/0283508 A1 | 10/2017 | Demopulos et al. |
| 2017/0286621 A1 | 10/2017 | Cox |
| 2017/0296861 A1 | 10/2017 | Burkinshaw |
| 2017/0300654 A1 | 10/2017 | Stein et al. |
| 2017/0304024 A1 | 10/2017 | Nobrega |
| 2017/0312614 A1 | 11/2017 | Tran et al. |
| 2017/0323481 A1 | 11/2017 | Tran et al. |
| 2017/0329917 A1 | 11/2017 | McRaith et al. |
| 2017/0329933 A1 | 11/2017 | Brust |
| 2017/0333755 A1 | 11/2017 | Rider |
| 2017/0337033 A1 | 11/2017 | Duyan et al. |
| 2017/0337334 A1 | 11/2017 | Stanczak |
| 2017/0344726 A1 | 11/2017 | Duffy et al. |
| 2017/0347923 A1 | 12/2017 | Roh |
| 2017/0352157 A1 | 12/2017 | Madabhushi |
| 2017/0360586 A1 | 12/2017 | Dempers et al. |
| 2017/0361165 A1 | 12/2017 | Miller et al. |
| 2017/0367606 A1 | 12/2017 | Lee |
| 2017/0368413 A1 | 12/2017 | Shavit |
| 2018/0017806 A1 | 1/2018 | Wang et al. |
| 2018/0036591 A1 | 2/2018 | King et al. |
| 2018/0036593 A1 | 2/2018 | Ridgel et al. |
| 2018/0052962 A1 | 2/2018 | Van Der Koijk et al. |
| 2018/0052968 A1 | 2/2018 | Hickle et al. |
| 2018/0056104 A1 | 3/2018 | Cromie et al. |
| 2018/0056130 A1 | 3/2018 | Bitran et al. |
| 2018/0060494 A1 | 3/2018 | Dias et al. |
| 2018/0070864 A1 | 3/2018 | Schuster |
| 2018/0071565 A1 | 3/2018 | Gomberg et al. |
| 2018/0071566 A1 | 3/2018 | Gomberg et al. |
| 2018/0071569 A1 | 3/2018 | Gomberg et al. |
| 2018/0071570 A1 | 3/2018 | Gomberg et al. |
| 2018/0071571 A1 | 3/2018 | Gomberg et al. |
| 2018/0071572 A1 | 3/2018 | Gomberg et al. |
| 2018/0075205 A1 | 3/2018 | Moturu et al. |
| 2018/0078182 A1 | 3/2018 | Chen |
| 2018/0078843 A1 | 3/2018 | Tran et al. |
| 2018/0085615 A1 | 3/2018 | Astolfi et al. |
| 2018/0089385 A1 | 3/2018 | Gupta |
| 2018/0096111 A1 | 4/2018 | Wells et al. |
| 2018/0099178 A1 | 4/2018 | Schaefer et al. |
| 2018/0102190 A1 | 4/2018 | Hogue et al. |
| 2018/0103859 A1 | 4/2018 | Provenzano |
| 2018/0113985 A1 | 4/2018 | Gandy et al. |
| 2018/0116741 A1 | 5/2018 | Garcia Kilroy et al. |
| 2018/0117417 A1 | 5/2018 | Davis |
| 2018/0130555 A1 | 5/2018 | Chronis et al. |
| 2018/0133551 A1 | 5/2018 | Chang |
| 2018/0140927 A1 | 5/2018 | Kito |
| 2018/0146870 A1 | 5/2018 | Shemesh |
| 2018/0177612 A1 | 6/2018 | Trabish et al. |
| 2018/0178061 A1 | 6/2018 | O'larte et al. |
| 2018/0199855 A1 | 7/2018 | Odame et al. |
| 2018/0200577 A1 | 7/2018 | Dugan |
| 2018/0220935 A1 | 8/2018 | Tadano et al. |
| 2018/0228682 A1 | 8/2018 | Bayerlein et al. |
| 2018/0232492 A1 | 8/2018 | Al-Alul et al. |
| 2018/0236307 A1 | 8/2018 | Hyde et al. |
| 2018/0240552 A1 | 8/2018 | Tuyl et al. |
| 2018/0253991 A1 | 9/2018 | Tang et al. |
| 2018/0255110 A1 | 9/2018 | Dowlatkhah et al. |
| 2018/0256079 A1 | 9/2018 | Yang et al. |
| 2018/0263530 A1 | 9/2018 | Jung |
| 2018/0263535 A1 | 9/2018 | Cramer |
| 2018/0263552 A1 | 9/2018 | Graman et al. |
| 2018/0264312 A1 | 9/2018 | Pompile et al. |
| 2018/0271432 A1 | 9/2018 | Auchinleck et al. |
| 2018/0272184 A1 | 9/2018 | Vassilaros et al. |
| 2018/0280784 A1 | 10/2018 | Romeo et al. |
| 2018/0290017 A1 | 10/2018 | Fung |
| 2018/0296143 A1 | 10/2018 | Anderson et al. |
| 2018/0296157 A1 | 10/2018 | Bleich et al. |
| 2018/0318122 A1 | 11/2018 | LeCursi et al. |
| 2018/0326243 A1 | 11/2018 | Badi et al. |
| 2018/0330058 A1 | 11/2018 | Bates |
| 2018/0330810 A1 | 11/2018 | Gamarnik |
| 2018/0330824 A1 | 11/2018 | Athey et al. |
| 2018/0353812 A1 | 12/2018 | Lannon et al. |
| 2018/0360340 A1 | 12/2018 | Rehse et al. |
| 2018/0366225 A1 | 12/2018 | Mansi et al. |
| 2018/0373844 A1 | 12/2018 | Ferrandez-Escamez et al. |
| 2019/0005195 A1 | 1/2019 | Peterson |
| 2019/0009135 A1 | 1/2019 | Wu |
| 2019/0019163 A1 | 1/2019 | Batey et al. |
| 2019/0019573 A1 | 1/2019 | Lake et al. |
| 2019/0019578 A1 | 1/2019 | Vaccaro |
| 2019/0030415 A1 | 1/2019 | Volpe, Jr. |
| 2019/0031284 A1 | 1/2019 | Fuchs |
| 2019/0046794 A1 | 2/2019 | Goodall et al. |
| 2019/0060708 A1 | 2/2019 | Fung |
| 2019/0065970 A1 | 2/2019 | Bonutti et al. |
| 2019/0066832 A1 | 2/2019 | Kang et al. |
| 2019/0076701 A1 | 3/2019 | Dugan |
| 2019/0080802 A1 | 3/2019 | Ziobro et al. |
| 2019/0083846 A1 | 3/2019 | Eder |
| 2019/0088356 A1 | 3/2019 | Oliver et al. |
| 2019/0090744 A1 | 3/2019 | Mahfouz |
| 2019/0096534 A1 | 3/2019 | Joao |
| 2019/0105551 A1 | 4/2019 | Ray |
| 2019/0108912 A1 | 4/2019 | Spurlock, III |
| 2019/0111299 A1 | 4/2019 | Radcliffe et al. |
| 2019/0115097 A1 | 4/2019 | Macoviak et al. |
| 2019/0117156 A1 | 4/2019 | Howard et al. |
| 2019/0118038 A1 | 4/2019 | Tana et al. |
| 2019/0118066 A1 | 4/2019 | Cardona |
| 2019/0126099 A1 | 5/2019 | Hoang |
| 2019/0132948 A1 | 5/2019 | Longinotti-Buitoni et al. |
| 2019/0134454 A1 | 5/2019 | Mahoney et al. |
| 2019/0137988 A1 | 5/2019 | Cella et al. |
| 2019/0143191 A1 | 5/2019 | Ran et al. |
| 2019/0143193 A1 | 5/2019 | Kim |
| 2019/0145774 A1 | 5/2019 | Ellis |
| 2019/0163876 A1 | 5/2019 | Remme et al. |
| 2019/0167988 A1 | 6/2019 | Shahriari et al. |
| 2019/0172587 A1 | 6/2019 | Park et al. |
| 2019/0175988 A1 | 6/2019 | Volterrani et al. |
| 2019/0183715 A1 | 6/2019 | Kapure et al. |
| 2019/0200920 A1 | 7/2019 | Tien et al. |
| 2019/0206562 A1* | 7/2019 | Shelton, IV ......... H04N 23/555 |
| 2019/0209891 A1 | 7/2019 | Fung |
| 2019/0214119 A1 | 7/2019 | Wachira et al. |
| 2019/0223797 A1 | 7/2019 | Tran |
| 2019/0224528 A1 | 7/2019 | Omid-Zohoor et al. |
| 2019/0228856 A1 | 7/2019 | Leifer |
| 2019/0232108 A1 | 8/2019 | Kovach et al. |
| 2019/0240103 A1 | 8/2019 | Hepler et al. |
| 2019/0240541 A1 | 8/2019 | Denton et al. |
| 2019/0244540 A1 | 8/2019 | Errante et al. |
| 2019/0247718 A1 | 8/2019 | Blevins |
| 2019/0251456 A1 | 8/2019 | Constantin |
| 2019/0261959 A1 | 8/2019 | Frankel |
| 2019/0262084 A1 | 8/2019 | Roh |

(56) References Cited

U.S. PATENT DOCUMENTS

| | | |
|---|---|---|
| 2019/0269343 A1 | 9/2019 | Ramos Murguialday et al. |
| 2019/0274523 A1 | 9/2019 | Bates et al. |
| 2019/0275368 A1 | 9/2019 | Maroldi |
| 2019/0283247 A1 | 9/2019 | Chang |
| 2019/0304584 A1 | 10/2019 | Savolainen |
| 2019/0307983 A1 | 10/2019 | Goldman |
| 2019/0314681 A1 | 10/2019 | Yang |
| 2019/0344123 A1 | 11/2019 | Rubin et al. |
| 2019/0354632 A1 | 11/2019 | Mital et al. |
| 2019/0362242 A1 | 11/2019 | Pillai et al. |
| 2019/0366146 A1 | 12/2019 | Tong et al. |
| 2019/0371472 A1 | 12/2019 | Blanchard |
| 2019/0385199 A1 | 12/2019 | Bender et al. |
| 2019/0388728 A1 | 12/2019 | Wang et al. |
| 2019/0392936 A1 | 12/2019 | Arric et al. |
| 2019/0392939 A1 | 12/2019 | Basta et al. |
| 2020/0005928 A1 | 1/2020 | Daniel |
| 2020/0015736 A1 | 1/2020 | Alhathal |
| 2020/0034665 A1 | 1/2020 | Ghanta |
| 2020/0034707 A1 | 1/2020 | Kivatinos et al. |
| 2020/0038703 A1 | 2/2020 | Cleary et al. |
| 2020/0051446 A1 | 2/2020 | Rubinstein |
| 2020/0054922 A1 | 2/2020 | Azaria |
| 2020/0066390 A1 | 2/2020 | Svendrys et al. |
| 2020/0085300 A1 | 3/2020 | Kwatra et al. |
| 2020/0090802 A1 | 3/2020 | Maron |
| 2020/0093418 A1 | 3/2020 | Kluger et al. |
| 2020/0121987 A1 | 4/2020 | Loh |
| 2020/0129808 A1 | 4/2020 | Fomin |
| 2020/0139194 A1 | 5/2020 | Min |
| 2020/0143922 A1 | 5/2020 | Chekroud et al. |
| 2020/0151595 A1 | 5/2020 | Jayalath et al. |
| 2020/0151646 A1 | 5/2020 | De La Fuente Sanchez |
| 2020/0152339 A1 | 5/2020 | Pulitzer et al. |
| 2020/0160198 A1 | 5/2020 | Reeves et al. |
| 2020/0170876 A1 | 6/2020 | Kapure et al. |
| 2020/0176098 A1 | 6/2020 | Lucas et al. |
| 2020/0188774 A1 | 6/2020 | Fung |
| 2020/0197744 A1 | 6/2020 | Schweighofer |
| 2020/0221975 A1 | 7/2020 | Basta et al. |
| 2020/0237291 A1 | 7/2020 | Raja |
| 2020/0237452 A1 | 7/2020 | Wolf et al. |
| 2020/0261763 A1 | 8/2020 | Park |
| 2020/0267487 A1 | 8/2020 | Siva |
| 2020/0275886 A1 | 9/2020 | Mason |
| 2020/0289045 A1 | 9/2020 | Hacking et al. |
| 2020/0289046 A1 | 9/2020 | Hacking et al. |
| 2020/0289879 A1 | 9/2020 | Hacking et al. |
| 2020/0289880 A1 | 9/2020 | Hacking et al. |
| 2020/0289881 A1 | 9/2020 | Hacking et al. |
| 2020/0289889 A1 | 9/2020 | Hacking et al. |
| 2020/0293712 A1 | 9/2020 | Potts et al. |
| 2020/0303063 A1 | 9/2020 | Sharma et al. |
| 2020/0312447 A1 | 10/2020 | Bohn et al. |
| 2020/0320454 A1 | 10/2020 | Almashor |
| 2020/0334972 A1 | 10/2020 | Gopalakrishnan |
| 2020/0346072 A1 | 11/2020 | Shah |
| 2020/0353314 A1 | 11/2020 | Messinger |
| 2020/0357299 A1 | 11/2020 | Patel et al. |
| 2020/0365256 A1 | 11/2020 | Hayashitani et al. |
| 2020/0391080 A1 | 12/2020 | Powers |
| 2020/0395112 A1 | 12/2020 | Ronner |
| 2020/0398083 A1 | 12/2020 | Adelsheim |
| 2020/0401224 A1 | 12/2020 | Cotton |
| 2020/0402662 A1 | 12/2020 | Esmailian et al. |
| 2020/0410374 A1 | 12/2020 | White |
| 2020/0410385 A1 | 12/2020 | Otsuki |
| 2020/0411162 A1 | 12/2020 | Lien et al. |
| 2020/0411170 A1 | 12/2020 | Brown |
| 2021/0005224 A1 | 1/2021 | Rothschild et al. |
| 2021/0005319 A1 | 1/2021 | Otsuki et al. |
| 2021/0008413 A1 | 1/2021 | Asikainen et al. |
| 2021/0015560 A1 | 1/2021 | Boddington et al. |
| 2021/0027889 A1 | 1/2021 | Neil et al. |
| 2021/0035674 A1 | 2/2021 | Volosin et al. |
| 2021/0050086 A1 | 2/2021 | Rose et al. |
| 2021/0065855 A1 | 3/2021 | Pepin et al. |
| 2021/0074178 A1 | 3/2021 | Ilan et al. |
| 2021/0076981 A1 | 3/2021 | Hacking et al. |
| 2021/0077860 A1 | 3/2021 | Posnack et al. |
| 2021/0077884 A1 | 3/2021 | De Las Casas Zolezzi et al. |
| 2021/0082554 A1 | 3/2021 | Kalia et al. |
| 2021/0093891 A1 | 4/2021 | Sheng |
| 2021/0098099 A1 | 4/2021 | Neumann |
| 2021/0098129 A1 | 4/2021 | Neumann |
| 2021/0101051 A1 | 4/2021 | Posnack et al. |
| 2021/0113890 A1 | 4/2021 | Posnack et al. |
| 2021/0125696 A1 | 4/2021 | Liu et al. |
| 2021/0127974 A1 | 5/2021 | Mason et al. |
| 2021/0128080 A1 | 5/2021 | Mason et al. |
| 2021/0128255 A1 | 5/2021 | Mason et al. |
| 2021/0128978 A1 | 5/2021 | Gilstrom et al. |
| 2021/0134412 A1 | 5/2021 | Guaneri et al. |
| 2021/0134425 A1 | 5/2021 | Mason et al. |
| 2021/0134428 A1 | 5/2021 | Mason |
| 2021/0134429 A1 | 5/2021 | Mason |
| 2021/0134430 A1 | 5/2021 | Mason et al. |
| 2021/0134432 A1 | 5/2021 | Mason et al. |
| 2021/0134456 A1 | 5/2021 | Posnack et al. |
| 2021/0134457 A1 | 5/2021 | Mason et al. |
| 2021/0134458 A1 | 5/2021 | Mason et al. |
| 2021/0134463 A1 | 5/2021 | Mason et al. |
| 2021/0138304 A1 | 5/2021 | Mason et al. |
| 2021/0142875 A1 | 5/2021 | Mason et al. |
| 2021/0142893 A1 | 5/2021 | Guaneri et al. |
| 2021/0142898 A1 | 5/2021 | Mason et al. |
| 2021/0142903 A1 | 5/2021 | Mason et al. |
| 2021/0144074 A1 | 5/2021 | Guaneri et al. |
| 2021/0186419 A1 | 6/2021 | Van Ee et al. |
| 2021/0187348 A1 | 6/2021 | Phillips et al. |
| 2021/0202090 A1 | 7/2021 | ODonovan et al. |
| 2021/0202103 A1 | 7/2021 | Bostic et al. |
| 2021/0205660 A1 | 7/2021 | Shavit |
| 2021/0217516 A1 | 7/2021 | Nash |
| 2021/0236020 A1 | 8/2021 | Matijevich et al. |
| 2021/0240853 A1 | 8/2021 | Carlson |
| 2021/0244998 A1 | 8/2021 | Hacking et al. |
| 2021/0245003 A1 | 8/2021 | Turner |
| 2021/0251562 A1 | 8/2021 | Jain |
| 2021/0272677 A1 | 9/2021 | Barbee |
| 2021/0338469 A1 | 11/2021 | Dempers |
| 2021/0343384 A1 | 11/2021 | Purushothaman et al. |
| 2021/0345879 A1 | 11/2021 | Mason et al. |
| 2021/0345975 A1 | 11/2021 | Mason et al. |
| 2021/0350888 A1 | 11/2021 | Guaneri et al. |
| 2021/0350898 A1 | 11/2021 | Mason et al. |
| 2021/0350899 A1 | 11/2021 | Mason et al. |
| 2021/0350901 A1 | 11/2021 | Mason et al. |
| 2021/0350902 A1 | 11/2021 | Mason et al. |
| 2021/0350914 A1 | 11/2021 | Guaneri et al. |
| 2021/0350926 A1 | 11/2021 | Mason et al. |
| 2021/0354002 A1 | 11/2021 | Schaefer |
| 2021/0361514 A1 | 11/2021 | Choi et al. |
| 2021/0366587 A1 | 11/2021 | Mason et al. |
| 2021/0375425 A1 | 12/2021 | Zhang |
| 2021/0383909 A1 | 12/2021 | Mason et al. |
| 2021/0391091 A1 | 12/2021 | Mason |
| 2021/0394011 A1 | 12/2021 | Neuhaus et al. |
| 2021/0398668 A1 | 12/2021 | Chock et al. |
| 2021/0406738 A1 | 12/2021 | O'Donncha et al. |
| 2021/0407670 A1 | 12/2021 | Mason et al. |
| 2021/0407681 A1 | 12/2021 | Mason et al. |
| 2022/0000556 A1 | 1/2022 | Casey et al. |
| 2022/0015838 A1 | 1/2022 | Posnack |
| 2022/0016480 A1 | 1/2022 | Bissonnette et al. |
| 2022/0016482 A1 | 1/2022 | Bissonnette |
| 2022/0016485 A1 | 1/2022 | Bissonnette |
| 2022/0016486 A1 | 1/2022 | Bissonnette |
| 2022/0020469 A1 | 1/2022 | Tanner |
| 2022/0044806 A1 | 2/2022 | Sanders et al. |
| 2022/0047921 A1 | 2/2022 | Bissonnette |
| 2022/0066548 A1 | 3/2022 | Helot |
| 2022/0079690 A1 | 3/2022 | Mason et al. |
| 2022/0080256 A1 | 3/2022 | Arn et al. |

(56) References Cited

U.S. PATENT DOCUMENTS

| | | |
|---|---|---|
| 2022/0080265 A1 | 3/2022 | Watterson |
| 2022/0105384 A1 | 4/2022 | Hacking et al. |
| 2022/0105385 A1 | 4/2022 | Hacking et al. |
| 2022/0105390 A1 | 4/2022 | Yuasa |
| 2022/0115133 A1 | 4/2022 | Mason et al. |
| 2022/0118218 A1 | 4/2022 | Bense et al. |
| 2022/0122724 A1 | 4/2022 | Durlach et al. |
| 2022/0126169 A1 | 4/2022 | Mason |
| 2022/0133576 A1 | 5/2022 | Choi et al. |
| 2022/0148725 A1 | 5/2022 | Mason et al. |
| 2022/0158916 A1 | 5/2022 | Mason et al. |
| 2022/0176039 A1 | 6/2022 | Lintereur et al. |
| 2022/0181004 A1 | 6/2022 | Zilca et al. |
| 2022/0193491 A1 | 6/2022 | Mason |
| 2022/0230729 A1 | 7/2022 | Mason et al. |
| 2022/0238222 A1 | 7/2022 | Neuberg |
| 2022/0238223 A1 | 7/2022 | Mason |
| 2022/0258935 A1 | 8/2022 | Kraft |
| 2022/0262483 A1 | 8/2022 | Rosenberg et al. |
| 2022/0262504 A1 | 8/2022 | Bratty et al. |
| 2022/0266094 A1 | 8/2022 | Mason et al. |
| 2022/0270738 A1 | 8/2022 | Mason et al. |
| 2022/0273985 A1 | 9/2022 | Jeong et al. |
| 2022/0273986 A1 | 9/2022 | Mason |
| 2022/0288460 A1 | 9/2022 | Mason |
| 2022/0288461 A1 | 9/2022 | Ashley et al. |
| 2022/0288462 A1 | 9/2022 | Ashley et al. |
| 2022/0293257 A1 | 9/2022 | Guaneri et al. |
| 2022/0300787 A1 | 9/2022 | Wall et al. |
| 2022/0304881 A1 | 9/2022 | Choi et al. |
| 2022/0304882 A1 | 9/2022 | Choi |
| 2022/0305291 A1 | 9/2022 | Hibbard |
| 2022/0305328 A1 | 9/2022 | Choi et al. |
| 2022/0314072 A1 | 10/2022 | Bissonnette et al. |
| 2022/0314075 A1 | 10/2022 | Mason et al. |
| 2022/0323826 A1 | 10/2022 | Khurana |
| 2022/0327714 A1 | 10/2022 | Cook et al. |
| 2022/0327807 A1 | 10/2022 | Cook et al. |
| 2022/0328181 A1 | 10/2022 | Mason et al. |
| 2022/0330823 A1 | 10/2022 | Janssen |
| 2022/0331663 A1 | 10/2022 | Mason |
| 2022/0338761 A1 | 10/2022 | Maddahi et al. |
| 2022/0339052 A1 | 10/2022 | Kim |
| 2022/0339501 A1 | 10/2022 | Mason et al. |
| 2022/0370851 A1 | 11/2022 | Guidarelli et al. |
| 2022/0384010 A1 | 12/2022 | Kanayama |
| 2022/0384012 A1 | 12/2022 | Mason |
| 2022/0392591 A1 | 12/2022 | Guaneri et al. |
| 2022/0395232 A1 | 12/2022 | Locke |
| 2022/0401783 A1 | 12/2022 | Choi |
| 2022/0415469 A1 | 12/2022 | Mason |
| 2022/0415471 A1 | 12/2022 | Mason |
| 2023/0001268 A1 | 1/2023 | Bissonnette et al. |
| 2023/0013530 A1 | 1/2023 | Mason |
| 2023/0014598 A1 | 1/2023 | Mason et al. |
| 2023/0029639 A1 | 2/2023 | Roy |
| 2023/0047253 A1 | 2/2023 | Gnanasambandam et al. |
| 2023/0048040 A1 | 2/2023 | Hacking et al. |
| 2023/0051751 A1 | 2/2023 | Hacking et al. |
| 2023/0058605 A1 | 2/2023 | Mason |
| 2023/0060039 A1 | 2/2023 | Mason |
| 2023/0072368 A1 | 3/2023 | Mason |
| 2023/0078793 A1 | 3/2023 | Mason |
| 2023/0119461 A1 | 4/2023 | Mason |
| 2023/0190100 A1 | 6/2023 | Stump |
| 2023/0197240 A1 | 6/2023 | Rosenberg |
| 2023/0201656 A1 | 6/2023 | Hacking et al. |
| 2023/0207097 A1 | 6/2023 | Mason |
| 2023/0207124 A1 | 6/2023 | Walsh et al. |
| 2023/0215539 A1 | 7/2023 | Rosenberg et al. |
| 2023/0215552 A1 | 7/2023 | Khotilovich et al. |
| 2023/0218950 A1 | 7/2023 | Belson et al. |
| 2023/0245747 A1 | 8/2023 | Rosenberg et al. |
| 2023/0245748 A1 | 8/2023 | Rosenberg et al. |
| 2023/0245750 A1 | 8/2023 | Rosenberg et al. |
| 2023/0245751 A1 | 8/2023 | Rosenberg et al. |
| 2023/0249599 A1 | 8/2023 | Nicola |
| 2023/0253089 A1 | 8/2023 | Rosenberg et al. |
| 2023/0255555 A1 | 8/2023 | Sundaram et al. |
| 2023/0263428 A1 | 8/2023 | Hull et al. |
| 2023/0274813 A1 | 8/2023 | Rosenberg et al. |
| 2023/0282329 A1 | 9/2023 | Mason et al. |
| 2023/0364472 A1 | 11/2023 | Posnack |
| 2023/0368886 A1 | 11/2023 | Rosenberg |
| 2023/0377710 A1 | 11/2023 | Chen et al. |
| 2023/0377711 A1 | 11/2023 | Rosenberg |
| 2023/0377712 A1 | 11/2023 | Rosenberg |
| 2023/0386639 A1 | 11/2023 | Rosenberg |
| 2023/0390627 A1 | 12/2023 | Bolton |
| 2023/0395231 A1 | 12/2023 | Rosenberg |
| 2023/0395232 A1 | 12/2023 | Rosenberg |
| 2024/0029856 A1 | 1/2024 | Rosenberg |
| 2024/0058651 A1 | 2/2024 | Bissonnette |
| 2024/0177846 A1 | 5/2024 | Gnanasambandam |
| 2024/0203580 A1 | 6/2024 | Mason |

FOREIGN PATENT DOCUMENTS

| | | |
|---|---|---|
| CN | 101964151 A | 2/2011 |
| CN | 201889024 U | 7/2011 |
| CN | 202220794 U | 5/2012 |
| CN | 102670381 A | 9/2012 |
| CN | 103263336 A | 8/2013 |
| CN | 103390357 A | 11/2013 |
| CN | 103473631 A | 12/2013 |
| CN | 103488880 A | 1/2014 |
| CN | 103501328 A | 1/2014 |
| CN | 103721343 A | 4/2014 |
| CN | 203677851 U | 7/2014 |
| CN | 104335211 A | 2/2015 |
| CN | 105263448 A | 1/2016 |
| CN | 105620643 A | 6/2016 |
| CN | 105683977 A | 6/2016 |
| CN | 103136447 B | 8/2016 |
| CN | 105894088 A | 8/2016 |
| CN | 105930668 A | 9/2016 |
| CN | 205626871 U | 10/2016 |
| CN | 106127646 A | 11/2016 |
| CN | 106236502 A | 12/2016 |
| CN | 106510985 A | 3/2017 |
| CN | 106621195 A | 5/2017 |
| CN | 107066819 A | 8/2017 |
| CN | 107430641 A | 12/2017 |
| CN | 107551475 A | 1/2018 |
| CN | 107736982 A | 2/2018 |
| CN | 107930021 A | 4/2018 |
| CN | 108078737 A | 5/2018 |
| CN | 208224811 A | 12/2018 |
| CN | 109191954 A | 1/2019 |
| CN | 109363887 A | 2/2019 |
| CN | 208573971 U | 3/2019 |
| CN | 110148472 A | 8/2019 |
| CN | 110201358 A | 9/2019 |
| CN | 110215188 A | 9/2019 |
| CN | 110322957 A | 10/2019 |
| CN | 110808092 A | 2/2020 |
| CN | 110931103 A | 3/2020 |
| CN | 110993057 A | 4/2020 |
| CN | 111105859 A | 5/2020 |
| CN | 111111110 A | 5/2020 |
| CN | 111370088 A | 7/2020 |
| CN | 111460305 A | 7/2020 |
| CN | 111790111 A | 10/2020 |
| CN | 112071393 A | 12/2020 |
| CN | 212141371 U | 12/2020 |
| CN | 112289425 A | 1/2021 |
| CN | 212624809 U | 2/2021 |
| CN | 112603295 A | 4/2021 |
| CN | 213190965 U | 5/2021 |
| CN | 113384850 A | 9/2021 |
| CN | 113499572 A | 10/2021 |
| CN | 215136488 U | 12/2021 |
| CN | 113885361 A | 1/2022 |
| CN | 114049961 A | 2/2022 |

(56) References Cited

FOREIGN PATENT DOCUMENTS

| | | |
|---|---|---|
| CN | 114203274 A | 3/2022 |
| CN | 216258145 U | 4/2022 |
| CN | 114632302 A | 6/2022 |
| CN | 114694824 A | 7/2022 |
| CN | 114898832 A | 8/2022 |
| CN | 114983760 A | 9/2022 |
| CN | 217472652 U | 9/2022 |
| CN | 110270062 B | 10/2022 |
| CN | 218420859 U | 2/2023 |
| CN | 115954081 A | 4/2023 |
| DE | 95019 C | 1/1897 |
| DE | 7628633 U1 | 12/1977 |
| DE | 8519150 U1 | 10/1985 |
| DE | 3732905 A1 | 7/1988 |
| DE | 19619820 A1 | 12/1996 |
| DE | 29620008 U1 | 2/1997 |
| DE | 19947926 A1 | 4/2001 |
| DE | 102018202497 A1 | 8/2018 |
| DE | 102018211212 A1 | 1/2019 |
| DE | 102019108425 B3 | 8/2020 |
| EP | 199600 A2 | 10/1986 |
| EP | 0383137 A2 | 8/1990 |
| EP | 634319 A2 | 1/1995 |
| EP | 0919259 A1 | 6/1999 |
| EP | 1034817 A1 | 9/2000 |
| EP | 1159989 A1 | 12/2001 |
| EP | 1391179 A1 | 2/2004 |
| EP | 1968028 | 9/2008 |
| EP | 2564904 A1 | 3/2013 |
| EP | 2575064 A1 | 4/2013 |
| EP | 1909730 B1 | 4/2014 |
| EP | 2815242 A4 | 12/2014 |
| EP | 2869805 A | 5/2015 |
| EP | 2997951 A1 | 3/2016 |
| EP | 2688472 B1 | 4/2016 |
| EP | 3264303 A1 | 1/2018 |
| EP | 3323473 A1 | 5/2018 |
| EP | 3547322 A1 | 10/2019 |
| EP | 3627514 A1 | 3/2020 |
| EP | 3671700 A1 | 6/2020 |
| EP | 3688537 A1 | 8/2020 |
| EP | 3731733 A1 | 11/2020 |
| EP | 3984508 A1 | 4/2022 |
| EP | 3984509 A1 | 4/2022 |
| EP | 3984510 A1 | 4/2022 |
| EP | 3984511 A1 | 4/2022 |
| EP | 3984512 A1 | 4/2022 |
| EP | 3984513 A1 | 4/2022 |
| EP | 4054699 A1 | 9/2022 |
| EP | 4112033 A1 | 1/2023 |
| FR | 2527541 A2 | 12/1983 |
| FR | 3127393 A1 | 3/2023 |
| GB | 141664 A | 11/1920 |
| GB | 2336140 A | 10/1999 |
| GB | 2372459 A | 8/2002 |
| GB | 2512431 A | 10/2014 |
| GB | 2591542 B | 3/2022 |
| IN | 201811043670 A | 7/2018 |
| JP | 2000005339 A | 1/2000 |
| JP | 2003225875 A | 8/2003 |
| JP | 2005227928 A | 8/2005 |
| JP | 2005227928 A1 | 8/2005 |
| JP | 2009112336 A | 5/2009 |
| JP | 2013515995 A | 5/2013 |
| JP | 2014104139 A | 6/2014 |
| JP | 3193662 U | 10/2014 |
| JP | 3198173 U | 6/2015 |
| JP | 5804063 B2 | 11/2015 |
| JP | 2018102842 A | 7/2018 |
| JP | 2019028647 A | 2/2019 |
| JP | 2019134909 A | 8/2019 |
| JP | 6573739 B1 | 9/2019 |
| JP | 6659831 B2 | 3/2020 |
| JP | 2020057082 A | 4/2020 |
| JP | 6710357 B1 | 6/2020 |
| JP | 6775757 B1 | 10/2020 |
| JP | 2021027917 A | 2/2021 |
| JP | 6871379 B2 | 5/2021 |
| JP | 2022521378 A | 4/2022 |
| JP | 3238491 U | 7/2022 |
| JP | 7198364 B2 | 12/2022 |
| JP | 7202474 B2 | 1/2023 |
| JP | 7231750 B2 | 3/2023 |
| JP | 7231751 B2 | 3/2023 |
| JP | 7231752 B2 | 3/2023 |
| KR | 20020009724 A | 2/2002 |
| KR | 200276919 Y1 | 5/2002 |
| KR | 20020065253 A | 8/2002 |
| KR | 100582596 B1 | 5/2006 |
| KR | 101042258 B1 | 6/2011 |
| KR | 101258250 B1 | 4/2013 |
| KR | 101325581 B1 | 11/2013 |
| KR | 20140128630 A | 11/2014 |
| KR | 20150017693 A | 2/2015 |
| KR | 20150078191 A | 7/2015 |
| KR | 101580071 B1 | 12/2015 |
| KR | 101647620 B1 | 8/2016 |
| KR | 20160093990 A | 8/2016 |
| KR | 20170038837 A | 4/2017 |
| KR | 20180004928 A | 1/2018 |
| KR | 20190029175 A | 3/2019 |
| KR | 20190056116 A | 5/2019 |
| KR | 101988167 B1 | 6/2019 |
| KR | 101969392 B1 | 8/2019 |
| KR | 102055279 B1 | 12/2019 |
| KR | 20200019548 A | 2/2020 |
| KR | 102088333 B1 | 3/2020 |
| KR | 20200025290 A | 3/2020 |
| KR | 20200029180 A | 3/2020 |
| KR | 102097190 B1 | 4/2020 |
| KR | 102116664 B1 | 5/2020 |
| KR | 102116968 B1 | 5/2020 |
| KR | 20200056233 A | 5/2020 |
| KR | 102120828 B1 | 6/2020 |
| KR | 102121586 B1 | 6/2020 |
| KR | 102142713 B1 | 8/2020 |
| KR | 102162522 B1 | 10/2020 |
| KR | 20200119665 A | 10/2020 |
| KR | 102173553 B1 | 11/2020 |
| KR | 102180079 B1 | 11/2020 |
| KR | 102188766 B1 | 12/2020 |
| KR | 102196793 B1 | 12/2020 |
| KR | 20210006212 A | 1/2021 |
| KR | 102224188 B1 | 3/2021 |
| KR | 102224618 B1 | 3/2021 |
| KR | 102246049 B1 | 4/2021 |
| KR | 102246050 B1 | 4/2021 |
| KR | 102246051 B1 | 4/2021 |
| KR | 102246052 B1 | 4/2021 |
| KR | 20210052028 A | 5/2021 |
| KR | 102264498 B1 | 6/2021 |
| KR | 102352602 B1 | 1/2022 |
| KR | 102352603 B1 | 1/2022 |
| KR | 102352604 B1 | 1/2022 |
| KR | 20220004639 A | 1/2022 |
| KR | 102387577 B1 | 4/2022 |
| KR | 102421437 B1 | 7/2022 |
| KR | 20220102207 A | 7/2022 |
| KR | 102427545 B1 | 8/2022 |
| KR | 102467495 B1 | 11/2022 |
| KR | 102467496 B1 | 11/2022 |
| KR | 102469723 B1 | 11/2022 |
| KR | 102471990 B1 | 11/2022 |
| KR | 20220145989 A | 11/2022 |
| KR | 20220156134 A | 11/2022 |
| KR | 102502744 B1 | 2/2023 |
| KR | 20230019349 A | 2/2023 |
| KR | 20230019350 A | 2/2023 |
| KR | 20230026556 A | 2/2023 |
| KR | 20230026668 A | 2/2023 |
| KR | 20230040526 | 3/2023 |
| KR | 20230050506 A | 4/2023 |
| KR | 20230056118 A | 4/2023 |
| KR | 102528503 B1 | 5/2023 |

(56) References Cited

FOREIGN PATENT DOCUMENTS

| | | |
|---|---|---|
| KR | 102531930 B1 | 5/2023 |
| KR | 102532766 B1 | 5/2023 |
| KR | 102539190 B1 | 6/2023 |
| RU | 2014131288 A | 2/2016 |
| RU | 2607953 C2 | 1/2017 |
| TW | M474545 U | 3/2014 |
| TW | I442956 B | 7/2014 |
| TW | M638437 U | 3/2023 |
| WO | 1998009687 A1 | 3/1998 |
| WO | 0149235 A2 | 7/2001 |
| WO | 0151083 A2 | 7/2001 |
| WO | 2001050387 A1 | 7/2001 |
| WO | 2001056465 A1 | 8/2001 |
| WO | 02062211 A2 | 8/2002 |
| WO | 02093312 A2 | 11/2002 |
| WO | 2003043494 A1 | 5/2003 |
| WO | 2005018453 A1 | 3/2005 |
| WO | 2005074369 A2 | 8/2005 |
| WO | 2006004430 A2 | 1/2006 |
| WO | 2006012694 A1 | 2/2006 |
| WO | 2007102709 A1 | 9/2007 |
| WO | 2008114291 A1 | 9/2008 |
| WO | 2008140780 A1 | 11/2008 |
| WO | 2009003170 A1 | 12/2008 |
| WO | 2009008968 A1 | 1/2009 |
| WO | 2011025322 A2 | 3/2011 |
| WO | 2012128801 A1 | 9/2012 |
| WO | 2013002568 A2 | 1/2013 |
| WO | 2023164292 A1 | 3/2013 |
| WO | 2013122839 A1 | 8/2013 |
| WO | 2014011447 A1 | 1/2014 |
| WO | 2014163976 A1 | 10/2014 |
| WO | 2015026744 A1 | 2/2015 |
| WO | 2015065298 A1 | 5/2015 |
| WO | 2015082555 A1 | 6/2015 |
| WO | 2016151364 A1 | 9/2016 |
| WO | 2016154318 A1 | 9/2016 |
| WO | 2017030781 A1 | 2/2017 |
| WO | 2017166074 A1 | 5/2017 |
| WO | 2017091691 A1 | 6/2017 |
| WO | 2017165238 A1 | 9/2017 |
| WO | 2018027080 A1 | 2/2018 |
| WO | 2018081795 A1 | 5/2018 |
| WO | 2018171853 A1 | 9/2018 |
| WO | 2019022706 A1 | 1/2019 |
| WO | 2019143940 A1 | 7/2019 |
| WO | 2020014710 A2 | 1/2020 |
| WO | 2020075190 A1 | 4/2020 |
| WO | 2020130979 A1 | 6/2020 |
| WO | 2020149815 A2 | 7/2020 |
| WO | 2020229705 A1 | 11/2020 |
| WO | 2020245727 A1 | 12/2020 |
| WO | 2020249855 A1 | 12/2020 |
| WO | 2020252599 A1 | 12/2020 |
| WO | 2020256577 A1 | 12/2020 |
| WO | 2021021447 A1 | 2/2021 |
| WO | 2021022003 A1 | 2/2021 |
| WO | 2021038980 A1 | 3/2021 |
| WO | 2021055472 A1 | 3/2021 |
| WO | 2021061061 A1 | 4/2021 |
| WO | 2021090267 A1 | 5/2021 |
| WO | 2021138620 A1 | 7/2021 |
| WO | 2021216881 A1 | 10/2021 |
| WO | 2021236961 A1 | 11/2021 |
| WO | 2022047006 A1 | 3/2022 |
| WO | 2022092493 A1 | 5/2022 |
| WO | 2022092494 A1 | 5/2022 |
| WO | 2022212883 A1 | 10/2022 |
| WO | 2022212921 A1 | 10/2022 |
| WO | 2022216498 A1 | 10/2022 |
| WO | 2022251420 A1 | 12/2022 |
| WO | 2023008680 A1 | 2/2023 |
| WO | 2023008681 A1 | 2/2023 |
| WO | 2023022319 A1 | 2/2023 |
| WO | 2023022320 A1 | 2/2023 |
| WO | 2023052695 A1 | 4/2023 |
| WO | 2023091496 A1 | 5/2023 |
| WO | 2023215155 A1 | 11/2023 |
| WO | 2023230075 A1 | 11/2023 |
| WO | 2024013267 A1 | 1/2024 |
| WO | 2024107807 A1 | 5/2024 |

OTHER PUBLICATIONS

Derkild et al., "Home-based cardiac rehabilitation is an attractive alternative to No. cardiac rehabilitation for elderly patients with coronary heart disease: results from a randomised clinical trial," BMJ Open Accessible Medical Research, Nov. 22, 2012, pp. 1-9.

Bravo-Escobar et al., "Effectiveness and safety of a home-based cardiac rehabilitation programme of mixed surveillance in patients with ischemic heart disease at moderate cardiovascular risk: A randomised, controlled clinical trial," BMC Cardiovascular Disorders, 2017, pp. 1-11, vol. 17:66.

Thomas et al., "Home-Based Cardiac Rehabilitation," Circulation, 2019, pp. e69-e89, vol. 140.

Thomas et al., "Home-Based Cardiac Rehabilitation," Journal of the American College of Cardiology, Nov. 1, 2019, pp. 133-153, vol. 74.

Thomas et al., "Home-Based Cardiac Rehabilitation," HHS Public Access, Oct. 2, 2020, pp. 1-39.

Dittus et al., "Exercise-Based Oncology Rehabilitation: Leveraging the Cardiac Rehabilitation Model," Journal of Cardiopulmonary Rehabilitation and Prevention, 2015, pp. 130-139, vol. 35.

Chen et al., "Home-based cardiac rehabilitation improves quality of life, aerobic capacity, and readmission rates in patients with chronic heart failure," Medicine, 2018, pp. 1-5 vol. 97:4.

Lima de Melo Ghisi et al., "A systematic review of patient education in cardiac patients: Do they increase knowledge and promote health behavior change?," Patient Education and Counseling, 2014, pp. 1-15.

Fang et al., "Use of Outpatient Cardiac Rehabilitation Among Heart Attack Survivors—20 States and the District of Columbia, 2013 and Four States, 2015," Morbidity and Mortality Weekly Report, vol. 66, No. 33, Aug. 25, 2017, pp. 869-873.

Beene et al., "AI and Care Delivery: Emerging Opportunities For Artificial Intelligence To Transform How Care Is Delivered," Nov. 2019, American Hospital Association, pp. 1-12.

Website for "Pedal Exerciser", p. 1, retrieved on Sep. 9, 2022 from https://www.vivehealth.com/collections/physical-therapy-equipment/products/pedalexerciser.

Website for "Functional Knee Brace with ROM", p. 1, retrieved on Sep. 9, 2022 from http://medicalbrace.gr/en/product/functional-knee-brace-with-goniometer-mbtelescopicknee/.

Website for "ComfySplints Goniometer Knee", pp. 1-5, retrieved on Sep. 9, 2022 from https://www.comfysplints.com/product/knee-splints/.

Website for "BMI FlexEze Knee Corrective Orthosis (KCO)", pp. 1-4, retrieved on Sep. 9, 2022 from https://orthobmi.com/products/bmi-flexeze%C2%AE-knee-corrective-orthosis-kco.

Website for "Neoprene Knee Brace with goniometer—Patella Rom MB.4070", pp. 1-4, retrieved on Sep. 9, 2022 from https://www.fortuna.com.gr/en/product/neoprene-knee-brace-with-goniometer-patella-rom-mb-4070/.

Kuiken et al., "Computerized Biofeedback Knee Goniometer: Acceptance and Effect on Exercise Behavior in Post-total Knee Arthroplasty Rehabilitation," Biomedical Engineering Faculty Research and Publications, 2004, pp. 1-10.

Ahmed et al., "Artificial intelligence with multi-functional machine learning platform development for better healthcare and precision medicine," Database, 2020, pp. 1-35.

Davenport et al., "The potential for artificial intelligence in healthcare," Digital Technology, Future Healthcare Journal, 2019, pp. 1-5, vol. 6, No. 2.

Website for "OxeFit XS1", pp. 1-3, retrieved on Sep. 9, 2022 from https://www.oxefit.com/xs1.

Website for "Preva Mobile", pp. 1-6, retrieved on Sep. 9, 2022 from https://www.precor.com/en-us/resources/introducing-preva-mobile.

(56) References Cited

OTHER PUBLICATIONS

Website for "J-Bike", pp. 1-3, retrieved on Sep. 9, 2022 from https://www.magneticdays.com/en/cycling-for-physical-rehabilitation.
Website for "Excy", pp. 1-12, retrieved on Sep. 9, 2022 from https://excy.com/portable-exercise-rehabilitation-excy-xcs-pro/.
Website for "OxeFit XP1", p. 1, retrieved on Sep. 9, 2022 from https://www.oxefit.com/xp1.
Ahmed et al., "Artificial Intelligence With Multi-Functional Machine Learning Platform Development For Better Healthcare And Precision Medicine," Database (Oxford), 2020, pp. 1-35, vol. 2020.
Davenport et al., "The Potential For Artificial Intelligence in Healthcare," Future Healthcare Journal, 2019, pp. 94-98, vol. 6, No. 2.
Jeong et al., "Remotely controlled biking is associated with improved adherence to prescribed cycling speed," Technology and Health Care 23, 2015, 7 pages.
Laustsen et al., "Telemonitored exercise-based cardiac rehabilitation improves physical capacity and health-related quality of life," Journal of Telemedicine and Telecare, 2020, DOI: 10.1177/1357633X18792808, 9 pages.
Blasiak et al., "CURATE.AI: Optimizing Personalized Medicine with Artificial Intelligence," SLAS Technology: Translating Life Sciences Innovation, 2020, 11 pages.
Malloy, Online Article "AI-enabled EKGs find difference between numerical age and biological age significantly affects health, longevity", Website: https://newsnetwork.mayoclinic.org/discussion/ai-enabled-ekgs-find-difference-between-numerical-age-and-biological-age-significantly-affects-health-longevity/, Mayo Clinic News Network, May 20, 2021, retrieved: Jan. 23, 2023, p. 1-4.
International Search Report and Written Opinion for PCT/US2023/014137, dated Jun. 9, 2023, 13 pages.
Website for "Esino 2022 Physical Therapy Equipments Arm Fitness Indoor Trainer Leg Spin Cycle Machine Exercise Bike for Elderly," https://www.made-in-china.com/showroom/esinogroup/product-detailYdZtwGhCMKVR/China-Esino-2022-Physical-Therapy-Equipments-Arm-Fitness-Indoor-Trainer-Leg-Spin-Cycle-Machine-Exercise-Bike-for-Elderly.html, retrieved on Aug. 29, 2023, 5 pages.
Abedtash, "An Interoperable Electronic Medical Record-Based Platform For Personalized Predictive Analytics", ProQuest LLC, Jul. 2017, 185 pages.
Gerbild et al., "Physical Activity to Improve Erectile Dysfunction: A Systematic Review of Intervention Studies," Sexual Medicine, 2018, 15 pages.
Alcaraz et al., "Machine Learning as Digital Therapy Assessment for Mobile Gait Rehabilitation," 2018 IEEE 28th International Workshop on Machine Learning for Signal Processing (MLSP), Aalborg, Denmark, 2018, 6 pages.
Androutsou et al., "A Smartphone Application Designed to Engage the Elderly in Home-Based Rehabilitation," Frontiers in Digital Health, Sep. 2020, vol. 2, Article 15, 13 pages.
Silva et al., "SapoFitness: A mobile health application for dietary evaluation," 2011 IEEE 13th International Conference on U e-Health Networking, Applications and Services, Columbia, MO, USA, 2011, 6 pages.
Wang et al., "Interactive wearable systems for upper body rehabilitation: a systematic review," Journal of NeuroEngineering and Rehabilitation, 2017, 21 pages.
Marzolini et al., "Eligibility, Enrollment, and Completion of Exercise-Based Cardiac Rehabilitation Following Stroke Rehabilitation: What Are the Barriers?," Physical Therapy, vol. 100, No. 1, 2019, 13 pages.
Nijjar et al., "Randomized Trial of Mindfulness-Based Stress Reduction in Cardiac Patients Eligible for Cardiac Rehabilitation," Scientific Reports, 2019, 12 pages.
Lara et al., "Human-Robot Sensor Interface for Cardiac Rehabilitation," IEEE International Conference on Rehabilitation Robotics, Jul. 2017, 8 pages.
Ishraque et al., "Artificial Intelligence-Based Rehabilitation Therapy Exercise Recommendation System," 2018 IEEE MIT Undergraduate Research Technology Conference (URTC), Cambridge, MA, USA, 2018, 5 pages.
Zakari et al., "Are There Limitations to Exercise Benefits in Peripheral Arterial Disease?," Frontiers in Cardiovascular Medicine, Nov. 2018, vol. 5, Article 173, 12 pages.
You et al., "Including Blood Vasculature into a Game-Theoretic Model of Cancer Dynamics," Games 2019, 10, 13, 22 pages.
Jeong et al., "Computer-assisted upper extremity training using interactive biking exercise (iBikE) platform," Sep. 2012, 34th Annual International Conference of the IEEE EMBS, 5 pages.
Jeong et al., "Computer-assisted upper extremity training using interactive biking exercise (iBikE) platform," Sep. 2012, pp. 1-5, 34th Annual International Conference of the IEEE EMBS.
Chrif et al., "Control design for a lower-limb paediatric therapy device using linear motor technology," Article, 2017, pp. 119-127, Science Direct, Switzerland.
Robben et al., "Delta Features From Ambient Sensor Data are Good Predictors of Change in Functional Health," Article, 2016, pp. 2168-2194, vol. 21, No. 4, IEEE Journal of Biomedical and Health Informatics.
Kantoch et al., "Recognition of Sedentary Behavior by Machine Learning Analysis of Wearable Sensors during Activities of Daily Living for Telemedical Assessment of Cardiovascular Risk," Article, 2018, 17 pages, Sensors, Poland.
Warburton et al., "International Launch of the Par-•Q+ And ePARmed-•X+ Validation of the PAR-•Q+ and ePARmed••X+," Health & Fitness Journal of Canada, 2011, 9 pages, vol. 4, No. 2.
HCL Fitness, HCI Fitness PhysioTrainer Pro, 2017, retrieved on Aug. 19, 2021, 7 pages, https://www.amazon.com/HCI-Fitness-Physio Trainer-Electronically-Controlled/dp/B0759YMW78/.
International Preliminary Report on Patentability of International Application No. PCT/US2017/50895, Date of Mailing Dec. 11, 2018, 52 pages.
International Searching Authority, Search Report and Written Opinion for International Application No. PCT/US2017/50895, Date of Mailing Jan. 12, 2018, 6 pages.
International Searching Authority, Search Report and Written Opinion for International Application No. PCT/US2020/021876, Date of Mailing May 28, 2020, 8 pages.
International Searching Authority, Search Report and Written Opinion for International Application No. PCT/US2020/051008, Date of Mailing Dec. 10, 2020, 9 pages.
International Searching Authority, Search Report and Written Opinion for International Application No. PCT/US2020/056661, Date of Mailing Feb. 12, 2021, 12 pages.
International Searching Authority, Search Report and Written Opinion for International Application No. PCT/US2021/032807, Date of Mailing Sep. 6, 2021, 11 pages.
Matrix, R3xm Recumbent Cycle, retrieved on Aug. 4, 2020, 7 pages, https://www.matrixfitness.com/en/cardio/cycles/r3xm-recumbent.
ROM3 Rehab, ROM3 Rehab System, Apr. 20, 2015, retrieved on Aug. 31, 2018, 12 pages, https://vimeo.com/125438463.
Jennifer Bresnick, "What is the Role of Natural Language Processing in Healthcare?", pp. 1-7, published Aug. 18, 2016, retrieved on Feb. 1, 2022 from https://healthitanalytics.com/ featu res/what-is-the-role-of-natural-language-processing-in-healthcare.
Alex Bellec, "Part-of-Speech tagging tutorial with the Keras Deep Learning library," pp. 1-16, published Mar. 27, 2018, retrieved on Feb. 1, 2022 from https://becominghuman.ai/part-of-speech-tagging-tutorial-with-the-keras-deep-learning-library-d7f93fa05537.
Kavita Ganesan, All you need to know about text preprocessing for NLP and Machine Learning, pp. 1-14, published Feb. 23, 2019, retrieved on Feb. 1, 2022 from https:// towardsdatascience.com/all-you-need-to-know-about-text-preprocessing-for-nlp-and-machine-learning-bcl c5765ff67.
Badreesh Shetty, "Natural Language Processing (NPL) for Machine Learning," pp. 1-13, published Nov. 24, 2018, retrieved on Feb. 1, 2022 from https://towardsdatascience. com/natural-language-processing-nlp-for-machine-learning-d44498845d5b.

(56) References Cited

OTHER PUBLICATIONS

Davenport et al., "The Potential For Artificial Intelligence In Healthcare", 2019, Future Healthcare Journal 2019, vol. 6, No. 2: Year: 2019, pp. 1-5.

Ahmed et al., "Artificial Intelligence With Multi-Functional Machine Learning Platform Development For Better Healthcare And Precision Medicine", 2020, Database (Oxford), 2020:baaa010. doi: 10.1093/database/baaa010 (Year: 2020), pp. 1-35.

Ruiz Ivan et al., "Towards a physical rehabilitation system using a telemedicine approach", Computer Methods in Biomechanics and Biomedical Engineering: Imaging & Visualization, vol. 8, No. 6, Jul. 28, 2020, pp. 671-680, XP055914810.

De Canniere Helene et al., "Wearable Monitoring and Interpretable Machine Learning Can Objectively Track Progression in Patients during Cardiac Rehabilitation", Sensors, vol. 20, No. 12, Jun. 26, 2020, XP055914617, pp. 1-15.

Boulanger Pierre et al., "A Low-cost Virtual Reality Bike for Remote Cardiac Rehabilitation", Dec. 7, 2017, Advances in Biometrics: International Conference, ICB 2007, Seoul, Korea, pp. 155-166.

Yin Chieh et al., "A Virtual Reality-Cycling Training System for Lower Limb Balance Improvement", BioMed Research International, vol. 2016, pp. 1-10.

Marios et al., "The effect of tele-monitoring on exercise training adherence, functional capacity, quality of life and glycemic control in patients with type II diabetes," Journal of Sports Science and Medicine, Mar. 2012, vol. 11, 6 pages.

"Abidi, Samina: A Knowledge-Modeling Approach to Integrate Multiple Clinical Practice Guidelines to Provide Evidence-Based Clinical Decision Support for Managing Comorbid Conditions; Journal of Medical Systems 41.12: 1-19. Springer Nature B.V. (Dec. 2017) (Year: 2017)".

Fuller, Carole G.; Diagnosis and treatment considerations with comorbid developmentally disabled populations; Journal of Clinical Psychology 54.1: 1-10. John Wiley and Sons Inc. (Jan. 1998) (Year: 1998).

He, Jianxing et al. The practical implementation of artificial intelligence technologies in medicine. Nature Medicine; New York vol. 25, Iss. 1. Jan. 2019. (Year: 2019).

CG. Acampora, D. J. Cook, P. Rashidi and A. V. Vasilakos, "A Survey on Ambient Intelligence in Healthcare," in Proceedings of the IEEE, vol. 101, No. 12, pp. 2470-2494, Dec. 2013, doi: 1109/JPROC.2013.2262913. (Year: 2013).

H. Demirkan, "A Smart Healthcare Systems Framework," in IT Professional, vol. 15, No. 5, pp. 38-45, Sep.-Oct. 2013, doi: 10.1109/MITP.2013.35. (Year: 2013).

W. Rashwan, J. Fowler and A. Arisha, "A Multi-Method Scheduling Framework for Medical Staff," 2018 Winter Simulation Conference (WSC), Gothenburg, Sweden, 2018, pp. 1464-1475, doi: 10.1109/WSC.2018.8632247. (Year: 2018).

\* cited by examiner

METHOD AND SYSTEM FOR MONITORING ACTUAL PATIENT TREATMENT PROGRESS USING SENSOR DATA

CROSS-REFERENCES TO RELATED APPLICATIONS

This application is a continuation of PCT/US2022/022579 filed Mar. 30, 2022 titled "Method and Systems for Monitoring Actual Patient Treatment Progress Using Sensor Data". This application is also a continuation-in-part of U.S. patent application Ser. No. 17/739,906 filed May 9, 2022, titled "Systems and Methods for Using Machine Learning to Control an Electromechanical Device Used for Prehabilitation, Rehabilitation, and/or Exercise", which is a continuation of U.S. patent application Ser. No. 17/150,938, filed Jan. 15, 2021, titled "Systems and Methods for Using Machine Learning to Control an Electromechanical Device Used for Prehabilitation, Rehabilitation, and/or Exercise" (now U.S. Pat. No. 11,325,005), which is a continuation-in-part of U.S. patent application Ser. No. 17/021,895, filed Sep. 15, 2020, titled "Telemedicine for Orthopedic Treatment" (now U.S. Pat. No. 11,071,597), which claims priority to and the benefit of U.S. Provisional Patent Application Ser. No. 62/910,232, filed Oct. 3, 2019, titled "Telemedicine for Orthopedic Treatment", the entire disclosures of which are hereby incorporated by reference for all purposes.

This application also claims priority to and the benefit of U.S. Provisional Patent Application Ser. No. 63/208,372, filed Jun. 8, 2021, titled "Method and System for Using a Treatment Device to Predict a Condition of a User of the Treatment Device", the entire disclosure of which is hereby incorporated by reference for all purposes.

BACKGROUND

Remote medical assistance, also referred to, inter alia, as remote medicine, telemedicine, telemed, telmed, tel-med, or telehealth, is an at least two-way communication between a healthcare professional or providers, such as a physician or a physical therapist, and a patient using audio and/or audio-visual and/or other sensorial or perceptive (e.g., tactile, gustatory, haptic, pressure-sensing-based or electromagnetic (e.g., neurostimulation) communications (e.g., via a computer, a smartphone, or a tablet).

As used herein, "anonymization" includes the meaning of the term "anonymization" and the meaning of the term "anonymisation," as these may otherwise have different meanings in, e.g., the United States vs. Europe. Similarly, as used herein, "pseudonymization" includes the meaning of the term "pseudonymization" and the meaning of the term "pseudonymisation," as these may otherwise have different meanings in, e.g., the United States vs. Europe.

SUMMARY

An aspect of the disclosed embodiments includes a method that includes receiving treatment data pertaining to a user capable of using a treatment device to perform a treatment plan. The treatment data may include at least one of characteristics of the user, treatment measurement information pertaining to the user while the user uses the treatment device, characteristics of the treatment device, and at least one aspect of the treatment plan. The method also includes receiving activity data pertaining to the user while the user engages in at least one activity and generating treatment information using the treatment data and the activity data. The method also includes writing to an associated memory, for access by a healthcare professional, the treatment information and modifying at least one aspect of the treatment plan in response to receiving, from the healthcare professional, treatment plan input including at least one modification to the at least one aspect of the treatment plan.

Another aspect of the disclosed embodiments includes a system that includes a processing device and a memory communicatively coupled to the processing device and capable of storing instructions. The processing device executes the instructions to perform any of the methods, operations, or steps described herein.

Another aspect of the disclosed embodiments includes a tangible, non-transitory computer-readable medium storing instructions that, when executed, cause a processing device to perform any of the methods, operations, or steps described herein.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

NOTATION AND NOMENCLATURE

Figure 1:
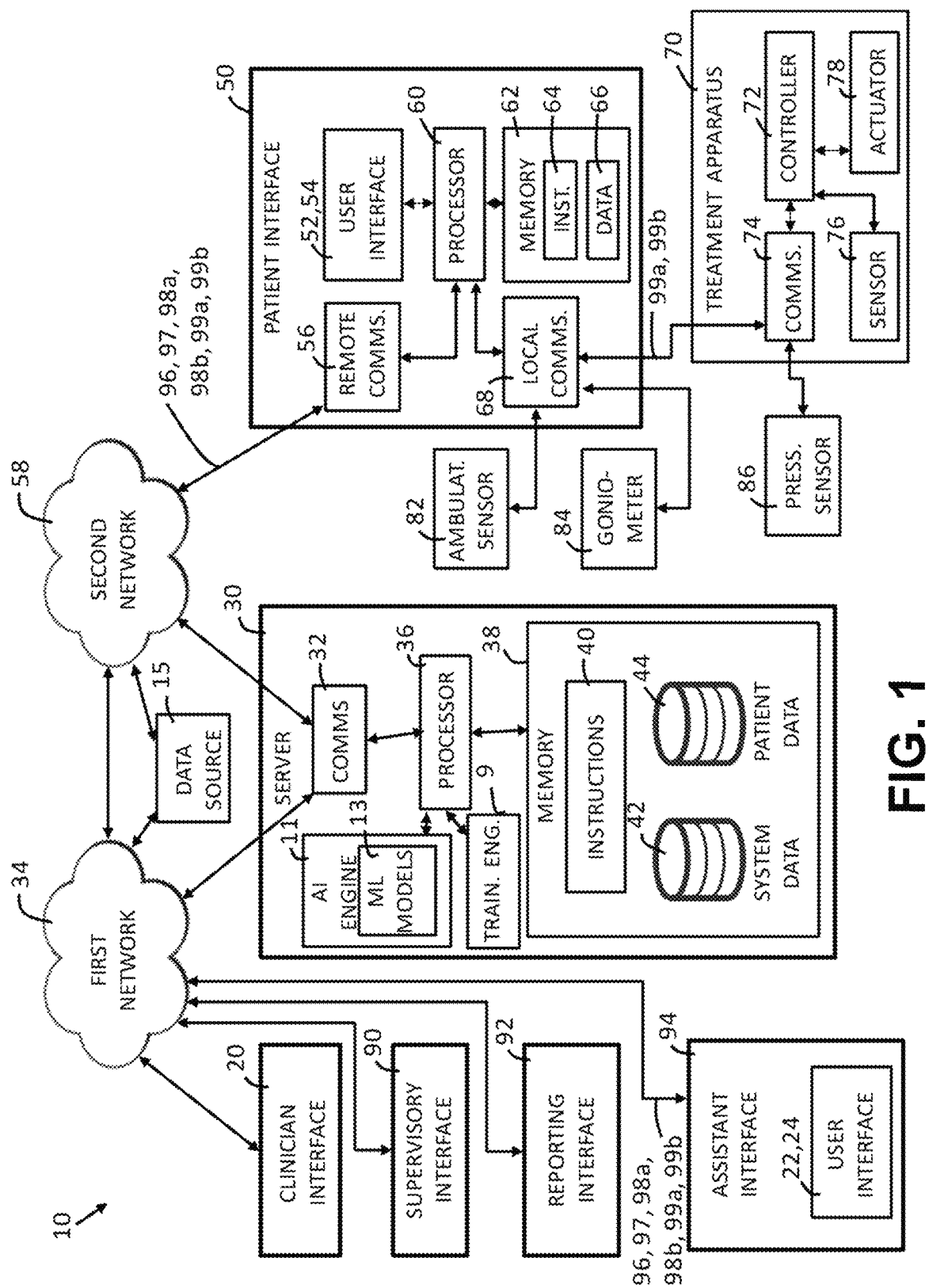
FIG. 1 generally illustrates a block diagram of an embodiment of a computer-implemented system for managing a treatment plan according to the principles of the present disclosure.

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

The terminology used herein is for the purpose of describing particular example embodiments only, and is not intended to be limiting. As used herein, the singular forms "a," "an," and "the" may be intended to include the plural forms as well, unless the context clearly indicates otherwise. The method steps, processes, and operations described herein are not to be construed as necessarily requiring their performance in the particular order discussed or illustrated, unless specifically identified as an order of performance. It is also to be understood that additional or alternative steps may be employed.

The terms first, second, third, etc. may be used herein to describe various elements, components, regions, layers and/or sections; however, these elements, components, regions, layers and/or sections should not be limited by these terms. These terms may be only used to distinguish one element, component, region, layer, or section from another region, layer, or section. Terms such as "first," "second," and other numerical terms, when used herein, do not imply a sequence or order unless clearly indicated by the context. Thus, a first element, component, region, layer, or section discussed below could be termed a second element, component, region, layer, or section without departing from the teachings of the example embodiments. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. In another example, the phrase "one or more" when used with a list of items means there may be one item or any suitable number of items exceeding one.

Spatially relative terms, such as "inner," "outer," "beneath," "below," "lower," "above," "upper," "top," "bottom," and the like, may be used herein. These spatially relative terms can be used for ease of description to describe one element's or feature's relationship to another element(s) or feature(s) as illustrated in the figures. The spatially relative terms may also be intended to encompass different orientations of the device in use, or operation, in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptions used herein interpreted accordingly.

A "treatment plan" may include one or more treatment protocols, and each treatment protocol includes one or more treatment sessions. Each treatment session comprises several session periods, with each session period including a particular exercise for treating the body part of the patient. For example, a treatment plan for post-operative rehabilitation after a knee surgery may include an initial treatment protocol with twice daily stretching sessions for the first 3 days after surgery and a more intensive treatment protocol with active exercise sessions performed 4 times per day starting 4 days after surgery. A treatment plan may also include information pertaining to a medical procedure to perform on the patient, a treatment protocol for the patient using a treatment device, a diet regimen for the patient, a medication regimen for the patient, a sleep regimen for the patient, additional regimens, or some combination thereof.

The terms telemedicine, telehealth, telemed, teletherapeutic, telemedicine, remote medicine, etc., may be used interchangeably herein.

The term "enhanced reality" may include a user experience comprising one or more of augmented reality, virtual reality, mixed reality, immersive reality, or a combination of the foregoing (e.g., immersive augmented reality, mixed augmented reality, virtual and augmented immersive reality, and the like).

The term "augmented reality" may refer, without limitation, to an interactive user experience that provides an enhanced environment that combines elements of a real-world environment with computer-generated components perceivable by the user.

The term "virtual reality" may refer, without limitation, to a simulated interactive user experience that provides an enhanced environment perceivable by the user and wherein such enhanced environment may be similar to or different from a real-world environment.

The term "mixed reality" may refer to an interactive user experience that combines aspects of augmented reality with aspects of virtual reality to provide a mixed reality environment perceivable by the user.

The term "immersive reality" may refer to a simulated interactive user experienced using virtual and/or augmented reality images, sounds, and other stimuli to immerse the user, to a specific extent possible (e.g., partial immersion or total immersion), in the simulated interactive experience. For example, in some embodiments, to the specific extent possible, the user experiences one or more aspects of the immersive reality as naturally as the user typically experiences corresponding aspects of the real-world. Additionally, or alternatively, an immersive reality experience may include actors, a narrative component, a theme (e.g., an entertainment theme or other suitable theme), and/or other suitable features of components.

The term "body halo" may refer to a hardware component or components, wherein such component or components may include one or more platforms, one or more body supports or cages, one or more chairs or seats, one or more back supports, one or more leg or foot engaging mechanisms, one or more arm or hand engaging mechanisms, one or more neck or head engaging mechanisms, other suitable hardware components, or a combination thereof.

As used herein, the term "enhanced environment" may refer to an enhanced environment in its entirety, at least one aspect of the enhanced environment, more than one aspect of the enhanced environment, or any suitable number of aspects of the enhanced environment.

The term "medical action(s)" may refer to any suitable action performed by the medical professional (e.g., or the healthcare professional), and such action or actions may include diagnoses, prescription of treatment plans, prescription of treatment devices, and the making, composing and/or executing of appointments, telemedicine sessions, prescriptions or medicines, telephone calls, emails, text messages, and the like.

As used herein, the terms "correlate," "correlation," and the like may refer to any suitable correlation or correlative relationship, including a correlation coefficient (e.g., a value indicating an amount of correlation) not equal to zero (e.g., not perfect correlation), or any suitable correlation coefficient.

As used herein, the term "electronic medical record, "EMR," "electronic health record," and/or "EHR" may refer to a record (e.g., one or more documents, one or more database entries, and like) that includes information about a health history of a patient, individual, user, and the like. For example, the EMR may include information associated with one or more of diagnoses, medicines, tests, allergies, immunizations, treatment plans, any suitable characteristics associated with the patient (e.g., patient, individual, user, and the like), any suitable conditions associated with the patient (e.g., patient, individual, user, and the like), and the like.

DETAILED DESCRIPTION

The following discussion is directed to various embodiments of the present disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Determining optimal remote examination procedures to create an optimal treatment plan for a patient having certain characteristics (e.g., vital-sign or other measurements; performance; demographic; psychographic; geographic; diagnostic; measurement- or test-based; medically historic; etiologic; cohort-associative; differentially diagnostic; surgical, physically therapeutic, behavioral, pharmacologic and other treatment(s) recommended; etc.) may be a technically challenging problem. For example, a multitude of information may be considered when determining a treatment plan, which may result in inefficiencies and inaccuracies in the treatment plan selection process. In a rehabilitative setting, some of the multitude of information considered may include characteristics of the patient such as personal information, performance information, and measurement information. The personal information may include, e.g., demographic, psychographic or other information, such as an age, a weight, a gender, a height, a body mass index, a medical condition, a familial medication history, an injury, a medical procedure, a medication prescribed, or some combination thereof. The performance information may include, e.g., an elapsed time of using a treatment device, an amount of force exerted on a portion of the treatment device, a range of motion achieved on the treatment device, a movement speed of a portion of the treatment device, a duration of use of the treatment device, an indication of a plurality of pain levels using the treatment device, or some combination thereof. The measurement information may include, e.g., one or more vital signs of the user, a respiration rate of the user, a heart rate of the user, a temperature of the user, an SpO2-measurement of the blood oxygen level of the user (e.g., oxygen saturation level), a blood pressure of the user, a glucose level of the user, other suitable measurement information of the user, microbiome related data pertaining to the user, or a combination thereof. It may be desirable to process and analyze the characteristics of a multitude of patients, the treatment plans performed for those patients, and the results of the treatment plans for those patients.

Further, another technical problem may involve distally treating, via a computing device during a telemedicine or telehealth session, a patient from a location different than a location at which the patient is located. An additional technical problem is controlling or enabling the control of, from the different location, a treatment device used by the patient at the location at which the patient is located. Oftentimes, when a patient undergoes rehabilitative surgery (e.g., knee surgery), a healthcare professional may prescribe a treatment device to the patient to use to perform a treatment protocol at their residence or any mobile location or temporary domicile. A healthcare professional may refer to a doctor, physician assistant, nurse, chiropractor, dentist, physical therapist, acupuncturist, physical trainer, coach, personal trainer, neurologist, cardiologist, or the like. A healthcare professional may refer to any person with a credential, license, degree, or the like in the field of medicine, physical therapy, rehabilitation, or the like.

When the healthcare professional is located in a different location from the patient and the treatment device, it may be technically challenging for the healthcare professional to monitor the patient's actual progress (as opposed to relying on the patient's word about their progress) using the treatment device, modify the treatment plan according to the patient's progress, adapt the treatment device to the personal characteristics of the patient as the patient performs the treatment plan, and the like. Additionally, or alternatively, the patient may develop one or more conditions, including conditions other than those the patient is being treated for, an increase in severity of one or more conditions that the patient is being treated for, and the like. When the healthcare professional is located in a different location from the patient and the treatment device, it may be difficult for the healthcare professional to assess or identify such conditions and to take appropriate action. Consequently, the patient may become injured or suffer various side effects of the one or more conditions.

Accordingly, systems and methods, such as those described herein, may identify one or more conditions of the patient based on data pertaining to the user. The one or more conditions associated with the user may include at least one of an active orthopedic condition, an incipient orthopedic condition, an active non-orthopedic condition, an incipient non-orthopedic condition, a condition related to an infection, a cardiac-related condition, a neurological-related condition, a condition related to one or more physiological structures in the human body, a condition related to one or more anatomical structures in the human body, or other suitable condition.

In some embodiments, the systems and methods described herein may be configured to, the system and methods described herein may be configured to receive treatment data pertaining to a user using a treatment device to perform a treatment plan. The user may include, without limitation, a patient, individual, or person using the treatment device to perform various exercises. The user may also include a healthcare professional directing the treatment device to be used by the user is using the treatment device to perform various exercises. The treatment plan may include a rehabilitation plan, a prehabilitation plan, an exercise plan, or other suitable treatment plan. The treatment data may include various characteristics of the user, various measurement information pertaining to the user while the user uses the treatment device, various characteristics of the treatment device, the treatment plan, other suitable data, or a combination thereof. In some embodiments, the systems and methods described herein may be configured to receive the treatment data during a telemedicine session.

In some embodiments, the systems and methods described herein may be configured to receiving the treatment data during a telemedicine session. Additionally, or alternatively, the user may use the treatment device during the telemedicine session.

In some embodiments, while the user uses the treatment device to perform the treatment plan, at least some of the treatment data may correspond to sensor data from a sensor configured to sense various characteristics of the treatment device and/or the measurement information of the user. Additionally, or alternatively, while the user uses the treatment device to perform the treatment plan, at least some of the treatment data may correspond to sensor data from a sensor associated with a wearable device configured to sense the measurement information of the user.

The various characteristics of the treatment device may include one or more settings of the treatment device, a current revolutions per time period (e.g., such as one minute) of a rotating member (e.g., such as a wheel) of the treatment device, a resistance setting of the treatment device, other suitable characteristics of the treatment device, or a combination thereof. The measurement information may include one or more vital signs of the user, a respiration rate of the user, a heart rate of the user, a temperature of the user, an SpO2-measurement of the blood oxygen level of the user (e.g., oxygen saturation level), a blood pressure of the user, a glucose level of the user, other suitable measurement information of the user, microbiome related data pertaining to the user, or a combination thereof.

The various performance measurement information may include, while the user uses the treatment device, at least one of a pedal pressure measurement of a first pedal of the treatment device, a pedal rotational angle of the first pedal of the treatment device for a respective pedal pressure measurement, a pedal pressure measurement of a second pedal of the treatment device, a pedal rotational angle of the second pedal of the treatment device for a respective pedal pressure measurement, and/or other suitable performance measurement information.

In some embodiments, the systems and methods described herein may be configured to receive activity data (e.g., URD) pertaining to the user while the user engages in at least one activity. The activity data may include at least baseline data (e.g., or previously captured or measured data) for the user during engagement, by the user, in at least one activity. The at least one activity may include walking, running, climbing, jumping, cycling, throwing, rolling, squatting, swimming, rowing, any other suitable activity or exercise, or a combination thereof (e.g., including assisted activities (e.g., such as using a treadmill and the like) or unassisted activities). In some embodiments, the at least one activity may include at least one activity that the user previously engaged in while using the treatment device. In some embodiments, the at least one activity may include at least one activity that the user previously engaged in while not using the treatment device.

In some embodiments, while the user engages in the at least one activity, at least some of the activity data may correspond to at least some sensor data of a sensor configured to sense various characteristics of the treatment device and/or to obtain the measurement information from the user. Additionally, or alternatively, while the user engages in the at least one activity, at least some of the activity data may correspond to at least some sensor data from a sensor associated with a wearable device or other sensing or Internet of Things (IoT) device (which may be near the user but not worn by the user) configured to measure, determine, or obtain the measurement information associated with the user. That sensor may include a pedometer, a goniometer, another suitable sensor, or a combination thereof.

In some embodiments, the various measurement information of the activity data may include one or more vital signs of the user, a respiration rate of the user, a heart rate of the user, a temperature of the user, an SpO2-measurement of the blood oxygen level of the user (e.g., oxygen saturation level), a blood pressure of the user, a glucose level of the user, a number of steps traversed by the user, a walking pace of the user, a running pace of the user, a jumping pace of the user, a climbing pace of the user, an angle of rotation of at least one portion of an anatomy of the user (e.g., an ankle, a knee, a hip, a vertebrae, a neck, a wrist, an elbow, a shoulder, and/or other suitable portion of the anatomy), another suitable measurement information of the user, microbiome related data pertaining to the user, or a combination thereof "Pace," as used herein, may mean a cadence, a rate, a speed, or another countable or measurable metric.

In some embodiments, the systems and methods described herein may be configured to generate treatment information using the treatment data, the activity data, or a combination thereof. The treatment information may include a summary of the performance of the treatment plan by the user while using the treatment device, wherein the treatment information is configured such that the treatment data is presentable to a healthcare professional.

Additionally, or alternatively, treatment information may include a summary of the performance by the user while the user engages in the at least one activity, wherein the treatment information is configured such that the treatment data is presentable to the healthcare professional.

In some embodiments, the systems and methods described herein may be configured to generate, using at least one aspect of the treatment data and at least one aspect of the URD, delta information pertaining to the user. The delta information may include at least one difference between the at least one aspect of the treatment data and the at least one aspect of the URD.

For example, the systems and methods described herein may be configured to compare the at least one aspect of the treatment data to the at least one aspect of the URD. The at least one aspect of the treatment data may include, for example, a pedal pressure measurement that may correspond to a pressure applied, during a telemedicine session or other suitable use of the treatment device, by the user to a first pedal of the treatment device. The at least one aspect of the URD may include a pedal pressure measurement that may correspond to a pressure applied by the user to the first pedal of the treatment device. The pedal pressure measurement may include a pedal pressure measurement applied, by the user to the first pedal of the treatment device, during a previous use of the treatment device; an average pedal pressure measurement applied, by the user to the first pedal of the treatment device, over a number of previous uses of the treatment device; or other suitable pedal pressure measurement. The systems and methods described herein may be configured to determine a difference between the pedal pressure measurement corresponding to the at least one aspect of the treatment data and the pedal pressure measurement corresponding to the at least one aspect of the URD. The systems and methods described herein may be configured to generate the delta information based on the difference between the at least one aspect of the treatment data and the at least one aspect of the URD.

In some embodiments, the systems and methods described herein may be configured to generate treatment information that includes at least one of at least one aspect of the treatment data and at least one aspect of the delta information. The treatment information may include a summary of the performance of the treatment plan by the user while using the treatment device, wherein the summary is formatted such that the treatment data and the delta information are capable of being presented at a computing device of a healthcare professional responsible for the enabling the performance of the treatment plan by the user.

The healthcare professional may include an individual associated with a healthcare professional (e.g., referred to herein as the "healthcare professional") responsible for the performance of the treatment plan by the user. The treatment information may be configured such that it is presentable at a computing device of the healthcare professional. The healthcare professional may include a medical professional (e.g., such as a doctor, a nurse, a therapist, and the like), an exercise professional (e.g., such as a coach, a trainer, a nutritionist, and the like), or another professional sharing at least one of medical and exercise attributes (e.g., such as an exercise physiologist, a physical therapist, an occupational therapist, and the like). As used herein, and without limiting the foregoing, a "healthcare professional" may be a human being, a robot, a virtual assistant, a virtual assistant in a virtual and/or augmented reality, or an artificially intelligent entity, including a software program, integrated software and hardware, or hardware alone. Additionally, or alternatively, as used herein, the healthcare professional may refer to an individual associated with the healthcare professional, a group of individuals associated with the healthcare professional, or other entity (e.g., corporate entity and the like) associated with the healthcare professional.

In some embodiments, the healthcare professional may include an artificial intelligence engine configured to use at least one machine learning model that analyzes the treatment information and generates, using the treatment information, treatment plan input. The artificial intelligence engine may be disposed on the treatment device, a remotely located server computing device, the computing device of a healthcare professional, or a combination thereof. The artificial intelligence engine may include any suitable artificial intelligence engine, including those described herein. The at least one machine learning model may include any suitable machine learning model, including those described here. For example, the at least one machine learning model may include a deep network comprising multiple levels of non-linear operations or other suitable model.

In some embodiments, the artificial intelligence engine may use the machine learning model to generate, using the treatment data and the activity data, at least one output indicating at least a treatment progress of the user. The artificial intelligence engine may use the machine learning model to generate, using the at least one output, the treatment information, described herein. The systems and methods described herein may be configured to receive, from the artificial intelligence engine, the treatment information.

In some embodiments, the healthcare professional may include a human healthcare professional, the artificial intelligence engine, or a combination thereof. In some embodiments, the healthcare professional may include a computing system and/or entity (e.g. either human, robotic, or other suitable entity), in addition to or other than those described herein.

The treatment data may be presented to the user via the user's computing device, which may enable the user to better understand the user's own progress, performance, and future goals. Further, presenting the treatment data to the user may motivate the user to continue to perform the treatment plan. In some embodiments, presenting the treatment data to the user may specify a problem of the treatment plan and/or non-compliance with the treatment plan, such that the problem and/or non-compliance may be subsequently addressed.

In some embodiments, the systems and methods described herein may be configured to write to an associated memory, for access by the healthcare professional, the treatment information. For example, the systems and methods described herein may be configured to write to the associated memory, for access at the computing device of the healthcare professional, and/or provide, at the computing device of the healthcare professional, the treatment information. For example, the systems and methods describe herein may be configured to provide the treatment information to an interface configured to present the treatment information to the healthcare professional. It should be understood that, in some embodiments, the systems and methods described herein may be configured to write to the associated memory, for access at the computing device, one or more aspects of the delta information, one or more aspects of the treatment data, one or more aspects of the treatment information, or any combination thereof.

The interface may include a graphical user interface configured to provide the treatment information and receive input from the healthcare professional. The interface may include one or more interface mechanisms, such as text input fields, dropdown selection input fields, radio button input fields, virtual switch input fields, virtual lever input fields, audio mechanisms, haptic mechanisms, tactile mechanisms, biometric gesture recognition mechanisms, gesture controls, touchless user interfaces (TUIs), kinetic user interfaces (KUIs), tangible user interfaces, wired gloves, depth-aware cameras, stereo cameras, gesture-based controllers, or otherwise activated and/or driven input fields, other suitable input fields, or a combination thereof.

In some embodiments, the healthcare professional may review the treatment information and determine whether to modify the treatment plan and/or one or more characteristics of the treatment device. For example, the healthcare professional may review the treatment information and compare the treatment information to the treatment plan being performed by the user. Additionally, or alternatively, the healthcare professional may compare at least one aspect of the activity data (e.g., indicated by the treatment information) to the treatment plan.

The healthcare professional may compare the following to each other: (i) expected information, which pertains to the user while the user uses the treatment device to perform the treatment plan and (ii) the measurement information (e.g., including the measurement information of the treatment data and/or the measurement information of the activity data, indicated by the treatment information) which pertains to the user while the user uses the treatment device to perform the treatment plan and/or while the user engages in the at least one activity. The expected information may include one or more vital signs of the user, a respiration rate of the user, a heart rate of the user, a temperature of the user, a blood pressure of the user, a number of steps traversed by the user, a walking pace of the user, a running pace of the user, a climbing pace of the user, a jumping pace, a squatting pace, a rowing pace, a cycling pace, a swimming pace, an angle of rotation of at least one portion of an anatomy of the user (e.g., an ankle, a knee, a hip, a vertebrae, a neck, a wrist, an elbow, a shoulder, and/or other suitable portion of the anatomy), other suitable information of the user, or a combination thereof.

The healthcare professional may determine that the treatment plan is having the desired effect if one or more parts or portions of the measurement information (e.g., of the treatment data and/or of the activity data) are within an acceptable range associated with one or more corresponding parts or portions of the expected information. Conversely, the healthcare professional may determine that the treatment plan is not having the desired effect if one or more parts or portions of the measurement information (e.g., of the treatment data and/or of the activity data) are outside of the range associated with one or more corresponding parts or portions of the expected information.

For example, the healthcare professional may determine whether a blood pressure value (e.g., systolic pressure, diastolic pressure, and/or pulse pressure) corresponding to the user while the user uses the treatment device (e.g., indicated by the measurement information) is within an acceptable range (e.g., plus or minus 1%, plus or minus 5%, plus or minus a particular number of units suitable for the measurement (e.g., actual or digitally equivalent column inches of mercury for blood pressure, and the like, or any suitable range) of an expected blood pressure value indicated by the expected information. The healthcare professional may determine that the treatment plan is having the desired effect if the blood pressure value corresponding to the user while the user uses the treatment device is within the range of the expected blood pressure value. Conversely, the healthcare professional may determine that the treatment plan is not having the desired effect if the blood pressure value corresponding to the user while the user uses the treatment device is outside of the range of the expected blood pressure value.

Additionally, or alternatively, the healthcare professional may determine whether an angle of rotation of a knee corresponding to the user while the user engages in the at least one activity (e.g., indicated by the activity data) is within an acceptable range (e.g., plus or minus 1%, plus or minus 5%, plus or minus a particular number of units suitable for the measurement or any suitable range) of an expected angle of rotation of a knee. The expected angle of rotation of the knee may correspond to an expected angle of rotation of a knee of another user while engaging in the at least one activity or an activity similar to the at least one activity, the other user having similar characteristics to the user. The healthcare professional may determine that the treatment plan is having the desired effect if the angle of rotation of the knee corresponding to the user while the user engages in the at least one activity is within the range of the expected angle of rotation of the knee. Conversely, the healthcare professional may determine that the treatment plan is not having the desired effect if the angle of rotation of the knee corresponding to the user while the user engages in the at least one activity is outside the range of the expected angle of rotation of the knee.

In some embodiments, the healthcare professional may compare the expected characteristics of the treatment device while the user uses the treatment device to perform the treatment plan with characteristics of the treatment device indicated by the treatment information. For example, the healthcare professional may compare an expected resistance setting of the treatment device with an actual resistance setting of the treatment device indicated by the treatment information. The healthcare professional may determine that the user is performing the treatment plan properly if the actual characteristics of the treatment device indicated by the treatment information are within a range of corresponding ones of the expected characteristics of the treatment device. Conversely, the healthcare professional may determine that the user is not performing the treatment plan properly if the actual characteristics of the treatment device indicated by the treatment information are outside the range of corresponding ones of the expected characteristics of the treatment device.

In some embodiments, the healthcare professional may review the treatment information and determine whether the treatment information indicates a condition (e.g., in addition to the one or more conditions for which the user is being treated and/or an increase or change in severity of one or more of the conditions for which the user is being treated). For example, the healthcare professional may review the treatment information, including the delta information, and compare the treatment information to one or more anticipated, predicted or expected values, to treatment information pertaining to one or more other users, and/or to other suitable information or values.

The healthcare professional may compare at least one aspect of the delta information to an expected range corresponding to the at least one aspect of the delta information. For example, the at least one aspect of the delta information may indicate a deviation of a pedal pressure measurement of the treatment data from a baseline pedal pressure measurement (e.g., of the URD). It should be understood that, while an example of a pedal pressure measurement is described herein, the delta information may indicate one or more deviations of any suitable information of the treatment data from any corresponding information of the URD. The expected range may be associated with a range of pedal pressure measurement deviations (e.g., in the treatment data of the user) from the pedal pressure measurements of the URD. The expected range may be selected or configured based on various characteristics of the user, various characteristics of the treatment device, various aspects of the treatment plan, and the like. The healthcare professional may determine whether the deviation of the pedal pressure measurement of the delta information is within the expected range.

If the healthcare professional determines that the treatment information indicates that the user is performing the treatment plan properly and/or that the treatment plan is having the desired effect (e.g., by analyzing the performance of the user while the user engages in the at least one activity and/or while the user uses the treatment device), the healthcare professional may determine not to modify the treatment plan or the one or more characteristics of the treatment device. Conversely, if the healthcare professional determines that the treatment information indicates that the user is not or has not been performing the treatment plan properly and/or that the treatment plan is not or has not been having the desired effect (e.g., by analyzing the performance of the user while the user engages in the at least one activity and/or while the user uses the treatment device), the healthcare professional may determine to modify the treatment plan and/or the one or more characteristics of the treatment device.

In some embodiments, if the healthcare professional determines to modify the treatment plan and/or the one or more characteristics of the treatment device, the healthcare professional may interact with the interface to provide treatment plan input indicating one or more modifications to the treatment plan and/or to one or more characteristics of the treatment device. For example, the healthcare professional may use the interface to provide input indicating an increase or decrease in the resistance setting of the treatment device or other suitable modification to the one or more characteristics of the treatment device. Additionally, or alternatively, the healthcare professional may use the interface to provide input indicating a modification to the treatment plan. For example, the healthcare professional may use the interface to provide input indicating an increase or decrease in an amount of time the user is required to use the treatment device according to the treatment plan, or other suitable modifications to the treatment plan.

In some embodiments, the systems and methods described herein may be configured to write to the associated memory for access by the artificial intelligence engine and/or provide to the artificial intelligence engine, the treatment information. The artificial intelligence engine may use the machine learning model to generate, using the treatment information (e.g., including the treatment data and/or the activity data), at least one treatment progress prediction. As used herein, a "treatment progress prediction" refers to output generated by the machine learning model and/or the artificial intelligence engine. The treatment progress prediction may include a probabilistic prediction (using, for example and without limitation, parametric, non-parametric, Bayesian and/or Markovian probabilistic methods), a stochastic prediction (using, for example and without limitation, non-deterministic finite state automata), or a deterministic prediction (using, for example and without limitation, finite state automata).

In some embodiments, the artificial intelligence engine may be configured to use the at least one machine learning model to generate, further using treatment progress information associated with other users, the at least one treatment progress prediction. At least some of the other users may be associated with a cohort to which the user belongs; alternatively, all of the other users may be associated with the cohort to which the user belongs; further alternatively, the other users may be associated with other cohorts; or the other users may not be associated with cohorts. In some embodiments, the other users may have characteristics similar to those of the user. In some embodiments, measurements pertaining to the other users may include measurements similar to the at least one measurement pertaining to the user.

In some embodiments, the systems and methods described herein may be configured to receive, from the artificial intelligence engine, the at least one treatment progress prediction. The systems and methods described herein may be configured to provide the at least one treatment plan prediction at the interface of the computing device of the healthcare professional. The healthcare professional may analyze the treatment plan prediction and generate the treatment input, as described.

Additionally, or alternatively, the artificial intelligence engine may be configured to use the machine learning model to generate, using the treatment progress prediction, the treatment plan input. The systems and methods described herein may be configured to receive, from the artificial intelligence engine, the treatment plan input.

In some embodiments, the systems and methods described herein may be configured to modify, in response to receiving from the healthcare professional treatment plan input, including at least one modification to the at least one aspect of the treatment plan, the treatment plan, wherein the configuration is based on one or more modifications indicated by the treatment plan input. Additionally, or alternatively, the systems and methods described herein may be configured to modify the one or more characteristics of the treatment device based on the modified treatment plan and/or the treatment plan input. For example, the treatment plan input may indicate that the one or more characteristics of the treatment device should be modified and/or the modified treatment plan may require or indicate adjustments to the treatment device in order for the user to achieve the desired results of the modified treatment plan.

The healthcare professional may receive and/or review treatment information continuously or periodically while the user uses the treatment device to perform the treatment plan. Based on one or more trends indicated by the continuously and/or periodically received treatment information, the healthcare professional may determine whether to modify the treatment plan and/or control the one or more characteristics of the treatment device. For example, the one or more trends may indicate an increase in heart rate or other suitable trends, and the trend indication(s) or trends' indications may themselves indicate that the user is not performing the treatment plan properly and/or that the performance of the treatment plan by the user is not having the desired effect.

In some embodiments, during an adaptive telemedicine session, the systems and methods described herein may be configured to use artificial intelligence and/or machine learning to assign patients to cohorts and to dynamically control a treatment device based on the assignment. The term "adaptive telemedicine" may refer to a telemedicine session dynamically adapted based on one or more factors, criteria, parameters, characteristics, or the like. The one or more factors, criteria, parameters, characteristics, or the like may pertain to the user (e.g., heart rate, blood pressure, perspiration rate, pain level, or the like), the treatment device (e.g., pressure, range of motion, speed of motor, etc.), details of the treatment plan, and so forth.

In some embodiments, some number of patients may be prescribed some number of treatment devices because the number of patients are recovering from the same medical procedure and/or suffering from the same injury. The number of treatment devices may be provided to the number of patients. The treatment devices may be used by the patients to perform treatment plans in their residences, at gyms, at rehabilitative centers, at hospitals, or at any suitable locations, including permanent or temporary domiciles.

In some embodiments, the treatment devices may be communicatively coupled to a server. Characteristics of the patients, including the treatment data, may be collected before, during, and/or after the patients perform the treatment plans. For example, the personal information, the performance information, and the measurement information may be collected before, during, and/or after the person performs the treatment plans. The results (e.g., improved performance or decreased performance) of performing each exercise may be collected from the treatment device throughout the treatment plan and after the treatment plan is performed. The parameters, settings, configurations, etc. (e.g., position of pedal, amount of resistance, etc.) of the treatment device may be collected before, during, and/or after the treatment plan is performed.

Each characteristic of the patient, each result, and each parameter, setting, configuration, etc. may be timestamped and may be correlated with a particular step or set of steps in the treatment plan. Such a technique may enable determining of which steps in the treatment plan lead to desired results (e.g., improved muscle strength, range of motion, etc.) and which steps lead to diminishing returns (e.g., continuing to exercise after 3 minutes actually delays or harms recovery).

Data may be collected from the treatment devices and/or any suitable computing device (e.g., computing devices where personal information is entered, such as the interface of the computing device described herein, a clinician interface, patient interface, and the like) over time as the patients use the treatment devices to perform the various treatment plans. The data that may be collected may include the characteristics of the patients, the treatment plans performed by the patients, the results of the treatment plans, any of the data described herein, any other suitable data, or a combination thereof.

In some embodiments, the data may be processed to group certain people into cohorts. The people may be grouped by people having certain or selected similar characteristics, treatment plans, and results of performing the treatment plans. For example, athletic people having no medical conditions who perform a treatment plan (e.g., use the treatment device for 30 minutes a day 5 times a week for 3 weeks) and who fully recover may be grouped into a first cohort. Older people who are classified as obese and who perform a treatment plan (e.g., use the treatment plan for 10 minutes a day 3 times a week for 4 weeks) and who improve their range of motion by 75 percent may be grouped into a second cohort.

In some embodiments, an artificial intelligence engine may include one or more machine learning models that are trained using the cohorts. In some embodiments, the artificial intelligence engine may be used to identify trends and/or patterns and to define new cohorts based on achieving desired results from the treatment plans; and machine learning models associated therewith may be trained to identify such trends and/or patterns and to recommend and rank the desirability of the new cohorts. For example, the one or more machine learning models may be trained to receive an input of characteristics of a new patient and to output a treatment plan for the patient that results in a desired result. The machine learning models may match a pattern between certain of the characteristics of the new patient and at least one patient of the patients included in a particular cohort. When a pattern is matched, the machine learning models may assign the new patient to the particular cohort and select the treatment plan associated with the at least one patient. While the new patient uses the treatment device to perform the treatment plan, the artificial intelligence engine may be configured to control, distally and based on the treatment plan, the treatment device.

As may be appreciated, the characteristics of the new patient (e.g., a new user) may change as the new patient uses the treatment device to perform the treatment plan. For example, the performance of the patient may improve quicker than expected for people in the cohort to which the new patient is currently assigned. Accordingly, the machine learning models may be trained to dynamically reassign, based on the changed characteristics, the new patient to a different cohort that includes people having characteristics similar to the now-changed characteristics as the new patient. For example, a clinically obese patient may lose weight and no longer meet the weight criterion for the initial cohort, result in the patient's being reassigned to a different cohort with a different weight criterion.

A different treatment plan may be selected for the new patient, and the treatment device may be controlled distally (e.g., which may be referred to as remotely) and based on the different treatment plan, the treatment device while the new patient uses the treatment device to perform the treatment plan. Such techniques may provide the technical solution of distally controlling a treatment device.

Further, the systems and methods described herein may lead to faster recovery times and/or better results for the patients because the treatment plan that most accurately fits their characteristics is selected and implemented, in real-time, at any given moment. "Real-time" may also refer to near real-time, which may be less than 10 seconds. As described herein, the term "results" may refer to medical results or medical outcomes. Results and outcomes may refer to responses to medical actions.

Depending on what result is desired, the artificial intelligence engine may be trained to output several treatment plans. For example, one result may include recovering to a threshold level (e.g., 75% range of motion) in a fastest amount of time, while another result may include fully recovering (e.g., 100% range of motion) regardless of the amount of time. The data obtained from the patients and sorted into cohorts may indicate that a first treatment plan provides the first result for people with characteristics similar to the patient's, and that a second treatment plan provides the second result for people with characteristics similar to the patient.

Further, the artificial intelligence engine may be trained to output treatment plans that are not optimal i.e., sub-optimal, nonstandard, or otherwise excluded (all referred to, without limitation, as "excluded treatment plans") for the patient. For example, if a patient has high blood pressure (e.g., hypertension), a particular exercise may not be approved or suitable for the patient as it may put the patient at unnecessary risk or even induce a hypertensive crisis and, accordingly, that exercise may be flagged in the excluded treatment plan for the patient. In some embodiments, the artificial intelligence engine may monitor the treatment data received while the patient (e.g., the user) with, for example, high blood pressure, uses the treatment device to perform an appropriate treatment plan; and the artificial intelligence engine may further modify the appropriate treatment plan to include features of an excluded treatment plan, wherein the excluded treatment plan may provide beneficial results for the patient if the treatment data indicates the patient is handling the appropriate treatment plan without aggravating, for example, the high blood pressure condition of the patient. In some embodiments, the artificial intelligence engine may modify the treatment plan if the monitored data shows the plan to be inappropriate or counterproductive for the user.

In some embodiments, the treatment plans and/or excluded treatment plans may be presented, during a telemedicine or telehealth session, to a healthcare professional. The healthcare professional may select a particular treatment plan for the patient to cause that treatment plan to be transmitted to the patient and/or to control, based on the treatment plan, the treatment device. In some embodiments, to facilitate telehealth or telemedicine applications, including remote diagnoses, determination of treatment plans and rehabilitative and/or pharmacologic prescriptions, the artificial intelligence engine may receive and/or operate distally from the patient and the treatment device.

In such cases, during a telemedicine session on a user interface of a computing device of a healthcare professional, the recommended treatment plans and/or excluded treatment plans may be presented simultaneously with a video of the patient in real-time or near real-time. The video may also be accompanied by audio, text and other multimedia information. Real-time may refer to less than or equal to 2 seconds. Real-time may also refer to near real-time, which may be less than 10 seconds or any reasonably proximate difference between two different times. Additionally, or alternatively, near real-time may refer to any interaction of a sufficiently short time to enable two individuals to engage in a dialogue via such user interface and will generally be less than 10 seconds but greater than 2 seconds.

Presenting the treatment plans generated by the artificial intelligence engine concurrently with a presentation of the patient video may provide an enhanced user interface because, while also reviewing the treatment plans on the same user interface, the healthcare professional may continue to visually and/or otherwise communicate with the patient. The enhanced user interface may improve the healthcare professional's experience using the computing device and may encourage the healthcare professional to reuse the user interface. Such a technique may also reduce computing resources (e.g., processing, memory, network) because, based on the characteristics of the patient, the healthcare professional does not have to switch to another user interface screen to enter a query for a treatment plan to recommend. The artificial intelligence engine may be configured to provide, dynamically on the fly, the treatment plans and excluded treatment plans.

In some embodiments, the treatment device may be adaptive and/or personalized because its properties, configurations, and positions may be adapted to the needs of a particular patient. For example, the pedals may be dynamically adjusted on the fly (e.g., via a telemedicine session or based on programmed configurations in response to certain measurements being detected) to increase or decrease a range of motion to comply with a treatment plan designed for the user. In some embodiments, by causing a control instruction to be transmitted from a server to a treatment device, a healthcare professional may adapt, remotely during a telemedicine session, the treatment device to the needs of the patient. Such adaptive nature may improve the results of recovery for a patient, furthering the goals of personalized medicine, and enabling personalization of the treatment plan on a per-individual basis.

A technical problem may occur which relates to the information pertaining to the patient's medical condition being received in disparate formats. For example, a server may receive the information pertaining to a medical condition of the patient from one or more sources (e.g., from an electronic medical record (EMR) system, application programming interface (API), or any suitable system that has information pertaining to the medical condition of the patient). That is, some sources used by various healthcare professionals may be installed on local computing devices of the healthcare professionals and may use proprietary formats. Accordingly, some embodiments of the present disclosure may use an API to obtain, via interfaces exposed by APIs used by the sources, the formats used by the sources. In some embodiments, when information is received from the sources, the API may map, translate and/or convert the format used by the sources to a standardized format used by the artificial intelligence engine. Further, the information mapped, translated and/or converted to the standardized format used by the artificial intelligence engine may be stored in a database accessed by the artificial intelligence engine when performing any of the techniques disclosed herein. Using the information mapped, translated and/or converted to a standardized format may enable the more accurate determination of the procedures to perform for the patient and/or more accurate determination of a billing sequence.

To that end, the standardized information may enable the generation of treatment plans and/or billing sequences having a particular format configured to be processed by various applications (e.g., telehealth). For example, applications, such as telehealth applications, may be executing on various computing devices of medical professionals and/or patients. The applications (e.g., standalone or web-based on mobile devices or other suitable computing devices) may be provided by a server and may be configured to process data according to a format in which the treatment plans are implemented. Accordingly, the disclosed embodiments may provide a technical solution by (i) receiving, from various sources (e.g., EMR systems), information in non-standardized and/or different formats; (ii) standardizing the information; and (iii) generating, based on the standardized information, treatment plans having standardized formats capable of being processed by applications (e.g., telehealth applications) executing on computing devices of medical professional and/or patients.

FIG. 1 generally illustrates a block diagram of a computer-implemented system 10, hereinafter called "the system" for managing a treatment plan. Managing the treatment plan may include using an artificial intelligence engine to recommend treatment plans and/or provide excluded treatment plans that should not be recommended to a patient.

The system 10 also includes a server 30 configured to store (e.g., write to an associated memory) and to provide data related to managing the treatment plan. The server 30 may include one or more computers and may take the form of a distributed and/or virtualized computer or computers. The server 30 also includes a first communication interface 32 configured to communicate with the clinician interface 20 via a first network 34. In some embodiments, the first network 34 may include wired and/or wireless network connections such as Wi-Fi, Bluetooth, ZigBee, Near-Field Communications (NFC), cellular data network, etc. The server 30 includes a first processor 36 and a first machine-readable storage memory 38, which may be called a "memory" for short, holding first instructions 40 for performing the various actions of the server 30 for execution by the first processor 36.

The server 30 is configured to store data regarding the treatment plan. For example, the memory 38 includes a system data store 42 configured to hold system data, such as data pertaining to treatment plans for treating one or more patients. The server 30 is also configured to store data regarding performance by a patient in following a treatment plan. For example, the memory 38 includes a patient data store 44 configured to hold patient data, such as data pertaining to the one or more patients, including data representing each patient's performance within the treatment plan.

Additionally, or alternatively, the characteristics (e.g., personal, performance, measurement, etc.) of the people, the treatment plans followed by the people, the level of compliance with the treatment plans, and the results of the treatment plans may use correlations and other statistical or probabilistic measures to enable the partitioning of or to partition the treatment plans into different patient cohort-equivalent databases in the patient data store 44. For example, the data for a first cohort of first patients having a first similar injury, a first similar medical condition, a first similar medical procedure performed, a first treatment plan followed by the first patient, and a first result of the treatment plan may be stored in a first patient database. The data for a second cohort of second patients having a second similar injury, a second similar medical condition, a second similar medical procedure performed, a second treatment plan followed by the second patient, and a second result of the treatment plan may be stored in a second patient database. Any single characteristic or any combination of characteristics may be used to separate the cohorts of patients. In some embodiments, the different cohorts of patients may be stored in different partitions or volumes of the same database. There is no specific limit to the number of different cohorts of patients allowed, other than as limited by mathematical combinatoric and/or partition theory.

This characteristic data, treatment plan data, and results data may be obtained from some number of treatment devices and/or computing devices over time and stored in the database 44. The characteristic data, treatment plan data, and results data may be correlated in the patient-cohort databases in the patient data store 44. The characteristics of the people may include personal information, performance information, and/or measurement information.

In addition to the historical information about other people stored in the patient cohort-equivalent databases, real-time or near-real-time information based on the current patient's characteristics about a current patient being treated may be stored in an appropriate patient cohort-equivalent database. The characteristics of the patient may be determined to match or be similar to the characteristics of another person in a particular cohort (e.g., cohort A) and the patient may be assigned to that cohort.

In some embodiments, the server 30 may execute an artificial intelligence (AI) engine 11 that uses one or more machine learning models 13 to perform at least one of the embodiments disclosed herein. The server 30 may include a training engine 9 capable of generating the one or more machine learning models 13. The machine learning models 13 may be trained to assign people to certain cohorts based on their characteristics, select treatment plans using real-time and historical data correlations involving patient cohort-equivalents, and control a treatment device 70, among other things.

The one or more machine learning models 13 may be generated by the training engine 9 and may be implemented in computer instructions executable by one or more processing devices of the training engine 9 and/or the servers 30. To generate the one or more machine learning models 13, the training engine 9 may train the one or more machine learning models 13. The one or more machine learning models 13 may be used by the artificial intelligence engine 11.

The training engine 9 may be a rackmount server, a router computer, a personal computer, a portable digital assistant, a smartphone, a laptop computer, a tablet computer, a netbook, a desktop computer, an Internet of Things (IoT) device, any other suitable computing device, or a combination thereof. The training engine 9 may be cloud-based or a real-time software platform, and it may include privacy software or protocols, and/or security software or protocols.

To train the one or more machine learning models 13, the training engine 9 may use a training data set of a corpus of the characteristics of the people that used the treatment device 70 to perform treatment plans, the details (e.g., treatment protocol including exercises, amount of time to perform the exercises, how often to perform the exercises, a schedule of exercises, parameters/configurations/settings of the treatment device 70 throughout each step of the treatment plan, etc.) of the treatment plans performed by the people using the treatment device 70, and the results of the treatment plans performed by the people. The one or more machine learning models 13 may be trained to match patterns of characteristics of a patient with characteristics of other people assigned to a particular cohort. The term "match" may refer to an exact match, a correlative match, a substantial match, etc. The one or more machine learning models 13 may be trained to receive the characteristics of a patient as input, map the characteristics to characteristics of people assigned to a cohort, and select a treatment plan from that cohort. The one or more machine learning models 13 may also be trained to control, based on the treatment plan, the machine learning apparatus 70. The one or more machine learning models 13 may also be trained to provide one or more treatment plans options to a healthcare provider to select from to control the treatment device 70.

Different machine learning models 13 may be trained to recommend different treatment plans for different desired results. For example, one machine learning model may be trained to recommend treatment plans for most effective recovery, while another machine learning model may be trained to recommend treatment plans based on speed of recovery.

Using training data that includes training inputs and corresponding target outputs, the one or more machine learning models 13 may refer to model artifacts created by the training engine 9. The training engine 9 may find patterns in the training data wherein such patterns map the training input to the target output, and generate the machine learning models 13 that capture these patterns. In some embodiments, the artificial intelligence engine 11, the database 33, and/or the training engine 9 may reside on another component (e.g., assistant interface 94, clinician interface 20, etc.) depicted in FIG. 1.

The one or more machine learning models 13 may comprise, e.g., a single level of linear or non-linear operations (e.g., a support vector machine [SVM]) or the machine learning models 13 may be a deep network, i.e., a machine learning model comprising multiple levels of non-linear operations. Examples of deep networks are neural networks including generative adversarial networks, convolutional neural networks, recurrent neural networks with one or more hidden layers, and fully connected neural networks (e.g., each neuron may transmit its output signal to the input of the remaining neurons, as well as to itself). For example, the machine learning model may include numerous layers and/or hidden layers that perform calculations (e.g., dot products) using various neurons.

The system 10 also includes a patient interface 50 configured to communicate information to a patient and to receive feedback from the patient. Specifically, the patient interface includes an input device 52 and an output device 54, which may be collectively called a patient user interface 52, 54. The input device 52 may include one or more devices, such as a keyboard, a mouse, a touch screen input, a gesture sensor, and/or a microphone and processor configured for voice recognition. The output device 54 may take one or more different forms including, for example, a computer monitor or display screen on a tablet, smartphone, or a smart watch. The output device 54 may include other hardware and/or software components such as a projector, virtual reality capability, augmented reality capability, etc. The output device 54 may incorporate various different visual, audio, or other presentation technologies. For example, the output device 54 may include a non-visual display, such as an audio signal, which may include spoken language and/or other sounds such as tones, chimes, and/or melodies, which may signal different conditions and/or directions. The output device 54 may comprise one or more different display screens presenting various data and/or interfaces or controls for use by the patient. The output device 54 may include graphics, which may be presented by a web-based interface and/or by a computer program or application (App.). In some embodiments, the patient interface 50 may include functionality provided by or similar to existing voice-based assistants such as Siri by Apple, Alexa by Amazon, Google Assistant, or Bixby by Samsung.

As is generally illustrated in FIG. 1, the patient interface 50 includes a second communication interface 56, which may also be called a remote communication interface configured to communicate with the server 30 and/or the clinician interface 20 via a second network 58. In some embodiments, the second network 58 may include a local area network (LAN), such as an Ethernet network. In some embodiments, the second network 58 may include the Internet, and communications between the patient interface 50 and the server 30 and/or the clinician interface 20 may be secured via encryption, such as, for example, by using a virtual private network (VPN). In some embodiments, the second network 58 may include wired and/or wireless network connections such as Wi-Fi, Bluetooth, ZigBee, Near-Field Communications (NFC), cellular data network, etc. In some embodiments, the second network 58 may be the same as and/or operationally coupled to the first network 34.

The patient interface 50 includes a second processor 60 and a second machine-readable storage memory 62 holding second instructions 64 for execution by the second processor 60 for performing various actions of patient interface 50. The second machine-readable storage memory 62 also includes a local data store 66 configured to hold data, such as data pertaining to a treatment plan and/or patient data, such as data representing a patient's performance within a treatment plan. The patient interface 50 also includes a local communication interface 68 configured to communicate with various devices for use by the patient in the vicinity of the patient interface 50. The local communication interface 68 may include wired and/or wireless communications. In some embodiments, the local communication interface 68 may include a local wireless network such as Wi-Fi, Bluetooth, ZigBee, Near-Field Communications (NFC), cellular data network, etc.

The system 10 also includes a treatment device 70 configured to be manipulated by the patient and/or to manipulate a body part of the patient for performing activities according to the treatment plan. In some embodiments, the treatment device 70 may take the form of an exercise and rehabilitation apparatus configured to perform and/or to aid in the performance of a rehabilitation regimen, which may be an orthopedic rehabilitation regimen, and the treatment includes rehabilitation of a body part of the patient, such as a joint or a bone or a muscle group. The treatment device 70 may be any suitable medical, rehabilitative, therapeutic, etc. apparatus configured to be controlled distally via another computing device to treat a patient and/or exercise the patient. The treatment device 70 may be an electromechanical machine including one or more weights, an electromechanical bicycle, an electromechanical spin-wheel, a smart-mirror, a treadmill, an interactive environment system, or the like. The body part may include, for example, a spine, a hand, a foot, a knee, or a shoulder. The body part may include a part of a joint, a bone, or a muscle group, such as one or more vertebrae, a tendon, or a ligament. As is generally illustrated in FIG. 1, the treatment device 70 includes a controller 72, which may include one or more processors, computer memory, and/or other components. The treatment device 70 also includes a fourth communication interface 74 configured to communicate with the patient interface 50 via the local communication interface 68. The treatment device 70 also includes one or more internal sensors 76 and an actuator 78, such as a motor. The actuator 78 may be used, for example, for moving the patient's body part and/or for resisting forces by the patient.

The internal sensors 76 may measure one or more operating characteristics of the treatment device 70 such as, for example, a force a position, a speed, and/or a velocity. In some embodiments, the internal sensors 76 may include a position sensor configured to measure at least one of a linear motion or an angular motion of a body part of the patient. For example, an internal sensor 76 in the form of a position sensor may measure a distance that the patient is able to move a part of the treatment device 70, where such distance may correspond to a range of motion that the patient's body part is able to achieve. In some embodiments, the internal sensors 76 may include a force sensor configured to measure a force applied by the patient. For example, an internal sensor 76 in the form of a force sensor may measure a force or weight the patient is able to apply, using a particular body part, to the treatment device 70.

The system 10 generally illustrated in FIG. 1 also includes an ambulation sensor 82, which communicates with the server 30 via the local communication interface 68 of the patient interface 50. The ambulation sensor 82 may track and store a number of steps taken by the patient. In some embodiments, the ambulation sensor 82 may take the form of a wristband, wristwatch, or smart watch. In some embodiments, the ambulation sensor 82 may be integrated within a phone, such as a smartphone.

The system 10 generally illustrated in FIG. 1 also includes a goniometer 84, which communicates with the server 30 via the local communication interface 68 of the patient interface 50. The goniometer 84 measures an angle of the patient's body part. For example, the goniometer 84 may measure the angle of flex of a patient's knee or elbow or shoulder.

The system 10 generally illustrated in FIG. 1 also includes a pressure sensor 86, which communicates with the server 30 via the local communication interface 68 of the patient interface 50. The pressure sensor 86 measures an amount of pressure or weight applied by a body part of the patient. For example, pressure sensor 86 may measure an amount of force applied by a patient's foot when pedaling a stationary bike.

The system 10 generally illustrated in FIG. 1 also includes a supervisory interface 90 which may be similar or identical to the clinician interface 20. In some embodiments, the supervisory interface 90 may have enhanced functionality beyond what is provided on the clinician interface 20. The supervisory interface 90 may be configured for use by a person having responsibility for the treatment plan, such as an orthopedic surgeon.

The system 10 generally illustrated in FIG. 1 also includes a reporting interface 92 which may be similar or identical to the clinician interface 20. In some embodiments, the reporting interface 92 may have less functionality from what is provided on the clinician interface 20. For example, the reporting interface 92 may not have the ability to modify a treatment plan. Such a reporting interface 92 may be used, for example, by a biller to determine the use of the system 10 for billing purposes. In another example, the reporting interface 92 may not have the ability to display patient identifiable information, presenting only pseudonymized data and/or anonymized data for certain data fields concerning a data subject and/or for certain data fields concerning a quasi-identifier of the data subject. Such a reporting interface 92 may be used, for example, by a researcher to determine various effects of a treatment plan on different patients.

The system 10 includes an assistant interface 94 for a healthcare professional, such as those described herein, to remotely communicate with the patient interface 50 and/or the treatment device 70. Such remote communications may enable the healthcare professional to provide assistance or guidance to a patient using the system 10. More specifically, the assistant interface 94 is configured to communicate a telemedicine signal 96, 97, 98a, 98b, 99a, 99b with the patient interface 50 via a network connection such as, for example, via the first network 34 and/or the second network 58. The telemedicine signal 96, 97, 98a, 98b, 99a, 99b comprises one of an audio signal 96, an audiovisual signal 97, an interface control signal 98a for controlling a function of the patient interface 50, an interface monitor signal 98b for monitoring a status of the patient interface 50, an apparatus control signal 99a for changing an operating parameter of the treatment device 70, and/or an apparatus monitor signal 99b for monitoring a status of the treatment device 70. In some embodiments, each of the control signals 98a, 99a may be unidirectional, conveying commands from the assistant interface 94 to the patient interface 50. In some embodiments, in response to successfully receiving a control signal 98a, 99a and/or to communicate successful and/or unsuccessful implementation of the requested control action, an acknowledgement message may be sent from the patient interface 50 to the assistant interface 94. In some embodiments, each of the monitor signals 98b, 99b may be unidirectional, status-information commands from the patient interface 50 to the assistant interface 94. In some embodiments, an acknowledgement message may be sent from the assistant interface 94 to the patient interface 50 in response to successfully receiving one of the monitor signals 98b, 99b.

In some embodiments, the patient interface 50 may be configured as a pass-through for the apparatus control signals 99a and the apparatus monitor signals 99b between the treatment device 70 and one or more other devices, such as the assistant interface 94 and/or the server 30. For example, the patient interface 50 may be configured to transmit an apparatus control signal 99a in response to an apparatus control signal 99a within the telemedicine signal 96, 97, 98a, 98b, 99a, 99b from the assistant interface 94.

In some embodiments, the assistant interface 94 may be presented on a shared physical device as the clinician interface 20. For example, the clinician interface 20 may include one or more screens that implement the assistant interface 94. Alternatively or additionally, the clinician interface 20 may include additional hardware components, such as a video camera, a speaker, and/or a microphone, to implement aspects of the assistant interface 94.

In some embodiments, one or more portions of the telemedicine signal 96, 97, 98a, 98b, 99a, 99b may be generated from a prerecorded source (e.g., an audio recording, a video recording, or an animation) for presentation by the output device 54 of the patient interface 50. For example, a tutorial video may be streamed from the server 30 and presented upon the patient interface 50. Content from the prerecorded source may be requested by the patient via the patient interface 50. Alternatively, via a control on the assistant interface 94, the healthcare professional may cause content from the prerecorded source to be played on the patient interface 50.

The assistant interface 94 includes an assistant input device 22 and an assistant display 24, which may be collectively called an assistant user interface 22, 24. The assistant input device 22 may include one or more of a telephone, a keyboard, a mouse, a trackpad, or a touch screen, for example. Alternatively or additionally, the assistant input device 22 may include one or more microphones. In some embodiments, the one or more microphones may take the form of a telephone handset, headset, or wide-area microphone or microphones configured for the healthcare professional to speak to a patient via the patient interface 50. In some embodiments, assistant input device 22 may be configured to provide voice-based functionalities, with hardware and/or software configured to interpret spoken instructions by the healthcare professional by using the one or more microphones. The assistant input device 22 may include functionality provided by or similar to existing voice-based assistants such as Siri by Apple, Alexa by Amazon, Google Assistant, or Bixby by Samsung. The assistant input device 22 may include other hardware and/or software components. The assistant input device 22 may include one or more general purpose devices and/or special-purpose devices.

The assistant display 24 may take one or more different forms including, for example, a computer monitor or display screen on a tablet, a smartphone, or a smart watch. The assistant display 24 may include other hardware and/or software components such as projectors, virtual reality capabilities, or augmented reality capabilities, etc. The assistant display 24 may incorporate various different visual, audio, or other presentation technologies. For example, the assistant display 24 may include a non-visual display, such as an audio signal, which may include spoken language and/or other sounds such as tones, chimes, melodies, and/or compositions, which may signal different conditions and/or directions. The assistant display 24 may comprise one or more different display screens presenting various data and/or interfaces or controls for use by the healthcare professional. The assistant display 24 may include graphics, which may be presented by a web-based interface and/or by a computer program or application (App.).

In some embodiments, the system 10 may provide computer translation of language from the assistant interface 94 to the patient interface 50 and/or vice-versa. The computer translation of language may include computer translation of spoken language and/or computer translation of text. Additionally or alternatively, the system 10 may provide voice recognition and/or spoken pronunciation of text. For example, the system 10 may convert spoken words to printed text and/or the system 10 may audibly speak language from printed text. The system 10 may be configured to recognize spoken words by any or all of the patient, the clinician, and/or the healthcare professional. In some embodiments, the system 10 may be configured to recognize and react to spoken requests or commands by the patient. For example, the system 10 may automatically initiate a telemedicine session in response to a verbal command by the patient (which may be given in any one of several different languages).

In some embodiments, the server 30 may generate aspects of the assistant display 24 for presentation by the assistant interface 94. For example, the server 30 may include a web server configured to generate the display screens for presentation upon the assistant display 24. For example, the artificial intelligence engine 11 may generate recommended treatment plans and/or excluded treatment plans for patients and generate the display screens including those recommended treatment plans and/or external treatment plans for presentation on the assistant display 24 of the assistant interface 94. In some embodiments, the assistant display 24 may be configured to present a virtualized desktop hosted by the server 30. In some embodiments, the server 30 may be configured to communicate with the assistant interface 94 via the first network 34. In some embodiments, the first network 34 may include a local area network (LAN), such as an Ethernet network.

In some embodiments, the first network 34 may include the Internet, and communications between the server 30 and the assistant interface 94 may be secured via privacy enhancing technologies, such as, for example, by using encryption over a virtual private network (VPN). Alternatively or additionally, the server 30 may be configured to communicate with the assistant interface 94 via one or more networks independent of the first network 34 and/or other communication means, such as a direct wired or wireless communication channel. In some embodiments, the patient interface 50 and the treatment device 70 may each operate from a patient location geographically separate from a location of the assistant interface 94. For example, the patient interface 50 and the treatment device 70 may be used as part of an in-home rehabilitation system, which may be aided remotely by using the assistant interface 94 at a centralized location, such as a clinic or a call center.

In some embodiments, the assistant interface 94 may be one of several different terminals (e.g., computing devices) that may be grouped together, for example, in one or more call centers or at one or more clinicians' offices. In some embodiments, a plurality of assistant interfaces 94 may be distributed geographically. In some embodiments, a person may work as a healthcare professional remotely from any conventional office infrastructure. Such remote work may be performed, for example, where the assistant interface 94 takes the form of a computer and/or telephone. This remote work functionality may allow for work-from-home arrangements that may include part time and/or flexible work hours for a healthcare professional.

Figure 2:
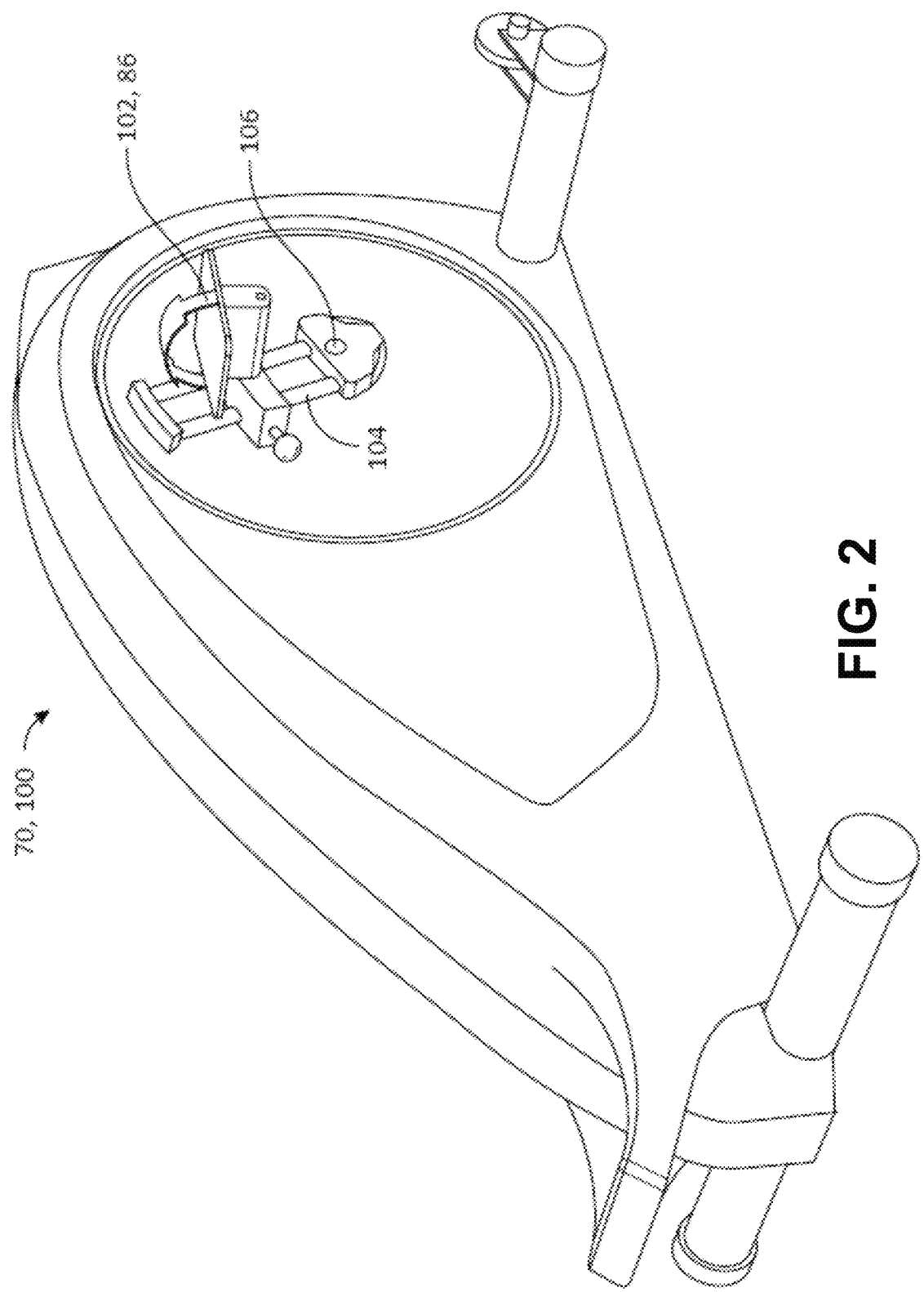
FIG. 2 generally illustrates a perspective view of an embodiment of a treatment device according to the principles of the present disclosure.
Figure 3:
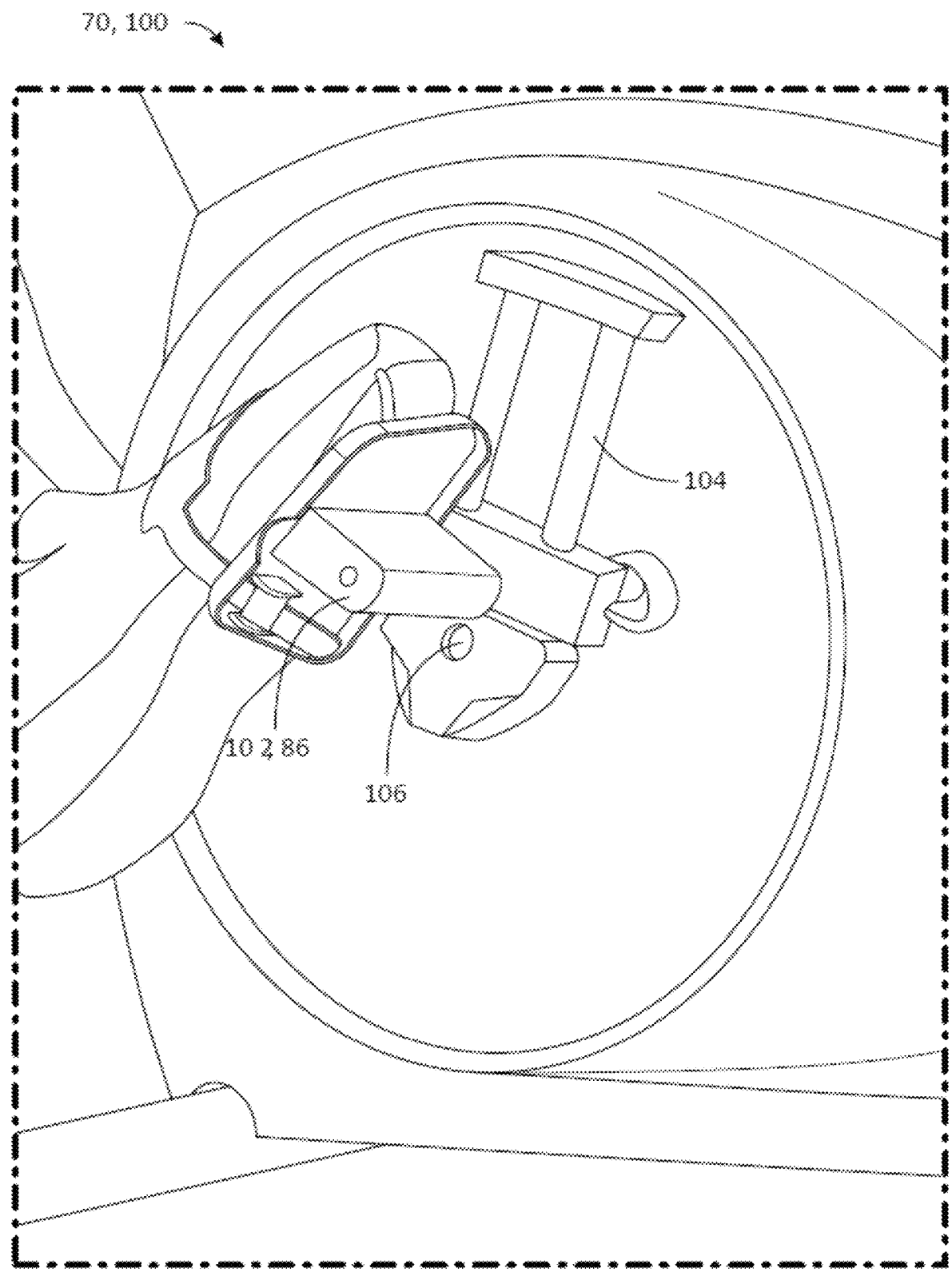
FIG. 3 generally illustrates a perspective view of a pedal of the treatment device of FIG. 2 according to the principles of the present disclosure.

FIGS. 2-3 show an embodiment of a treatment device 70. More specifically, FIG. 2 generally illustrates a treatment device 70 in the form of a stationary cycling machine 100, which may be called a stationary bike, for short. The stationary cycling machine 100 includes a set of pedals 102 each attached to a pedal arm 104 for rotation about an axle 106. In some embodiments, and as is generally illustrated in FIG. 2, the pedals 102 are movable on the pedal arms 104 in order to adjust a range of motion used by the patient in pedaling. For example, the pedals being located inwardly toward the axle 106 corresponds to a smaller range of motion than when the pedals are located outwardly away from the axle 106. One or more pressure sensors 86 is attached to or embedded within one or both of the pedals 102 for measuring an amount of force applied by the patient on a pedal 102. The pressure sensor 86 may communicate wirelessly to the treatment device 70 and/or to the patient interface 50.

Figure 4:
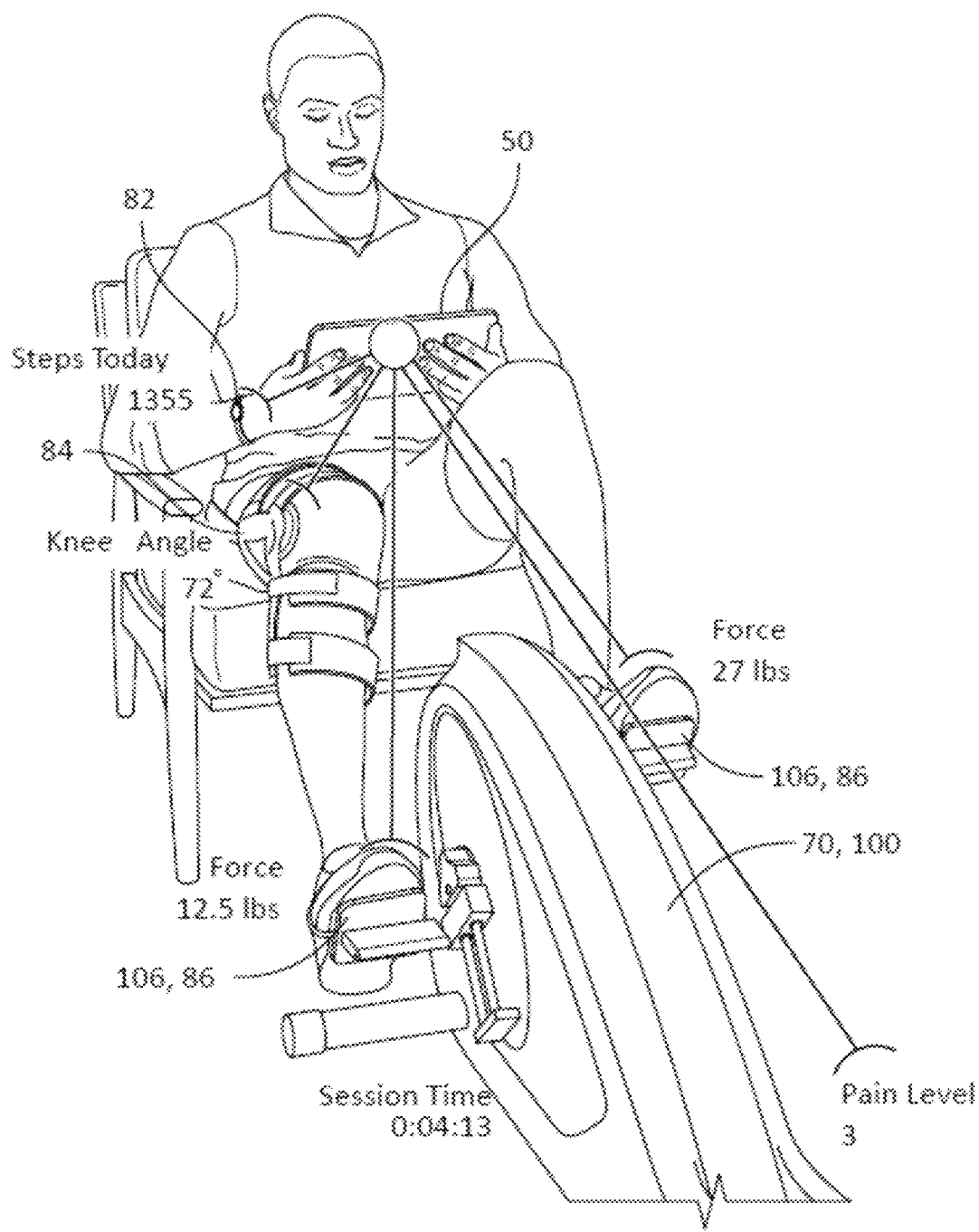
FIG. 4 generally illustrates a perspective view of a person using the treatment device of FIG. 2 according to the principles of the present disclosure.

FIG. 4 generally illustrates a person (a patient) using the treatment device of FIG. 2, and showing sensors and various data parameters connected to a patient interface 50. The example patient interface 50 is a tablet computer or smartphone, or a phablet, such as an iPad, an iPhone, an Android device, or a Surface tablet, which is held manually by the patient. In some other embodiments, the patient interface 50 may be embedded within or attached to the treatment device 70.

FIG. 4 generally illustrates the patient wearing the ambulation sensor 82 on his wrist, with a note showing "STEPS TODAY 1355", indicating that the ambulation sensor 82 has recorded and transmitted that step count to the patient interface 50. FIG. 4 also generally illustrates the patient wearing the goniometer 84 on his right knee, with a note showing "KNEE ANGLE 72°", indicating that the goniometer 84 is measuring and transmitting that knee angle to the patient interface 50. FIG. 4 also generally illustrates a right side of one of the pedals 102 with a pressure sensor 86 showing "FORCE 12.5 lbs.," indicating that the right pedal pressure sensor 86 is measuring and transmitting that force measurement to the patient interface 50.

FIG. 4 also generally illustrates a left side of one of the pedals 102 with a pressure sensor 86 showing "FORCE 27 lbs.", indicating that the left pedal pressure sensor 86 is measuring and transmitting that force measurement to the patient interface 50. FIG. 4 also generally illustrates other patient data, such as an indicator of "SESSION TIME 0:04:13", indicating that the patient has been using the treatment device 70 for 4 minutes and 13 seconds. This session time may be determined by the patient interface 50 based on information received from the treatment device 70. FIG. 4 also generally illustrates an indicator showing "PAIN LEVEL 3". Such a pain level may be obtained from the patent in response to a solicitation, such as a question, presented upon the patient interface 50.

Figure 5:
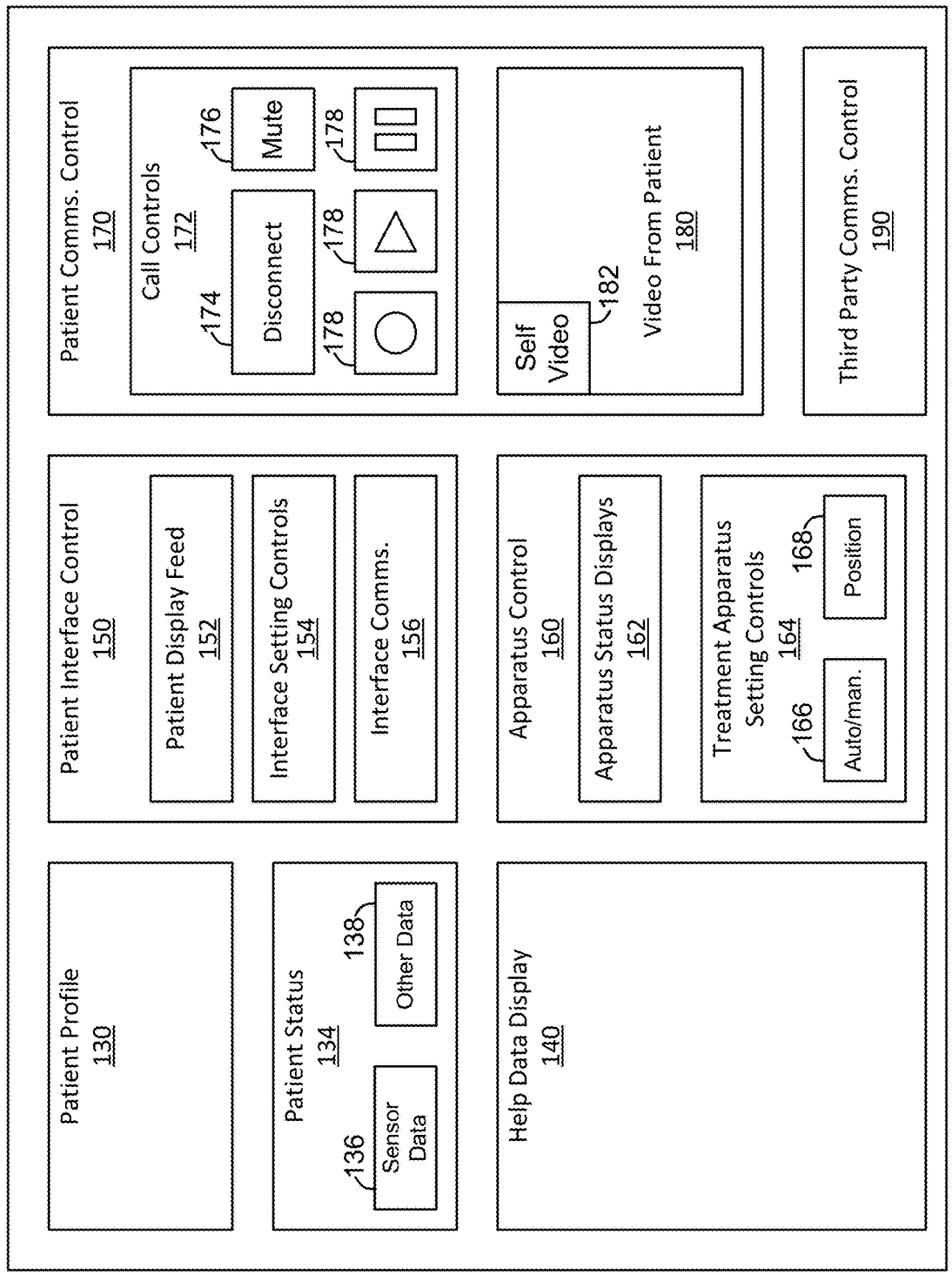
FIG. 5 generally illustrates an example embodiment of an overview display of an assistant interface according to the principles of the present disclosure.

FIG. 5 is an example embodiment of an overview display 120 of the assistant interface 94. Specifically, the overview display 120 presents several different controls and interfaces for the healthcare professional to remotely assist a patient with using the patient interface 50 and/or the treatment device 70. This remote assistance functionality may also be called telemedicine or telehealth.

Specifically, the overview display 120 includes a patient profile display 130 presenting biographical information regarding a patient using the treatment device 70. The patient profile display 130 may take the form of a portion or region of the overview display 120, as is generally illustrated in FIG. 5, although the patient profile display 130 may take other forms, such as a separate screen or a popup window.

In some embodiments, the patient profile display 130 may include a limited subset of the patient's biographical information. More specifically, the data presented upon the patient profile display 130 may depend upon the healthcare professional's need for that information. For example, a healthcare professional that is assisting the patient with a medical issue may be provided with medical history information regarding the patient, whereas a technician troubleshooting an issue with the treatment device 70 may be provided with a much more limited set of information regarding the patient. The technician, for example, may be given only the patient's name.

The patient profile display 130 may include pseudonymized data and/or anonymized data or use any privacy enhancing technology to prevent confidential patient data from being communicated in a way that could violate patient confidentiality requirements. Such privacy enhancing technologies may enable compliance with laws, regulations, or other rules of governance such as, but not limited to, the Health Insurance Portability and Accountability Act (HIPAA), or the General Data Protection Regulation (GDPR), wherein the patient may be deemed a "data subject".

In some embodiments, the patient profile display 130 may present information regarding the treatment plan for the patient to follow in using the treatment device 70. Such treatment plan information may be limited to a healthcare professional. For example, a healthcare professional assisting the patient with an issue regarding the treatment regimen may be provided with treatment plan information, whereas a technician troubleshooting an issue with the treatment device 70 may not be provided with any information regarding the patient's treatment plan.

In some embodiments, one or more recommended treatment plans and/or excluded treatment plans may be presented in the patient profile display 130 to the healthcare professional. The one or more recommended treatment plans and/or excluded treatment plans may be generated by the artificial intelligence engine 11 of the server 30 and received from the server 30 in real-time during, inter alia, a telemedicine or telehealth session. An example of presenting the one or more recommended treatment plans and/or ruled-out treatment plans is described below with reference to FIG. 7.

The example overview display 120 generally illustrated in FIG. 5 also includes a patient status display 134 presenting status information regarding a patient using the treatment device. The patient status display 134 may take the form of a portion or region of the overview display 120, as is generally illustrated in FIG. 5, although the patient status display 134 may take other forms, such as a separate screen or a popup window.

The patient status display 134 includes sensor data 136 from one or more of the external sensors 82, 84, 86, and/or from one or more internal sensors 76 of the treatment device 70. In some embodiments, the patient status display 134 may include sensor data from one or more sensors of one or more wearable devices worn by the patient while using the treatment device 70. The one or more wearable devices may include a watch, a bracelet, a necklace, a headband, a wristband, an ankle band, any other suitable band, eyeglasses or eyewear (such as, without limitation, Google Glass) a chest or torso strap, a device configured to be worked on, attached to, or communicatively coupled to a body, and the like. While the user is using the treatment device 70, the one or more wearable devices may be configured to monitor, with respect to the user, a heart rate, a temperature, a blood pressure, an eye dilation, one or more vital signs, one or more metabolic markers, one or more biomarkers, and the like. In some embodiments, the patient status display 134 may present other data 138 regarding the patient, such as last reported pain level, or progress within a treatment plan.

User access controls may be used to limit access, including what data is available to be viewed and/or modified, on any or all of the user interfaces 20, 50, 90, 92, 94 of the system 10. In some embodiments, user access controls may be employed to control what information is available to any given person using the system 10. For example, data presented on the assistant interface 94 may be controlled by user access controls, with permissions set depending on the healthcare professional/user's need for and/or qualifications to view that information.

The example overview display 120 generally illustrated in FIG. 5 also includes a help data display 140 presenting information for the healthcare professional to use in assisting the patient. The help data display 140 may take the form of a portion or region of the overview display 120, as is generally illustrated in FIG. 5. The help data display 140 may take other forms, such as a separate screen or a popup window. The help data display 140 may include, for example, presenting answers to frequently asked questions regarding use of the patient interface 50 and/or the treatment device 70.

The help data display 140 may also include research data or best practices. In some embodiments, the help data display 140 may present scripts for answers or explanations in response to patient questions. In some embodiments, the help data display 140 may present flow charts or walkthroughs for the healthcare professional to use in determining a root cause and/or solution to a patient's problem.

In some embodiments, the assistant interface 94 may present two or more help data displays 140, which may be the same or different, for simultaneous presentation of help data for use by the healthcare professional. for example, a first help data display may be used to present a troubleshooting flowchart to determine the source of a patient's problem, and a second help data display may present script information for the healthcare professional to read to the patient, such information to preferably include directions for the patient to perform some action, which may help to narrow down or solve the problem. In some embodiments, based upon inputs to the troubleshooting flowchart in the first help data display, the second help data display may automatically populate with script information.

The example overview display 120 generally illustrated in FIG. 5 also includes a patient interface control 150 presenting information regarding the patient interface 50, and/or to modify one or more settings of the patient interface 50. The patient interface control 150 may take the form of a portion or region of the overview display 120, as is generally illustrated in FIG. 5. The patient interface control 150 may take other forms, such as a separate screen or a popup window. The patient interface control 150 may present information communicated to the assistant interface 94 via one or more of the interface monitor signals 98*b*.

As is generally illustrated in FIG. 5, the patient interface control 150 includes a display feed 152 of the display presented by the patient interface 50. In some embodiments, the display feed 152 may include a live copy of the display screen currently being presented to the patient by the patient interface 50. In other words, the display feed 152 may present an image of what is presented on a display screen of the patient interface 50.

In some embodiments, the display feed 152 may include abbreviated information regarding the display screen currently being presented by the patient interface 50, such as a screen name or a screen number. The patient interface control 150 may include a patient interface setting control 154 for the healthcare professional to adjust or to control one or more settings or aspects of the patient interface 50. In some embodiments, the patient interface setting control 154 may cause the assistant interface 94 to generate and/or to transmit an interface control signal 98 for controlling a function or a setting of the patient interface 50.

In some embodiments, the patient interface setting control 154 may include collaborative browsing or co-browsing capability for the healthcare professional to remotely view and/or control the patient interface 50. For example, the patient interface setting control 154 may enable the healthcare professional to remotely enter text to one or more text entry fields on the patient interface 50 and/or to remotely control a cursor on the patient interface 50 using a mouse or touchscreen of the assistant interface 94.

In some embodiments, using the patient interface 50, the patient interface setting control 154 may allow the healthcare professional to change a setting that cannot be changed by the patient. For example, the patient interface 50 may be precluded from accessing a language setting to prevent a patient from inadvertently switching, on the patient interface 50, the language used for the displays, whereas the patient interface setting control 154 may enable the healthcare professional to change the language setting of the patient interface 50. In another example, the patient interface 50 may not be able to change a font size setting to a smaller size in order to prevent a patient from inadvertently switching the font size used for the displays on the patient interface 50 such that the display would become illegible to the patient, whereas the patient interface setting control 154 may provide for the healthcare professional to change the font size setting of the patient interface 50.

The example overview display 120 generally illustrated in FIG. 5 also includes an interface communications display 156 showing the status of communications between the patient interface 50 and one or more other devices 70, 82, 84, such as the treatment device 70, the ambulation sensor 82, and/or the goniometer 84. The interface communications display 156 may take the form of a portion or region of the overview display 120, as is generally illustrated in FIG. 5.

The interface communications display 156 may take other forms, such as a separate screen or a popup window. The interface communications display 156 may include controls for the healthcare professional to remotely modify communications with one or more of the other devices 70, 82, 84. For example, the healthcare professional may remotely command the patient interface 50 to reset communications with one of the other devices 70, 82, 84, or to establish communications with a new one of the other devices 70, 82, 84. This functionality may be used, for example, where the patient has a problem with one of the other devices 70, 82, 84, or where the patient receives a new or a replacement one of the other devices 70, 82, 84.

The example overview display 120 generally illustrated in FIG. 5 also includes an apparatus control 160 for the healthcare professional to view and/or to control information regarding the treatment device 70. The apparatus control 160 may take the form of a portion or region of the overview display 120, as is generally illustrated in FIG. 5. The apparatus control 160 may take other forms, such as a separate screen or a popup window. The apparatus control 160 may include an apparatus status display 162 with information regarding the current status of the apparatus. The apparatus status display 162 may present information communicated to the assistant interface 94 via one or more of the apparatus monitor signals 99*b*. The apparatus status display 162 may indicate whether the treatment device 70 is currently communicating with the patient interface 50. The apparatus status display 162 may present other current and/or historical information regarding the status of the treatment device 70.

The apparatus control 160 may include an apparatus setting control 164 for the healthcare professional to adjust or control one or more aspects of the treatment device 70. The apparatus setting control 164 may cause the assistant interface 94 to generate and/or to transmit an apparatus control signal 99 (e.g., which may be referred to as treatment plan input, as described) for changing an operating parameter and/or one or more characteristics of the treatment device 70, (e.g., a pedal radius setting, a resistance setting, a target RPM, other suitable characteristics of the treatment device 70, or a combination thereof).

The apparatus setting control 164 may include a mode button 166 and a position control 168, which may be used in conjunction for the healthcare professional to place an actuator 78 of the treatment device 70 in a manual mode, after which a setting, such as a position or a speed of the actuator 78, can be changed using the position control 168. The mode button 166 may provide for a setting, such as a position, to be toggled between automatic and manual modes.

In some embodiments, one or more settings may be adjustable at any time, and without having an associated auto/manual mode. In some embodiments, the healthcare professional may change an operating parameter of the treatment device 70, such as a pedal radius setting, while the patient is actively using the treatment device 70. Such "on the fly" adjustment may or may not be available to the patient using the patient interface 50.

In some embodiments, the mode button 166 may be configured to allow the healthcare provider and/or the patient to place the treatment device 70 in one of a plurality of modes. The modes may be referred to as treatment device modes. The plurality of treatment device modes may include a passive mode, an active-assisted mode, a resistive mode, an active mode, and/or other suitable mode. The passive mode may refer to an electric motor of the treatment device 70 independently driving the one or more radially-adjustable couplings rotationally coupled to the one or more pedals 102. In the passive mode, the electric motor may be the only source of driving force on the radially-adjustable couplings. That is, the patient may engage the pedals 102 with their hands or their feet and the electric motor may rotate the radially-adjustable couplings for the patient. This may enable moving the affected body part and stretching the affected body part for certain purposes, including, without limitation, increasing the patient's range of motion, without the patient exerting excessive force.

The active-assisted mode may refer to the electric motor receiving measurements of revolutions per minute of the one or more radially-adjustable couplings, and causing the electric motor 12 to drive the one or more radially-adjustable couplings rotationally coupled to the one or more pedals 102 when the measured revolutions per minute satisfy a threshold condition. The threshold condition may be configurable by the patient and/or the healthcare provider. The electric motor may be powered off while the user provides the driving force to the radially-adjustable couplings provided that the revolutions per minute are above a revolutions per minute threshold and the threshold condition is not satisfied. If the revolutions per minute are less than the revolutions per minute threshold, then the threshold condition is satisfied and the electric motor may be controlled to drive the radially-adjustable couplings to maintain the revolutions per minute threshold.

The resistive mode may refer to the electric motor providing resistance to rotation of the one or more radially-adjustable couplings coupled to the one or more pedals 102. The resistive mode may increase the strength, range of motion, pliability or other measurable property of the body part being rehabilitated by causing the muscle to exert force to move the pedals against the resistance provided by the electric motor.

The active mode may refer to the electric motor powering off such that it does not provide any driving force assistance to the radially-adjustable couplings. Instead, in this mode, using their hands or feet, for example, the user provides the sole driving force to the radially-adjustable couplings.

In some embodiments, the apparatus setting control 164 may allow the healthcare professional to change a setting that cannot be changed by the patient using the patient interface 50. For example, the patient interface 50 may be precluded from changing a preconfigured setting, such as a height or a tilt setting of the treatment device 70, whereas the apparatus setting control 164 may provide for the healthcare professional to change the height or tilt setting of the treatment device 70.

The example overview display 120 generally illustrated in FIG. 5 also includes a patient communications control 170 for controlling an audio or an audiovisual communications session with the patient interface 50. The communications session with the patient interface 50 may comprise a live feed from the assistant interface 94 for presentation by the output device of the patient interface 50. The live feed may take the form of an audio feed and/or a video feed. In some embodiments, the patient interface 50 may be configured to provide two-way audio or audiovisual communications with a person using the assistant interface 94. Specifically, the communications session with the patient interface 50 may include bidirectional (two-way) video or audiovisual feeds, with each of the patient interface 50 and the assistant interface 94 presenting video of the other one.

In some embodiments, the patient interface 50 may present video from the assistant interface 94, while the assistant interface 94 presents only audio or the assistant interface 94 presents no live audio or visual signal from the patient interface 50. In some embodiments, the assistant interface 94 may present video from the patient interface 50, while the patient interface 50 presents only audio or the patient interface 50 presents no live audio or visual signal from the assistant interface 94.

In some embodiments, the audio or an audiovisual communications session with the patient interface 50 may take place, at least in part, while the patient is performing the rehabilitation regimen upon the body part. The patient communications control 170 may take the form of a portion or region of the overview display 120, as is generally illustrated in FIG. 5. The patient communications control 170 may take other forms, such as a separate screen or a popup window.

The audio and/or audiovisual communications may be processed and/or directed by the assistant interface 94 and/or by another device or devices, such as a telephone system, or a videoconferencing system used by the healthcare professional while the healthcare professional uses the assistant interface 94. Alternatively or additionally, the audio and/or audiovisual communications may include communications with a third party. For example, the system 10 may enable the healthcare professional to initiate a 3-way conversation regarding use of a particular piece of hardware or software, with the patient and a subject matter expert, such as a healthcare professional or a specialist. The example patient communications control 170 generally illustrated in FIG. 5 includes call controls 172 for the healthcare professional to use in managing various aspects of the audio or audiovisual communications with the patient. The call controls 172 include a disconnect button 174 for the healthcare professional to end the audio or audiovisual communications session. The call controls 172 also include a mute button 176 to temporarily silence an audio or audiovisual signal from the assistant interface 94. In some embodiments, the call controls 172 may include other features, such as a hold button (not shown).

The call controls 172 also include one or more record/playback controls 178, such as record, play, and pause buttons to control, with the patient interface 50, recording and/or playback of audio and/or video from the teleconference session. The call controls 172 also include a video feed display 180 for presenting still and/or video images from the patient interface 50, and a self-video display 182 showing the current image of the healthcare professional using the assistant interface 94. The self-video display 182 may be presented as a picture-in-picture format, within a section of the video feed display 180, as is generally illustrated in FIG. 5. Alternatively or additionally, the self-video display 182 may be presented separately and/or independently from the video feed display 180.

The example overview display 120 generally illustrated in FIG. 5 also includes a third party communications control 190 for use in conducting audio and/or audiovisual communications with a third party. The third party communications control 190 may take the form of a portion or region of the overview display 120, as is generally illustrated in FIG. 5. The third party communications control 190 may take other forms, such as a display on a separate screen or a popup window.

The third party communications control 190 may include one or more controls, such as a contact list and/or buttons or controls to contact a third party regarding use of a particular piece of hardware or software, e.g., a subject matter expert, such as a healthcare professional or a specialist. The third party communications control 190 may include conference calling capability for the third party to simultaneously communicate with both the healthcare professional via the assistant interface 94, and with the patient via the patient interface 50. For example, the system 10 may provide for the healthcare professional to initiate a 3-way conversation with the patient and the third party.

Figure 6:
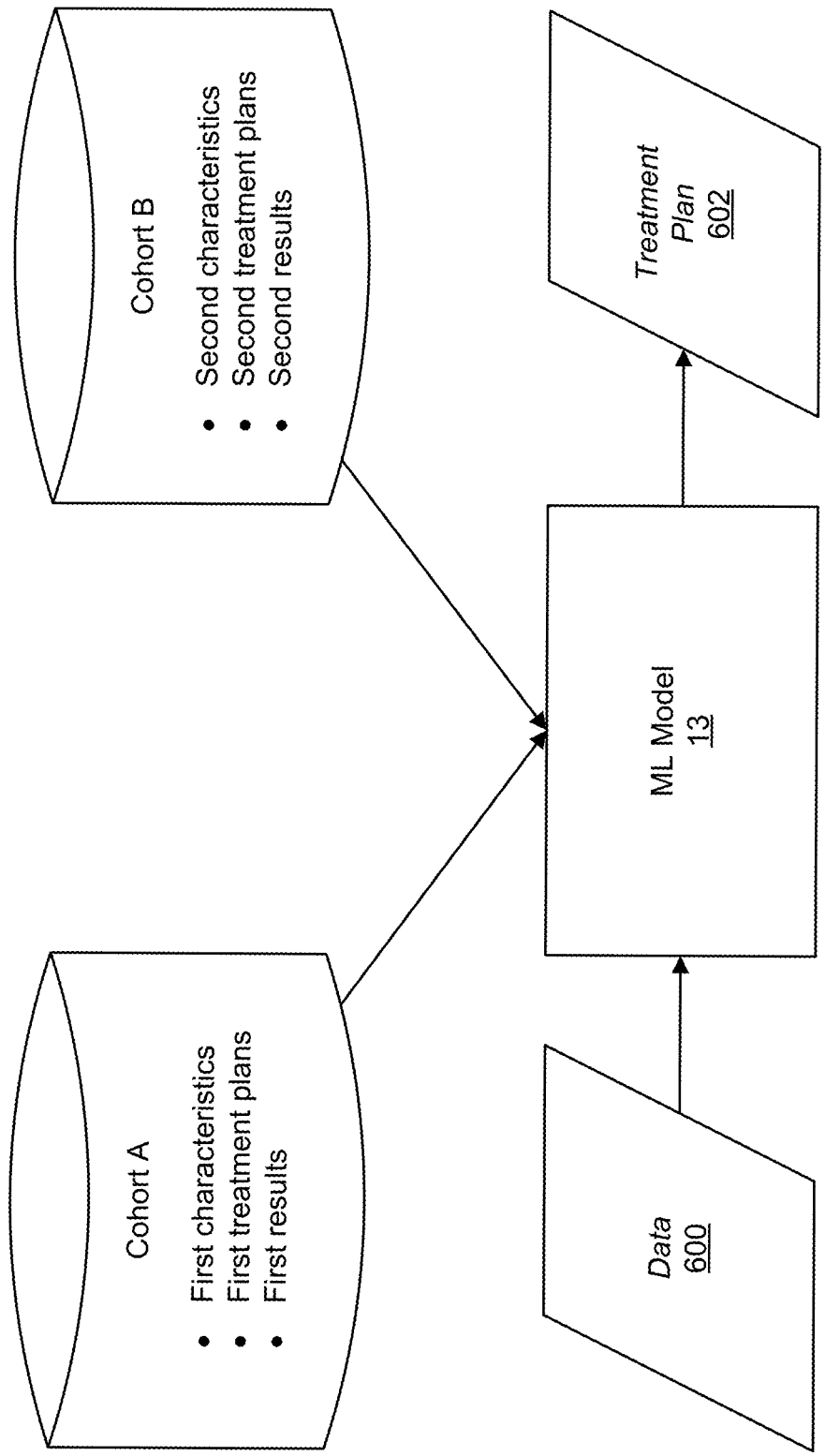
FIG. 6 generally illustrates an example block diagram of training a machine learning model to output, based on data pertaining to the patient, a treatment plan for the patient according to the principles of the present disclosure.

FIG. 6 generally illustrates an example block diagram of training a machine learning model 13 to output, based on data 600 pertaining to the patient, a treatment plan 602 for the patient according to the present disclosure. Data pertaining to other patients may be received by the server 30. The other patients may have used various treatment devices to perform treatment plans.

The data may include characteristics of the other patients, the details of the treatment plans performed by the other patients, and/or the results of performing the treatment plans (e.g., a percent of recovery of a portion of the patients' bodies, an amount of recovery of a portion of the patients' bodies, an amount of increase or decrease in muscle strength of a portion of patients' bodies, an amount of increase or decrease in range of motion of a portion of patients' bodies, etc.).

As depicted, the data has been assigned to different cohorts. Cohort A includes data for patients having similar first characteristics, first treatment plans, and first results. Cohort B includes data for patients having similar second characteristics, second treatment plans, and second results. For example, cohort A may include first characteristics of patients in their twenties without any medical conditions who underwent surgery for a broken limb; their treatment plans may include a certain treatment protocol (e.g., use the treatment device 70 for 30 minutes 5 times a week for 3 weeks, wherein values for the properties, configurations, and/or settings of the treatment device 70 are set to X (where X is a numerical value) for the first two weeks and to Y (where Y is a numerical value) for the last week).

Cohort A and cohort B may be included in a training dataset used to train the machine learning model 13. The machine learning model 13 may be trained to match a pattern between characteristics for each cohort and output the treatment plan or a variety of possible treatment plans for selection by a healthcare provider that provides the result. Accordingly, when the data 600 for a new patient is input into the trained machine learning model 13, the trained machine learning model 13 may match the characteristics included in the data 600 with characteristics in either cohort A or cohort B and output the appropriate treatment plan or plans 602. In some embodiments, the machine learning model 13 may be trained to output one or more excluded treatment plans that should not be performed by the new patient.

Figure 7:
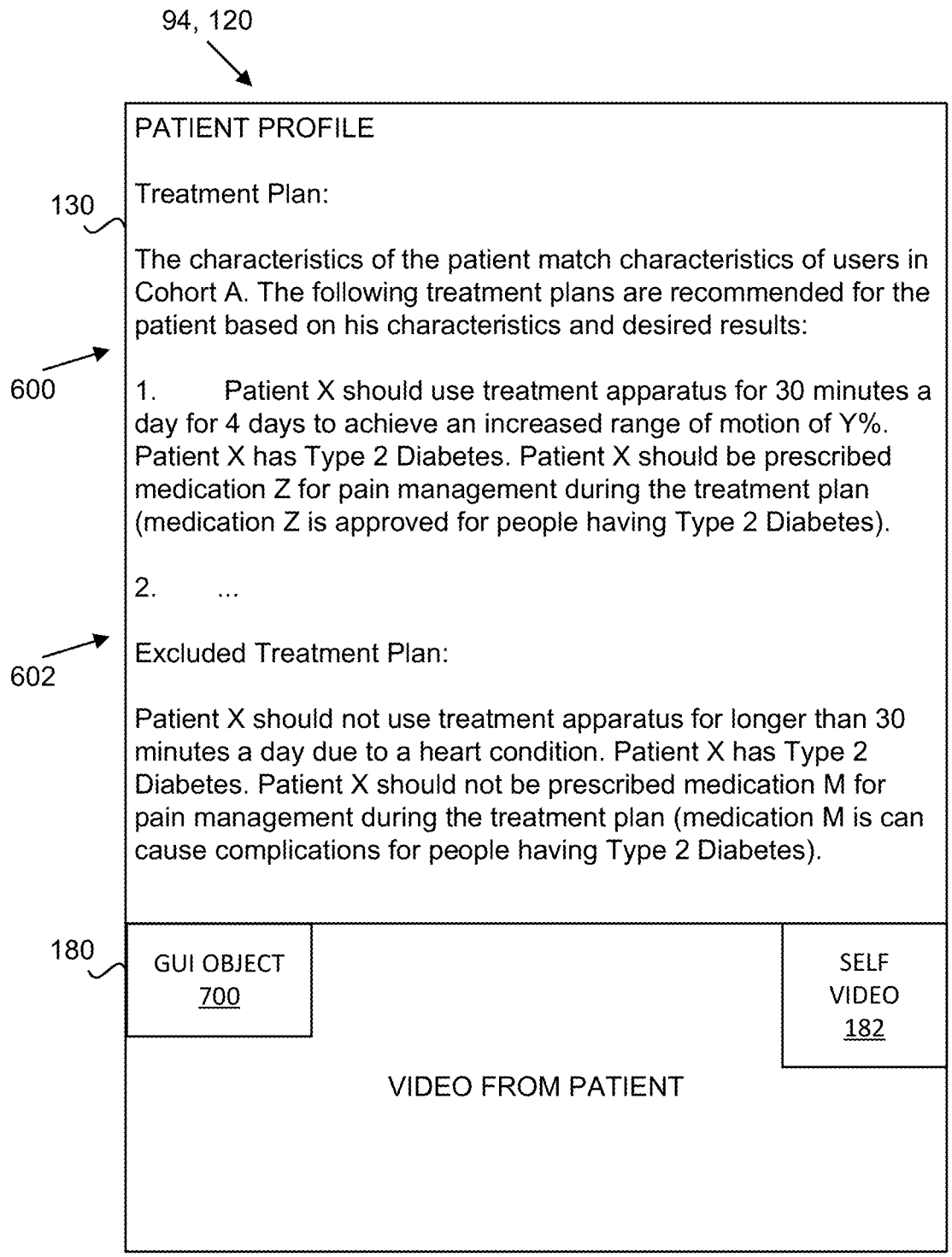
FIG. 7 generally illustrates an embodiment of an overview display of the assistant interface presenting recommended treatment plans and excluded treatment plans in real-time during a telemedicine session according to the principles of the present disclosure.

FIG. 7 generally illustrates an embodiment of an overview display 120 of the assistant interface 94 presenting recommended treatment plans and excluded treatment plans in real-time during a telemedicine session according to the present disclosure. As depicted, the overview display 120 just includes sections for the patient profile 130 and the video feed display 180, including the self-video display 182. Any suitable configuration of controls and interfaces of the overview display 120 described with reference to FIG. 5 may be presented in addition to or instead of the patient profile 130, the video feed display 180, and the self-video display 182.

The healthcare professional using the assistant interface 94 (e.g., computing device) during the telemedicine session may be presented in the self-video 182 in a portion of the overview display 120 (e.g., user interface presented on a display screen 24 of the assistant interface 94) that also presents a video from the patient in the video feed display 180. Further, the video feed display 180 may also include a graphical user interface (GUI) object 700 (e.g., a button) that enables the healthcare professional to share, in real-time or near real-time during the telemedicine session, the recommended treatment plans and/or the excluded treatment plans with the patient on the patient interface 50. The healthcare professional may select the GUI object 700 to share the recommended treatment plans and/or the excluded treatment plans. As depicted, another portion of the overview display 120 includes the patient profile display 130.

The patient profile display 130 is presenting two example recommended treatment plans 600 and one example excluded treatment plan 602. As described herein, the treatment plans may be recommended in view of characteristics of the patient being treated. To generate the recommended treatment plans 600 the patient should follow to achieve a desired result, a pattern between the characteristics of the patient being treated and a cohort of other people who have used the treatment device 70 to perform a treatment plan may be matched by one or more machine learning models 13 of the artificial intelligence engine 11. Each of the recommended treatment plans may be generated based on different desired results.

For example, as depicted, the patient profile display 130 presents "The characteristics of the patient match characteristics of uses in Cohort A. The following treatment plans are recommended for the patient based on his characteristics and desired results." Then, the patient profile display 130 presents recommended treatment plans from cohort A, and each treatment plan provides different results.

As depicted, treatment plan "A" indicates "Patient X should use treatment device for 30 minutes a day for 4 days to achieve an increased range of motion of Y %; Patient X has Type 2 Diabetes; and Patient X should be prescribed medication Z for pain management during the treatment plan (medication Z is approved for people having Type 2 Diabetes)." Accordingly, the treatment plan generated achieves increasing the range of motion of Y %. As may be appreciated, the treatment plan also includes a recommended medication (e.g., medication Z) to prescribe to the patient to manage pain in view of a known medical disease (e.g., Type 2 Diabetes) of the patient. That is, the recommended patient medication not only does not conflict with the medical condition of the patient but thereby improves the probability of a superior patient outcome. This specific example and all such examples elsewhere herein are not intended to limit in any way the generated treatment plan from recommending multiple medications, or from handling the acknowledgement, view, diagnosis and/or treatment of comorbid conditions or diseases.

Recommended treatment plan "B" may specify, based on a different desired result of the treatment plan, a different treatment plan including a different treatment protocol for a treatment device, a different medication regimen, etc.

As depicted, the patient profile display 130 may also present the excluded treatment plans 602. These types of treatment plans are shown to the healthcare professional using the assistant interface 94 to alert the healthcare professional not to recommend certain portions of a treatment plan to the patient. For example, the excluded treatment plan could specify the following: "Patient X should not use treatment device for longer than 30 minutes a day due to a heart condition; Patient X has Type 2 Diabetes; and Patient X should not be prescribed medication M for pain management during the treatment plan (in this scenario, medication M can cause complications for people having Type 2 Diabetes). Specifically, the excluded treatment plan points out a limitation of a treatment protocol where, due to a heart condition, Patient X should not exercise for more than 30 minutes a day. The ruled-out treatment plan also points out that Patient X should not be prescribed medication M because it conflicts with the medical condition Type 2 Diabetes.

The healthcare professional may select the treatment plan for the patient on the overview display 120. For example, the healthcare professional may use an input peripheral (e.g., mouse, touchscreen, microphone, keyboard, etc.) to select from the treatment plans 600 for the patient. In some embodiments, during the telemedicine session, the healthcare professional may discuss the pros and cons of the recommended treatment plans 600 with the patient.

In any event, the healthcare professional may select the treatment plan for the patient to follow to achieve the desired result. The selected treatment plan may be transmitted to the patient interface 50 for presentation. The patient may view the selected treatment plan on the patient interface 50. In some embodiments, the healthcare professional and the patient may discuss during the telemedicine session the details (e.g., treatment protocol using treatment device 70, diet regimen, medication regimen, etc.) in real-time or in near real-time. In some embodiments, the server 30 may control, based on the selected treatment plan and during the telemedicine session, the treatment device 70 as the user uses the treatment device 70.

Figure 8:
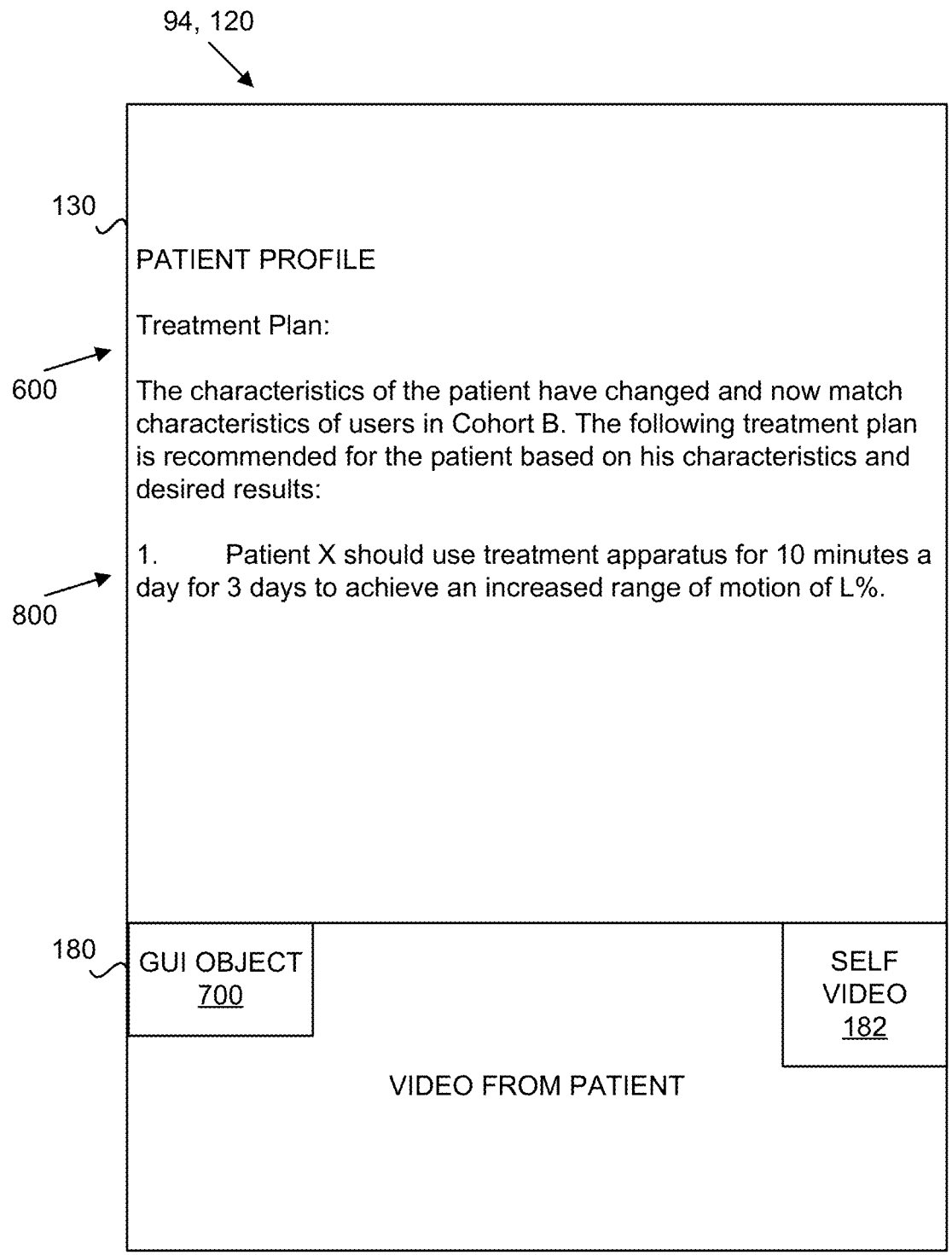
FIG. 8 generally illustrates an embodiment of the overview display of the assistant interface presenting, in real-time during a telemedicine session, recommended treatment plans that have changed as a result of patient data changing according to the principles of the present disclosure.

FIG. 8 generally illustrates an embodiment of the overview display 120 of the assistant interface 94 presenting, in real-time during a telemedicine session, recommended treatment plans that have changed as a result of patient data changing according to the present disclosure. As may be appreciated, the treatment device 70 and/or any computing device (e.g., patient interface 50) may transmit data while the patient uses the treatment device 70 to perform a treatment plan. The data may include updated characteristics of the patient and/or other treatment data. For example, the updated characteristics may include new performance information and/or measurement information. The performance information may include a speed of a portion of the treatment device 70, a range of motion achieved by the patient, a force exerted on a portion of the treatment device 70, a heart rate of the patient, a blood pressure of the patient, a respiratory rate of the patient, and so forth.

In some embodiments, the data received at the server 30 may be input into the trained machine learning model 13, which may determine that the characteristics indicate the patient is on track for the current treatment plan. Determining the patient is on track for the current treatment plan may cause the trained machine learning model 13 to adjust a parameter of the treatment device 70. The adjustment may be based on a next step of the treatment plan to further improve the performance of the patient.

In some embodiments, the data received at the server 30 may be input into the trained machine learning model 13, which may determine that the characteristics indicate the patient is not on track (e.g., behind schedule, not able to maintain a speed, not able to achieve a certain range of motion, is in too much pain, etc.) for the current treatment plan or is ahead of schedule (e.g., exceeding a certain speed, exercising longer than specified with no pain, exerting more than a specified force, etc.) for the current treatment plan.

The trained machine learning model 13 may determine that the characteristics of the patient no longer match the characteristics of the patients in the cohort to which the patient is assigned. Accordingly, the trained machine learning model 13 may reassign the patient to another cohort that includes qualifying characteristics the patient's characteristics. As such, the trained machine learning model 13 may select a new treatment plan from the new cohort and control, based on the new treatment plan, the treatment device 70.

In some embodiments, prior to controlling the treatment device 70, the server 30 may provide the new treatment plan 800 to the assistant interface 94 for presentation in the patient profile 130. As depicted, the patient profile 130 indicates "The characteristics of the patient have changed and now match characteristics of uses in Cohort B. The following treatment plan is recommended for the patient based on his characteristics and desired results." Then, the patient profile 130 presents the new treatment plan 800 ("Patient X should use the treatment device for 10 minutes a day for 3 days to achieve an increased range of motion of L %." The healthcare professional may select the new treatment plan 800, and the server 30 may receive the selection. The server 30 may control the treatment device 70 based on the new treatment plan 800. In some embodiments, the new treatment plan 800 may be transmitted to the patient interface 50 such that the patient may view the details of the new treatment plan 800.

In some embodiments, the server 30 may be configured to protect private healthcare information associated with the patient and/or allow the patient to remain anonymous or pseudonymous while seeking and/or engaging with healthcare services. The server 30 may receive at least a first electronic medical record associated with the patient. The first electronic medical record may be associated with an electronic medical records system or other suitable source. As described, the first electronic medical record may include information associated with the patient. At least some of the information of the first electronic medical record may include information that is private and/or of a personal nature. As described, the patient may, while providing adequate information associated with providing healthcare services, desire to keep such information private while discussing one or more conditions with a healthcare provider.

In some embodiments, the server 30 may generate a patient identifier associated with the patient. The patient identifier may include alphanumeric and/or special character information (e.g., such as a unique character string comprising one or more alphanumeric characters and/or one or more special characters), and/or other suitable identifier or identifying information. Additionally, or alternatively, the patient identifier may be associated with one or more characteristics associated with the patient. For example, the patient identifier may be associated with physiological information about the patient, medications currently being taken by the patient, and the like. The server 30 may store, in a centralized database or other suitable location, the patient identifier. The server 30 may correlate the patient identifier with the patient. For example, the server 30 may generate a database entry correlating the patient identifier with the patient.

In some embodiments, the server 30 may generate, using the patient identifier and at least a portion of the first electronic medical record, at least one protected electronic medical record corresponding to the first electronic medical record. At least a portion of the first electronic medical record may be in plaintext. Additionally, or alternatively, at least a portion of the first electronic medical record may be in plaintext and may be further protected by one or more PETs. Additionally, or alternatively, the first electronic medical record may be fully protected by one or more PETs.

For example, the server 30 may execute and be controlled by a PET engine that uses one or more PETs that control access to PII associated with the first electronic medical record. Controlling access may refer to defining access, enabling access, disabling access, etc., as described.

In some embodiments, the at least one protected electronic medical record is associated with at least the portion of the first electronic medical record in plaintext. In some embodiments, the at least one protected electronic medical record is configured to be used in place of at least the portion of the first electronic medical record in plaintext. Additionally, or alternatively, the first electronic medical record may be fully protected by one or more PETs.

In some embodiments, the server 30 may identify, based on at least one healthcare service indicated by the patient, a healthcare provider associated with providing the at least one healthcare service. The at least one healthcare service may be included in the first medical record, indicated by the patient using a user interface, or otherwise indicated by the patient.

In some embodiments, the at least one healthcare service includes at least one of any of the healthcare services described herein and any other suitable healthcare services.

In some embodiments, the server 30 may identify, based on at least one of the at least one healthcare service and the identified healthcare provider, relevant information of the first electronic medical record. The relevant information corresponds to the at least the portion of the first electronic medical record used to generate the at least one protected electronic medical record.

In some embodiments, the server 30 may provide, at least at a healthcare provider interface of the healthcare provider, at least one of the patient identifier and at least a portion of the first electronic medical record. The server 30 may provide, at least at the healthcare provider interface during a telemedicine session, the at least one of the patient identifier and at least the portion of the at least one protected electronic medical record.

The server 30 may receive input, from the patient, indicating a selected portion of the first electronic medical record. For example, the patient may desire to provide further information of the first electronic medical record to the healthcare provider. The input may indicate the further information to be provided to the healthcare provider.

The server 30 may generate, using the input indicating the selected portion of the electronic medical record, at least one other protected medical record. The server 30 may provide, at least at the healthcare provider interface, at least a portion of the at least one other protected electronic medical record. The server 30 may provide, at least at the healthcare provider interface during a telemedicine session, at least a portion of the at least one other protected electronic medical record.

In some embodiments, the healthcare provider may generate, for the patient, a treatment plan corresponding to one or more conditions of the patient. Typically, the patient may perform, using the treatment device 70, various aspects of the treatment plan to treat the one or more conditions of the patient.

In some embodiments, while the patient is using the treatment device 70 to perform the treatment plan, the server 30 may receive treatment data pertaining to a user using the treatment device 70 to perform a treatment plan. The user may include, without limitation, a patient, individual, or person using the treatment device 70 to perform various exercises. The treatment data may include various characteristics of the user, various measurement information pertaining to the user while the user uses the treatment device 70, various characteristics of the treatment device 70, the treatment plan, other suitable data, or a combination thereof. The server 30 may receive the treatment data during a telemedicine session.

In some embodiments, while the user uses the treatment device 70 to perform the treatment plan, at least some of the treatment data may include the sensor data 136 from one or more of the external sensors 82, 84, 86, and/or from one or more internal sensors 76 of the treatment device 70. Any sensor referred to herein may be standalone, part of a neural net, a node on the Internet of Things, or otherwise connected or configured to be connected to a physical or wireless network.

In some embodiments, at least some of the treatment data may include sensor data from one or more sensors of one or more wearable devices worn by the user while using the treatment device 70. The one or more wearable devices may include a watch, a bracelet, a necklace, a headband, a wristband, an ankle band, any other suitable band, eyeglasses or eyewear (such as, without limitation, Google Glass) a chest or torso strap, a device configured to be worked on, attached to, or communicatively coupled to a body, and the like. While the user is using the treatment device 70, the one or more wearable devices may be configured to monitor, with respect to the user, a heart rate, a temperature, a blood pressure, an eye dilation, one or more vital signs, one or more metabolic markers, biomarkers, and the like.

In some embodiments, at least some of the treatment data may include sensor data from one or more sensors of one or more sensing or Internet of Things (IoT) devices. Such devices may be near the user but not worn by the user. Additionally, or alternatively, such devices may be configured to sense, measure, obtain, or otherwise monitor, with respect to the user, a heart rate, a temperature, a blood pressure, an eye dilation, one or more vital signs, one or more metabolic markers, biomarkers, and the like. In some embodiments, such devices may be configured to generate a sensing field that wholly or partially encapsulates the user or that is otherwise communicatively coupled to the user. The devices may be configured to sense, measure, obtain, or otherwise monitor, with respect to the user while the user is in the sensing field, a heart rate, a temperature, a blood pressure, an eye dilation, one or more vital signs, one or more metabolic markers, biomarkers, and the like.

The various characteristics of the treatment device 70 may include one or more settings of the treatment device 70, a current revolutions per time period (e.g., such as one minute) of a rotating member (e.g., such as a wheel) of the treatment device 70, a resistance setting of the treatment device 70, other suitable characteristics of the treatment device 70, or a combination thereof. The measurement information may include one or more vital signs of the user, a respiration rate of the user, a heart rate of the user, a temperature of the user, an SpO2-measurement of the blood oxygen level of the user (e.g., oxygen saturation level), a blood pressure of the user, a glucose level of the user, other suitable measurement information of the user, microbiome related data pertaining to the user, or a combination thereof.

In some embodiments, the healthcare provider may analyze the treatment data and determine whether, based on various expected results, performance of the treatment plan by the user is having a desired outcome. The healthcare provider may adjust aspects of the treatment plan and/or the treatment device 70 based on the analysis. The server 30 and/or the treatment device 70 may be configured to adjust the various aspects of the treatment plan and/or the treatment device 70.

In some embodiments, the treatment plan, including the configurations, settings, range of motion settings, pain level, force settings, and speed settings, etc. of the treatment device 70 for various exercises, may be transmitted to the controller of the treatment device 70. In one example, if the user provides an indication, via the patient interface 50, that he is experiencing a high level of pain at a particular range of motion, the controller may receive the indication. Based on the indication, the controller may electronically adjust the range of motion of the pedal 102 by adjusting the pedal inwardly, outwardly, or along or about any suitable axis, via one or more actuators, hydraulics, springs, electric motors, or the like. The treatment plan may define alternative range of motion settings for the pedal 102 when the user indicates certain pain levels during an exercise. Accordingly, once the treatment plan is uploaded to the controller of the treatment device 70, the treatment device 70 may continue to operate without further instruction, further external input, and the like. It should be noted that the patient (via the patient interface 50) and/or the assistant (via the assistant interface 94) may override any of the configurations or settings of the treatment device 70 at any time. For example, the patient may use the patient interface 50 to cause the treatment device 70 to stop immediately, if so desired.

In some embodiments, the server 30 may be configured to receive activity data pertaining to the user while the user engages in at least one activity. The activity data may include various measurement information pertaining to the user while the user engages in the at least one activity. The at least one activity may include at least one of any activity or exercise described herein and other suitable activity or exercise. In some embodiments, the at least one activity includes at least one activity that the user engages in while using the treatment device 70. In some embodiments, the at least one activity includes at least one activity that the user engages in while not using the treatment device 70.

In some embodiments, while the user engages in the at least one activity, the activity data may include the sensor data 136 from one or more of the external sensors 82, 84, 86, and/or from one or more internal sensors 76 of the treatment device 70. In some embodiments, at least some of the activity data may include sensor data from one or more sensors of one or more wearable devices worn by the user while the user engages in the at least one activity. The one or more wearable devices may include a watch, a bracelet, a necklace, a headband, a wristband, an ankle band, eyeglasses or eyewear (such as, without limitation, Google Glass) a chest or torso strap, a device configured to be worked on, attached to, or communicatively coupled to a body, and the like. While the user engages in the at least one activity, the one or more wearable devices may be configured to monitor, with respect to the user, a heart rate, a temperature, a blood pressure, an eye dilation, one or more vital signs, one or more metabolic markers, biomarkers, pedometer measurements, goniometer measurements, and the like.

In some embodiments, at least some of the activity data may include sensor data from one or more sensors of one or more sensing or Internet of Things (IoT) devices. Such devices may be near the user but not worn by the user. Additionally, or alternatively, such devices may be configured to sense, measure, obtain, or otherwise monitor, with respect to the user, a heart rate, a temperature, a blood pressure, an eye dilation, one or more vital signs, one or more metabolic markers, biomarkers, and the like. In some embodiments, such devices may be configured to generate a sensing field that wholly or partially encapsulates the user or that is otherwise communicatively coupled to the user. The devices may be configured to sense, measure, obtain, or otherwise monitor, with respect to the user while the user is in the sensing field, a heart rate, a temperature, a blood pressure, an eye dilation, one or more vital signs, one or more metabolic markers, biomarkers, and the like.

In some embodiments, the server 30 may be configured to generate treatment information using the treatment data, the activity data, or a combination thereof. The treatment information may include a summary of the performance of the treatment plan by the user while using the treatment device 70, where the treatment information is configured such that the treatment data is presentable to a healthcare professional. Additionally, or alternatively, treatment information may include a summary of the performance by the user while the user engages in the at least one activity, wherein the treatment data is configured such that the treatment data is presentable to the healthcare professional.

The healthcare professional may include a human healthcare professional (e.g., as described), an artificial intelligence engine (e.g., such as the artificial intelligence engine 11 or other suitable artificial intelligence engine), or a combination thereof. In some embodiments, the artificial intelligence engine 11 may be configured to use at least one machine learning model, such as the machine learning model 13, that analyzes the treatment information and generates, using the treatment information, treatment plan input. The artificial intelligence engine 11 may be disposed on the treatment device 70, on the server 30, on the computing device of a healthcare professional, or a combination thereof.

In some embodiments, the artificial intelligence engine 11 may use the machine learning model 13 to generate, using the treatment data and the activity data, at least one output indicating at least a treatment progress of the user. The artificial intelligence engine 11 may use the machine learning model 13 to generate, using the at least one output, the treatment information, described herein.

In some embodiments, the server 30 may write to an associated memory (e.g., such as the memory 38 or other suitable memory), for access by the healthcare professional, the treatment information. For example, the server 30 may write to the memory 38, for access at the computing device of the healthcare professional, and/or provide, at the computing device of the healthcare professional, the treatment information. For example, the server 30 may transmit or provide the treatment information to an interface, such as the interface 50, configured to present the treatment information to the healthcare professional.

The interface 50 may include a graphical user interface configured to provide the treatment information and receive input from the healthcare professional. The healthcare professional may review the treatment information and determine whether to modify the treatment plan and/or one or more characteristics of the treatment device 70. For example, the healthcare professional may review the treatment information and compare the treatment information to the treatment plan being performed by the user. Additionally, or alternatively, the healthcare professional may compare at least one aspect of the activity data (e.g., indicated by the treatment information) to the treatment plan.

The healthcare professional may compare the following to each other (i) expected information, which pertains to the user while the user uses the treatment device 70 to perform the treatment plan and (ii) the measurement information (e.g., including the measurement information of the treatment data and/or the measurement information of the activity data, indicated by the treatment information), which pertains to the user while the user uses the treatment device 70 to perform the treatment plan and/or while the user engages in the at least one activity.

The healthcare professional may determine that the treatment plan is having the desired effect if one or more parts or portions of the measurement information (e.g., of the treatment data and/or of the activity data) are within an acceptable range associated with one or more corresponding parts or portions of the expected information. Conversely, the healthcare professional may determine that the treatment plan is not having the desired effect if one or more parts or portions of the measurement information (e.g., of the treatment data and/or of the activity data) are outside of the range associated with one or more corresponding parts or portions of the expected information.

For example, the healthcare professional may determine whether a blood pressure value (e.g., systolic pressure, diastolic pressure, and/or pulse pressure) corresponding to the user while the user uses the treatment device 70 (e.g., plus or minus 1%, plus or minus 5%, plus or minus a particular number of units suitable for the measurement (e.g., actual or digitally equivalent column inches of mercury for blood pressure, or any suitable range) of an expected blood pressure value indicated by the expected information. The healthcare professional may determine that the treatment plan is having the desired effect if the blood pressure value corresponding to the user while the user uses the treatment device 70 is within the range of the expected blood pressure value. Conversely, the healthcare professional may determine that the treatment plan is not having the desired effect if the blood pressure value corresponding to the user while the user uses the treatment device 70 is outside of the range of the expected blood pressure value.

Additionally, or alternatively, the healthcare professional may determine whether an angle of rotation of a knee corresponding to the user while the user engages in the at least one activity (e.g., indicated by the activity data) is within an acceptable range (e.g., plus or minus 1%, plus or minus 5%, plus or minus a particular number of units suitable for the measurement, or any suitable range) of an expected angle of rotation of a knee. The expected angle of rotation of the knee may correspond to an expected angle of rotation of a knee of another user while the another user is engaging in the at least one activity or an activity similar to the at least one activity, the another user having similar characteristics to the user. The healthcare professional may determine that the treatment plan is having the desired effect if the angle of rotation of the knee corresponding to the user while the user engages in the at least one activity is within the range of the expected angle of rotation of the knee. Conversely, the healthcare professional may determine that the treatment plan is not having the desired effect if the angle of rotation of the knee corresponding to the user while the user engages in the at least one activity is outside the range of the expected angle of rotation of the knee.

In some embodiments, the healthcare professional may compare the expected characteristics of the treatment device 70 while the user uses the treatment device 70 to perform the treatment plan with characteristics of the treatment device 70 indicated by the treatment information. For example, the healthcare professional may compare an expected resistance setting of the treatment device 70 with an actual resistance setting of the treatment device 70 indicated by the treatment information. The healthcare professional may determine that the user is performing the treatment plan properly if the actual characteristics of the treatment device 70 indicated by the treatment information are within a range of corresponding ones of the expected characteristics of the treatment device 70. Conversely, the healthcare professional may determine that the user is not performing the treatment plan properly if the actual characteristics of the treatment device 70 indicated by the treatment information are outside the range of corresponding ones of the expected characteristics of the treatment device 70.

If the healthcare professional determines that the treatment information indicates that the user is performing the treatment plan properly and/or that the treatment plan is having the desired effect (e.g., by analyzing the performance of the user while the user engages in the at least one activity and/or while the user uses the treatment device 70), the healthcare professional may determine not to modify the treatment plan or the one or more characteristics of the treatment device 70. Conversely, if the healthcare professional determines that the treatment information indicates that the user is not or has not been performing the treatment plan properly and/or that the treatment plan is not or has not been having the desired effect (e.g., by analyzing the performance of the user while the user engages in the at least one activity and/or while the user uses the treatment device 70), the healthcare professional may determine to modify the treatment plan and/or the one or more characteristics of the treatment device 70.

In some embodiments, if the healthcare professional determines to modify the treatment plan and/or the one or more characteristics of the treatment device 70, the healthcare professional may interact with the interface 50 to provide treatment plan input indicating one or more modifications to the treatment plan and/or to one or more characteristics of the treatment device 70. For example, the healthcare professional may use the interface 50 to provide input indicating an increase or decrease in the resistance setting of the treatment device 70, or other suitable modification to the one or more characteristics of the treatment device 70. Additionally, or alternatively, the healthcare professional may use the interface 50 to provide input indicating a modification to the treatment plan. For example, the healthcare professional may use the interface 50 to provide input indicating an increase or decrease in an amount of time the user is required to use the treatment device 70 according to the treatment plan, or other suitable modifications to the treatment plan.

In some embodiments, the server 30 may write to the memory 38 for access by the artificial intelligence engine 11 and/or provide to the artificial intelligence engine 11, the treatment information. The artificial intelligence engine 11 may use the machine learning model 13 to generate, using the treatment information (e.g., including the treatment data and/or the activity data), at least one treatment progress prediction.

In some embodiments, the artificial intelligence engine 11 may be configured to use the machine learning model 13 to generate, further using treatment progress information associated with other users, the at least one treatment progress prediction. At least some of the other users may be associated with a cohort to which the user belongs; alternatively, all of the other users may be associated with the cohort to which the user belongs; further alternatively, the other users may be associated with other cohorts; or the other users may not be associated with cohorts. In some embodiments, the other users may have characteristics similar to those of the user. In some embodiments, measurements pertaining to the other users may include measurements similar to the at least one measurement pertaining to the user.

In some embodiments, the server 30 may receive, from the artificial intelligence engine 11, the at least one treatment progress prediction. The server 30 may transmit or provide the at least one treatment plan prediction at the interface 50 of the computing device of the healthcare professional. The healthcare professional may analyze the treatment plan prediction and generate the treatment input, as described.

Additionally, or alternatively, the artificial intelligence engine 11 may be configured to use the machine learning model 13 to generate, using the treatment progress prediction, the treatment plan input. The server 30 may receive, from the artificial intelligence engine 11, the treatment plan input.

In some embodiments, the server 30 may modify, in response to receiving, from the healthcare professional, treatment plan input, including at least one modification to the at least one aspect of the treatment plan, the treatment plan, where the configuration is based on one or more modifications indicated by the treatment plan input. Additionally, or alternatively, the server 30 may modify the one or more characteristics of the treatment device 70 based on the modified treatment plan and/or the treatment plan input. For example, the treatment plan input may indicate that the one or more characteristics of the treatment device 70 should be modified and/or the modified treatment plan may require or indicate adjustments to the treatment device in order for the user to achieve the desired results of the modified treatment plan.

It should be understood that the server 30 may continuously and/or periodically provide treatment information to the interface 50, the artificial intelligence engine 11, and/or other sections, portions, or components of the overview display 120 based on continuously and/or periodically received treatment data.

The healthcare professional may receive and/or review treatment information continuously or periodically while the user uses the treatment device 70 to perform the treatment plan. The healthcare professional may determine whether to modify the treatment plan and/or control the one or more characteristics of the treatment device 70 based on one or more trends indicated by the continuously and/or periodically received treatment information. For example, the one or more trends may indicate an increase in heart rate or changes in other applicable trends indicating that the user is not performing the treatment plan properly and/or performance of the treatment plan by the user is not having the desired effect.

Figure 9:
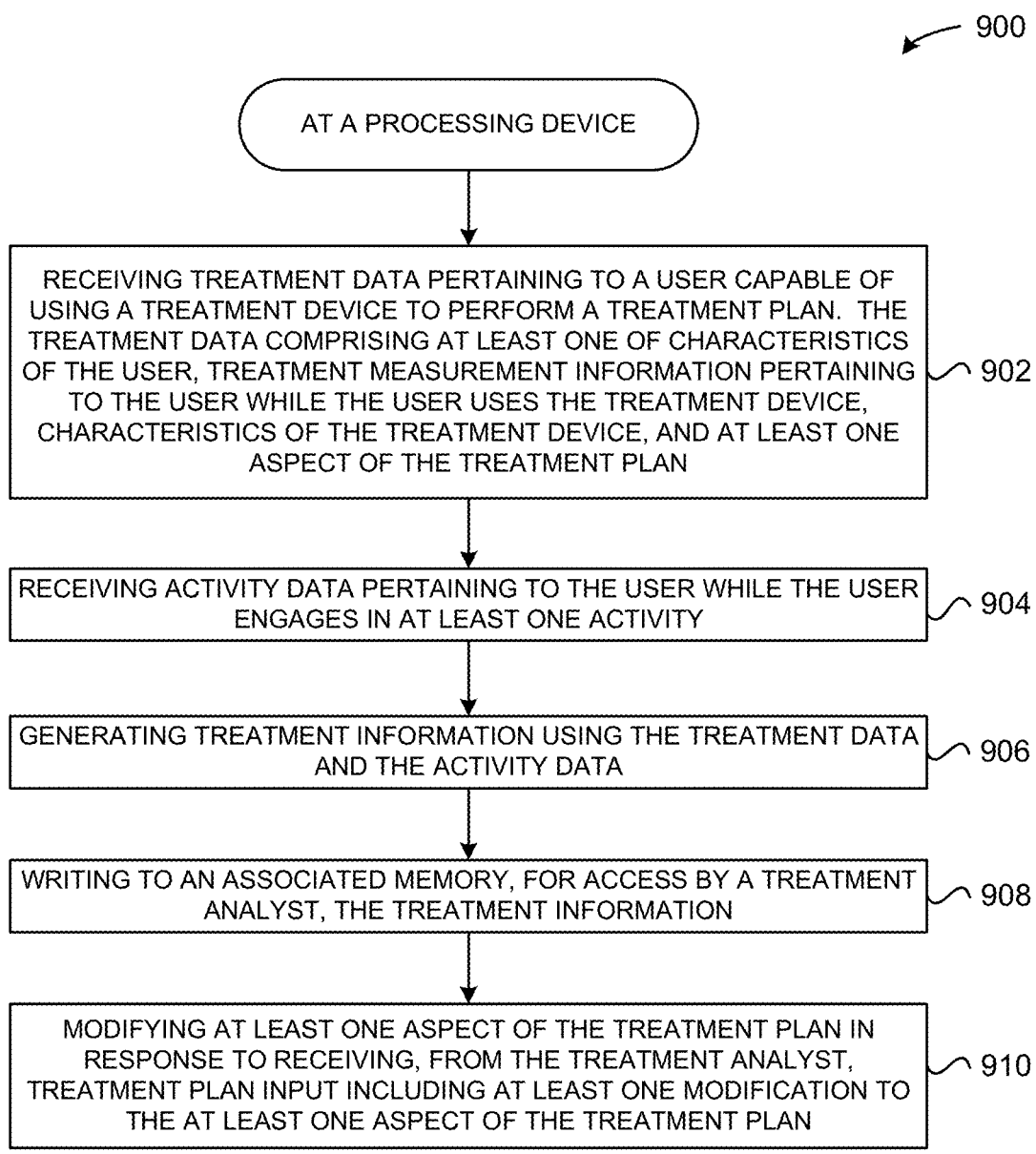
FIG. 9 is a flow diagram generally illustrating a method for modifying, based on treatment data received while a user uses the treatment device of FIG. 2, a treatment plan for the patient and controlling, based on the modification, at least one treatment device according to the principles of the present disclosure.

FIG. 9 is a flow diagram generally illustrating a method 900 for monitoring performance of a treatment plan by a user using a treatment device and for selectively modifying the treatment plan and one or more characteristics of the treatment device. According to the present disclosure. The method 900 is performed by processing logic that may include hardware (circuitry, dedicated logic, etc.), software (such as is run on a general-purpose computer system or a dedicated machine), or a combination of both. The method 900 and/or each of its individual functions, routines, subroutines, or operations may be performed by one or more processors of a computing device (e.g., any component of FIG. 1, such as server 30 executing the artificial intelligence engine 11). In some embodiments, the method 900 may be performed by a single processing thread. Alternatively, the method 900 may be performed by two or more processing threads, each thread implementing one or more individual functions, routines, subroutines, or operations of the methods.

For simplicity of explanation, the method 900 is depicted and described as a series of operations. However, operations in accordance with this disclosure can occur in various orders and/or concurrently, and/or with other operations not presented and described herein. For example, the operations depicted in the method 900 may occur in combination with any other operation of any other method disclosed herein. Furthermore, not all illustrated operations may be required to implement the method 900 in accordance with the disclosed subject matter. In addition, those skilled in the art will understand and appreciate that the method 900 could alternatively be represented as a series of interrelated states via a state diagram or events.

At 902, the method 900 receives treatment data pertaining to a user capable of using a treatment device to perform a treatment plan. The treatment data may include at least one of characteristics of the user, treatment measurement information pertaining to the user while the user uses the treatment device, characteristics of the treatment device, and at least one aspect of the treatment plan. For example, the server 30 may receive the treatment data.

At 904, the method 900 receives activity data pertaining to the user while the user engages in at least one activity. For example, the server 30 may receive the activity data pertaining to the user while the user engages in the at least one activity.

At 906, the method 900 generates treatment information using the treatment data and the activity data. For example, the server 30 may generate, using the treatment data and the activity data, the treatment information.

At 908, the method 900 may write to a memory, for access by a healthcare professional, the treatment information. For example, the server 30 may write to the memory 38 or other suitable memory for access by the healthcare professional.

At 910, the method 900 modifies at least one aspect of the treatment plan in response to receiving, from the healthcare professional, treatment plan input including at least one modification to the at least one aspect of the treatment plan. For example, the server 30 may modify, in response to receiving, from the healthcare professional, the treatment plan input, the at least one aspect of the treatment plan. The treatment plan input may include at least one modification to the at least one aspect of the treatment plan.

Figure 10:
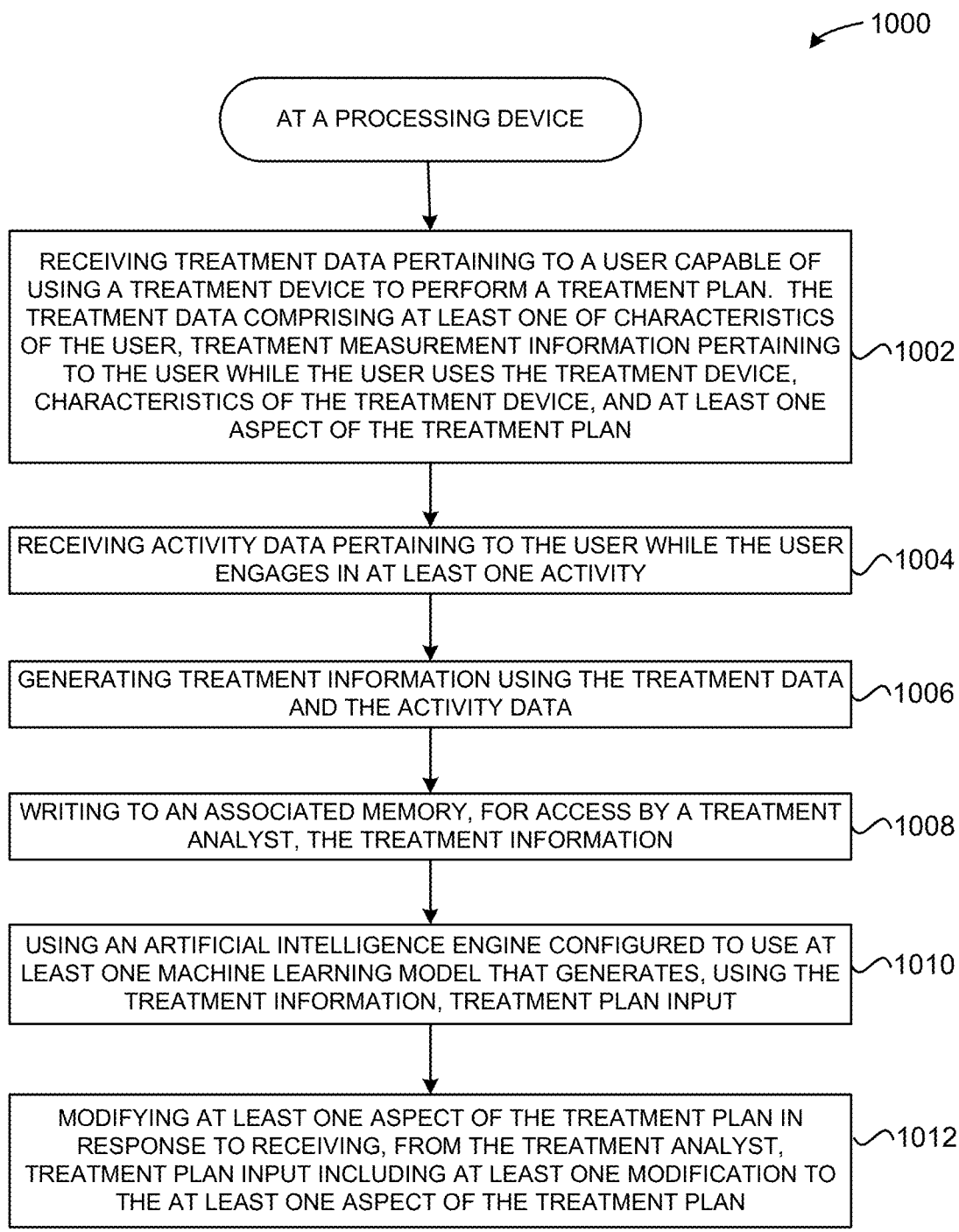
FIG. 10 is a flow diagram generally illustrating an alternative method for modifying, based on treatment data received while a user uses the treatment device of FIG. 2, a treatment plan for the patient and controlling, based on the modification, at least one treatment device according to the principles of the present disclosure.

FIG. 10 is a flow diagram generally illustrating an alternative method 1000 for monitoring performance of a treatment plan by a user using a treatment device and for selectively modifying the treatment plan and one or more characteristics of the treatment device according to the present disclosure. Method 1000 includes operations performed by processors of a computing device (e.g., any component of FIG. 1, such as server 30 executing the artificial intelligence engine 11). In some embodiments, one or more operations of the method 1000 are implemented in computer instructions stored on a memory device and executed by a processing device. The method 1000 may be performed in the same or a similar manner as described above in regard to method 900. The operations of the method 1000 may be performed in some combination with any of the operations of any of the methods described herein.

At 1002, the method 1000 receives treatment data pertaining to a user capable of using a treatment device to perform a treatment plan. The treatment data may include at least one of characteristics of the user, treatment measurement information pertaining to the user while the user uses the treatment device, characteristics of the treatment device, and at least one aspect of the treatment plan. For example, the server 30 may receive the treatment data.

At 1004, the method 1000 receives activity data pertaining to the user while the user engages in at least one activity. For example, the server 30 may receive the activity data pertaining to the user while the user engages in the at least one activity.

At 1006, the method 1000 generates treatment information using the treatment data and the activity data. For example, the server 30 may generate, using the treatment data and the activity data, the treatment information.

At 1008, the method 1000 may write to a memory, for access by a healthcare professional, the treatment information. For example, the server 30 may write to the memory 38 or other suitable memory for access by the healthcare professional. The healthcare professional may include the artificial intelligence engine 11.

At 1010, the method 1000 uses an artificial intelligence engine configured to use at least one machine learning model that generates, using the treatment information, treatment plan input. For example, the server 30 may use the artificial intelligence engine 11 (e.g., the healthcare professional) using the machine learning model 13 to generate, using the treatment information, the treatment plan input.

At 1012, the method 1000 modifies at least one aspect of the treatment plan in response to receiving, from the healthcare professional, treatment plan input including at least one modification to the at least one aspect of the treatment plan. For example, the server 30 may modify, in response to receiving, from the healthcare professional, the treatment plan input, the at least one aspect of the treatment plan. The treatment plan input may include at least one modification to the at least one aspect of the treatment plan.

Figure 11:
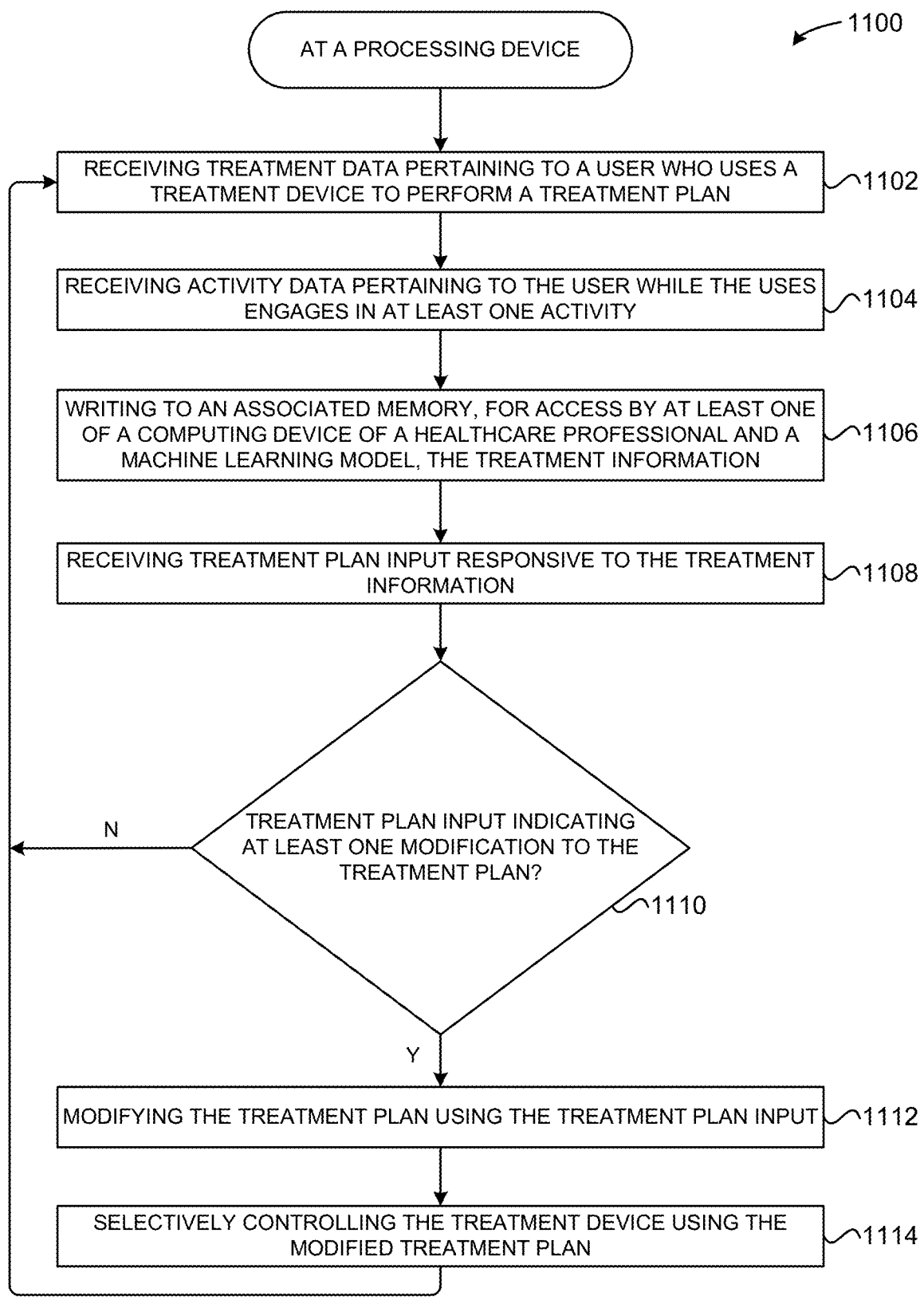
FIG. 11 is a flow diagram generally illustrating an alternative method for modifying, based on treatment data received while a user uses the treatment device of FIG. 2, a treatment plan for the patient and controlling, based on the modification, at least one treatment device according to the principles of the present disclosure.

FIG. 11 is a flow diagram generally illustrating an alternative method 1100 for monitoring performance of a treatment plan by a user using a treatment device and for selectively modifying the treatment plan and one or more characteristics of the treatment device, according to the present disclosure. Method 1100 includes operations performed by processors of a computing device (e.g., any component of FIG. 1, such as server 30 executing the artificial intelligence engine 11). In some embodiments, one or more operations of the method 1100 are implemented in computer instructions stored on a memory device and executed by a processing device. The method 1100 may be performed in the same or a similar manner as described above in regard to method 900 and/or method 1000. The operations of the method 1100 may be performed in some combination with any of the operations of any of the methods described herein.

At 1102, the method 1100 receives treatment data pertaining to a user capable of using a treatment device to perform a treatment plan. The treatment data may include at least one of characteristics of the user, treatment measurement information pertaining to the user while the user uses the treatment device, characteristics of the treatment device, and at least one aspect of the treatment plan. For example, the server 30 may receive the treatment data.

At 1104, the method 1100 receives activity data pertaining to the user while the user engages in at least one activity. For example, the server 30 may receive the activity data pertaining to the user while the user engages in the at least one activity. The server 30 may generate, using the treatment data and the activity data, the treatment information.

At 1106, the method 1100 may write to a memory, for access by at least one of a computing device of a healthcare professional and a machine learning model, the treatment information. For example, the server 30 may write to the memory 38 or other suitable memory for access by at least one of the computing device of the healthcare professional and the artificial intelligence engine 11 that uses the machine learning model 13.

At 1108, the method 1100 receives treatment plan input responsive to the treatment information. For example, the server 30 may receive the treatment plan input from the healthcare professional and/or the artificial intelligence engine 11.

At 1110, the method 1100 determines whether the treatment plan input indicates at least one modification to the treatment plan. For example, the server 30 determines whether the treatment plan input indicates at least one modification to the treatment plan. If the server 30 determines that the treatment plan input indicates at least one modification to the treatment plan, the method 1100 continues at 1112. Alternatively, if the server 30 determines that the treatment plan input does not indicate at least one modification to the treatment plan, the method 1100 continues at 1102.

At 1112, the method 1100 modifies at least one aspect of the treatment plan using the treatment plan input. For example, the server 30 may modify, using the treatment plan input, the at least one aspect of the treatment plan.

At 1114, the method 1100 selectively controls the treatment device using the modified treatment plan. For example, the server 30 may control the treatment device 30 using the modified treatment plan. In some embodiments, the server 30 may control, during a telemedicine session the treatment device 70 while the user uses the treatment device 70.

If the healthcare professional determines that the deviation of the pedal pressure measurement of the delta information is outside of the expected range, the healthcare professional may determine that the deviation of the delta information may indicate a potential or current condition of the user. For example, the deviation of a pedal pressure measurement from the pedal pressure measurement of the URD may indicate an injury to an ankle, knee, or other suitable body part of the user.

Alternatively, if the healthcare professional determines that the deviation of the pedal pressure measurement of the delta information is within the expected range, the healthcare professional may determine that the deviation of the delta information does not indicate a condition of the user. Additionally, or alternatively, the healthcare professional may monitor trends indicated by the deviations indicated by the delta information. For example, the healthcare professional may determine that, based on a determination that the deviations of the delta information over a period are trending toward being outside of the expected range, the deviations of the delta information may indicate a potential or current condition of the user.

If the healthcare professional determine that the delta information indicates a potential or current condition of the user, the healthcare professional may interact with the interface to provide treatment analysis output, which may indicate one or more potential or current conditions of the user indicated by the delta information, one or more treatment actions (e.g., corresponding to the one or more potential or current conditions of the user indicated by the delta information), other suitable treatment analysis information, or a combination thereof. In some embodiments, the healthcare professional may include an artificial intelligence engine that uses one or more machine learning models that generate, using at least the detailed information, the treatment analysis output. A human healthcare professional may review the treatment analysis output provided by the machine learning model and may confirm or verify the treatment analysis output. Alternatively, the artificial intelligence engine may provide the treatment analysis output at the interface, as described.

In some embodiments, the systems and methods described herein may be configured to perform, in response to receiving treatment analysis output indicating at least one treatment action, the at least one treatment action indicated by the treatment analysis output. The at least one treatment action may include modifying at least one aspect of the treatment plan, controlling (e.g., while the user uses the treatment device) at least one aspect of the treatment device, generating (e.g., based on the treatment analysis output) a notification, transmitting (e.g., to at least one of the user and an agent of the user, such as a primary care physician, a physical therapist, a caregiver, and/or other suitable agent of the user) the notification, any other suitable treatment action, or a combination thereof.

In some embodiments, transmitting the notification may include transmitting the notification to one or more mobile devices associated with the user or the agent of the user, electronic mail addresses of the user or the agent of the user, applications associated with the use of the treatment device, displays of the treatment device, or other suitable locations. The notification may include at least an indication of the condition associated with the user and/or the at least one treatment action. Additionally, or alternatively, the notification may comprise an aspect that includes sound, an aspect that includes a visual display or projection, any other suitable aspect, or a combination thereof.

If the at least one treatment action includes modifying one or more aspects of the treatment plan and/or one or more characteristics of the treatment device, the systems and methods described herein may modify the one or more aspects of the treatment plan and/or the one or more characteristics of the treatment device. For example, the at least one treatment action may indicate an increase or decrease in the resistance setting of the treatment device, or other suitable modification to the one or more characteristics of the treatment device. Additionally, or alternatively, the at least one treatment action may indicate an increase or decrease in an amount of time the user is required to use the treatment device according to the treatment plan, or other suitable modifications to the treatment plan.

The healthcare professional may receive and/or review treatment information continuously or periodically while the user uses the treatment device to perform the treatment plan. Based on one or more trends indicated by the continuously and/or periodically received treatment information, the healthcare professional may determine whether to modify the treatment plan and/or control the one or more characteristics of the treatment device. For example, the one or more trends may indicate an increase in heart rate or other suitable trends, and the trend indication(s) or trends' indications may themselves indicate that the user is not performing the treatment plan properly and/or that the performance of the treatment plan by the user is not having the desired effect.

In some embodiments, the systems and methods described herein may be configured to use artificial intelligence and/or machine learning to assign patients to cohorts and to dynamically control a treatment device based on the assignment during an adaptive telemedicine session. In some embodiments, numerous treatment devices may be provided to patients. The treatment devices may be used by the patients to perform treatment plans in their residences, at a gym, at a rehabilitative center, at a hospital, or any suitable location, including permanent or temporary domiciles.

In some embodiments, while the patient is using the treatment device 70 to perform the treatment plan, the server 30 may receive treatment data pertaining to a patient while the patient is using the treatment device 70 to perform the treatment plan. The patient may include a user or person using the treatment device 70 to perform various exercises. In some embodiments, the server 30 may receive the treatment data during a telemedicine session. Additionally, or alternatively, during the telemedicine session, the patient may use the treatment device 70.

As described, the treatment data may include various characteristics of the patient, various measurement information pertaining to the patient while the patient uses the treatment device 70, various performance measurement information pertaining to the use of the treatment device 70 by the patient, various characteristics of the treatment device 70, the treatment plan, other suitable data, or a combination thereof.

In some embodiments, while the patient uses the treatment device 70 to perform the treatment plan, at least some of the treatment data may include the sensor data 136 from one or more of the external sensors 82, 84, 86, and/or from one or more internal sensors 76 of the treatment device 70. In some embodiments, at least some of the treatment data may include sensor data from one or more sensors of one or more wearable devices worn by the patient while using the treatment device 70. The one or more wearable devices may include a watch, a bracelet, a necklace, a headband, a wristband, an ankle band, any other suitable band, eyeglasses or eyewear (such as, without limitation, Google Glass) a chest or torso strap, a device configured to be worked on, attached to, or communicatively coupled to a body, and the like. While the user is using the treatment device 70, the one or more wearable devices may be configured to monitor, with respect to the user, a heart rate, a temperature, a blood pressure, an eye dilation, one or more vital signs, one or more metabolic markers, biomarkers, and the like.

In some embodiments, the server 30 may be configured to receive URD pertaining to the patient. The URD may include at least baseline data (e.g., or previously captured or measured data) for the patient during engagement, by the patient, in at least one activity. The at least one activity may include walking, running, climbing, jumping, cycling, throwing, rolling, squatting, swimming, rowing, any other suitable activity or exercise, or a combination thereof (e.g., including assisted activities (e.g., such as using a treadmill and the like) or unassisted activities). In some embodiments, the at least one activity may include at least one activity that the patient previously engaged in while using the treatment device 70. In some embodiments, the at least one activity may include at least one activity that the patient previously engaged in while not using the treatment device 70.

In some embodiments, the server 30 may be configured to generate, using at least one aspect of the treatment data and at least one aspect of the URD, delta information pertaining to the patient. The delta information may include at least a difference between the at least one aspect of the treatment data and the at least one aspect of the URD.

For example, the server 30 may be configured to compare the at least one aspect of the treatment data to the at least one aspect of the URD. The at least one aspect of the treatment data may include, for example, a pedal pressure measurement that may correspond to a pressure applied, during a telemedicine session or other suitable use of the treatment device 70, by the patient to a first pedal of the treatment device 70. The at least one aspect of the URD may include a pedal pressure measurement that may correspond to a pressure applied by the patient to the first pedal of the treatment device 70. The pedal pressure measurement may include a pedal pressure measurement applied by the patient to the first pedal of the treatment device 70 during a previous use of the treatment device 70, an average pedal pressure measurement applied over a number of previous uses of the treatment device 70 by the patient to the first pedal of the treatment device 70, or another suitable pedal pressure measurement. The server 30 may determine a difference between the pedal pressure measurement that corresponds to the at least one aspect of the treatment data and the pedal pressure measurement that corresponds to the at least one aspect of the URD. The server 30 may generate the delta information based on the difference between the at least one aspect of the treatment data and the at least one aspect of the URD.

In some embodiments, the server 30 may be configured to generate treatment information that includes at least one of at least one aspect of the treatment data and at least one aspect of the delta information. The treatment information may include a summary of the performance of the treatment plan by the patient while using the treatment device 70, wherein the summary is formatted such that the treatment data and the delta information are capable of being presented at a computing device of the healthcare professional responsible for the performance of the treatment plan by the patient.

The server 30 may write to an associated memory, for access at the computing device of the healthcare professional, and/or provide, at the computing device of the healthcare professional, the treatment information. For example, the server 30 may provide the treatment information to an interface configured to present the treatment information to the healthcare professional. It should be understood that, in some embodiments, the server 30 may be configured to write to the associated memory, for access at the computing device, one or more aspects of the delta information, one or more aspects of the treatment data, one or more aspects of the treatment information, or any combination thereof.

The server 30 may be configured to provide, at the overview display 120, the treatment information. For example, the server 30 may store the treatment information for access by the overview display 120 and/or may communicate the treatment information to the overview display 120. In some embodiments, the server 30 may provide the treatment information to the patient profile display 130 or other suitable section, portion, or component of the overview display 120, or to any other suitable display or interface.

In some embodiments, the server 30 may be configured to perform, in response to receiving treatment analysis output indicating at least one treatment action, the at least one treatment action indicated by the treatment analysis output. The treatment analysis output may also indicate the one or more conditions of the patient identified by the healthcare professional using at least the delta information. The at least one treatment action may correspond to the one or more conditions of the patient and may include modifying at least one aspect of the treatment plan, controlling (e.g., while the patient uses the treatment device) at least one aspect of the treatment device 70, generating (e.g., based on the treatment analysis output) a notification, transmitting (e.g., to at least one of the patient and an agent of the patient, such as a primary care physician, a physical therapist, a caregiver, and/or other suitable agent of the patient) the notification, any other suitable treatment action, or a combination thereof.

In some embodiments, transmitting the notification may include transmitting the notification to one or more mobile devices associated with the patient or the agent of the patient, to electronic mail addresses of the patient or the agent of the patient, to applications associated with the use of the treatment device 70 (including, without limitation, transmission to an application via an API (application user interface), to displays of the treatment device 70, or to other suitable locations. The notification may include at least an indication of the condition associated with the patient and/or the at least one treatment action. Additionally, or alternatively, the notification may comprise an aspect that includes sound, an aspect that includes a visual display or projection, any other suitable aspect or sensorial aspect, or a combination thereof.

If the at least one treatment action includes modifying one or more aspects of the treatment plan and/or one or more characteristics of the treatment device 70, the server 30 may modify the one or more aspects of the treatment plan and/or the one or more characteristics of the treatment device 70. For example, the at least one treatment action may indicate an increase or decrease in the resistance setting of the treatment device 70, or other suitable modification to the one or more characteristics of the treatment device 70. Additionally, or alternatively, the at least one treatment action may indicate an increase or decrease in an amount of time the patient is required to use the treatment device according to the treatment plan, or other suitable modifications to the treatment plan.

Figure 12:
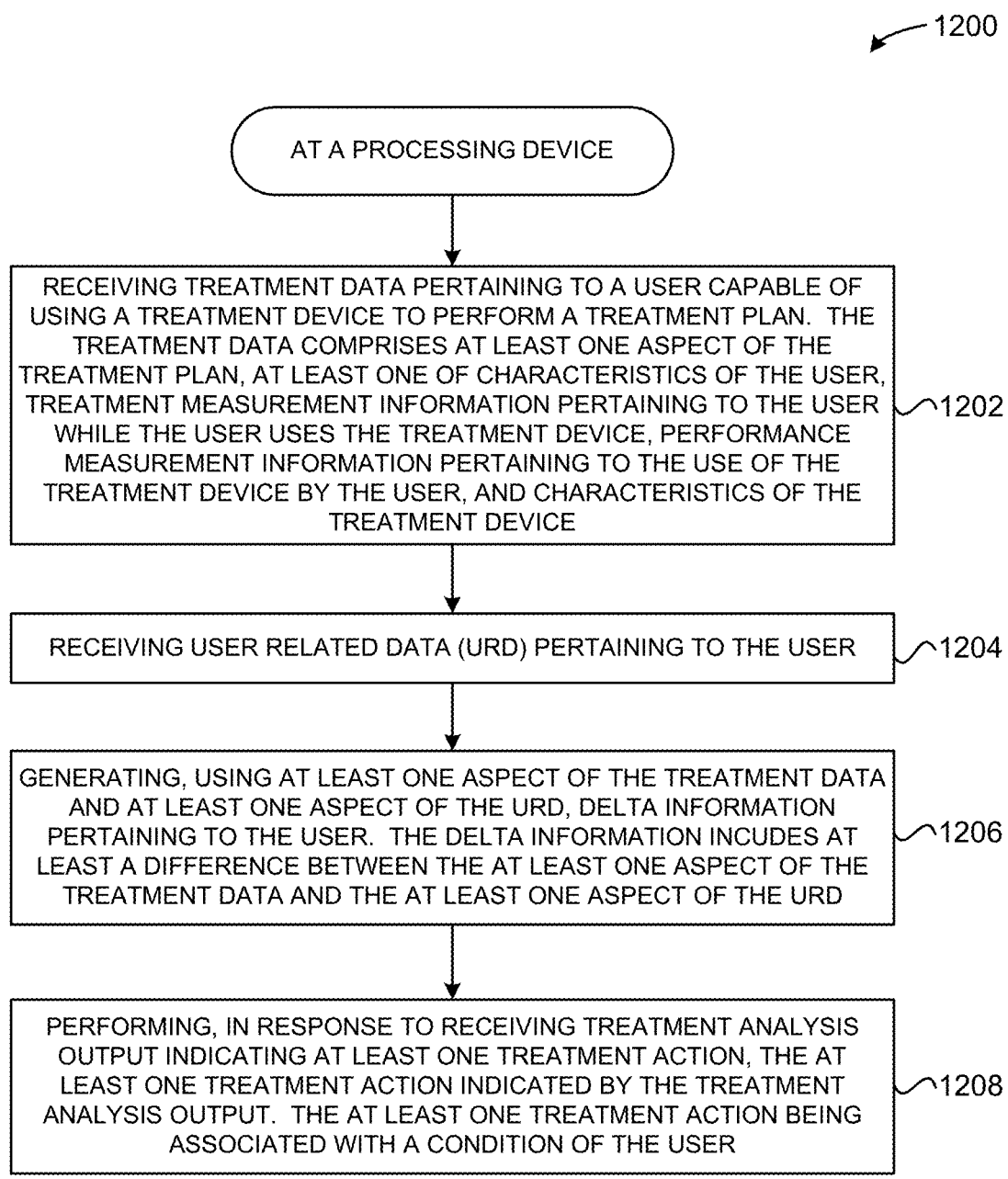
FIG. 12 is a flow diagram generally illustrating a method for predicting, based on treatment data received while a user uses the treatment device of FIG. 2, a condition of the user according to the principles of the present disclosure.

FIG. 12 is a flow diagram generally illustrating a method 1200 for predicting, based on treatment data received while a user uses a treatment device, a condition of the user, according to the present disclosure. The method 1200 is performed by processing logic that may include hardware (circuitry, dedicated logic, etc.), software (such as is run on a general-purpose computer system or a dedicated machine), or a combination of both. The method 1200 and/or each of its individual functions, routines, subroutines, or operations may be performed by one or more processors of a computing device (e.g., any component of FIG. 1, such as server 30 executing the artificial intelligence engine 11). In some embodiments, the method 1200 may be performed by a single processing thread. Alternatively, the method 1200 may be performed by two or more processing threads, each thread implementing one or more individual functions, routines, subroutines, or operations of the methods.

For simplicity of explanation, the method 1200 is depicted and described as a series of operations. However, operations in accordance with this disclosure can occur in various orders and/or concurrently, and/or with other operations not presented and described herein. For example, the operations depicted in the method 1200 may occur in combination with any other operation of any other method disclosed herein. Furthermore, not all illustrated operations may be required to implement the method 1200 in accordance with the disclosed subject matter. In addition, those skilled in the art will understand and appreciate that the method 1200 could alternatively be represented as a series of interrelated states via a state diagram or events.

At 1202, the processing device may receive treatment data pertaining to a user capable of using a treatment device to perform a treatment plan. The treatment data may comprise at least one aspect of the treatment plan, at least one of characteristics of the user, treatment measurement information pertaining to the user while the user uses the treatment device, performance measurement information pertaining to the use of the treatment device by the user, and characteristics of the treatment device.

At 1204, the processing device may receive URD pertaining to the user.

At 1206, the processing device may generate, using at least one aspect of the treatment data and at least one aspect of the URD, delta information pertaining to the user. The delta information may include at least a difference between the at least one aspect of the treatment data and the at least one aspect of the URD.

At 1208, the processing device may perform, in response to receiving treatment analysis output indicating at least one treatment action, the at least one treatment action indicated by the treatment analysis output, wherein the at least one treatment action is associated with a condition of the user.

Yet another technical problem may include protecting personal healthcare information (PHI) associated with the patient. PHI is a type of Personal Identifying Information or PII. The patient may include an individual, user, or person using the treatment device to perform various exercises and/or a patient, user or person seeking at least one healthcare service associated with medical treatment or medical consultation for one or more conditions. The patient may seek at least one healthcare service associated with medical treatment or medical consultation for one or more conditions, while remaining anonymous or pseudonymous. For example, the at least one healthcare service may include healthcare services associated with one or more conditions for which the patient desires to maintain privacy. For example, the at least one healthcare service may include healthcare services associated with at least one of the following, which are examples of conditions for which patients may prefer privacy (over conditions such as having a broken finger, or having the flu, etc., where privacy is often less important): erectile dysfunction, sexually transmitted disease test results or diagnoses, hemorrhoids, ulcerative colitis, irritable bowel syndrome or disorder, Crohn's disease, diseases or conditions related to the genitourinary systems of males, female or other genders, gender reassignment surgery or medications and hormones prescribed and associated therewith, neurodegenerative diseases, and cancer diagnoses, treatments or conditions, and the like. As used herein, the term anonymous may refer to an inability to trace or de-identify the patient identity and the term pseudonymous may refer to an ability to trace or de-identify the patent identity though a controlled means (e.g., such as a controlled database and/or one way encoding using one or more PETs).

Additionally, or alternatively, the at least one healthcare service may include healthcare services associated with one or more orthopedic conditions. Due to professional or other reasons, the patient may desire to remain anonymous or pseudonymous while seeking and engaging with the at least one healthcare service.

Additionally, or alternatively, the at least one healthcare service may be associated with one or more mental health conditions, such as post-traumatic stress disorder, generalized anxiety, depression, bipolar disorder, borderline personality disorder, and/or any other suitable mental health condition.

Accordingly, the systems and methods described herein may be configured to protect private healthcare information associated with the patient and/or allow the patient to remain anonymous or pseudonymous while seeking and/or engaging with healthcare services. In some embodiments, the systems and methods described herein may be configured to receive at least a first electronic medical record associated with the patient. The first electronic medical record may be associated with an electronic medical records system or other suitable source. As described, the first electronic medical record may include information associated with the patient. At least some of the information of the first electronic medical record may include information that is private and/or of a personal nature. As described, the patient may, while providing adequate information associated with receiving healthcare services, desire to keep such information private while discussing one or more conditions with a healthcare provider In some embodiments, the systems and methods described herein may be configured to generate a patient identifier associated with the patient. The patient identifier may include alphanumeric and/or special character information (e.g., such as a unique character string comprising one or more alphanumeric characters and/or one or more special characters), and/or other suitable identifier or identifying information. Additionally, or alternatively, the patient identifier may be associated with one or more characteristics associated with the patient. For example, the patient identifier may be associated with physiological information about the patient, medications currently being taken by the patient, and the like. The systems and methods described herein may be configured to store, in a centralized database or other suitable location, the patient identifier. The systems and methods described herein may be configured to correlate the patient identifier with the patient.

In some embodiments, the systems and methods described herein may be configured to generate, using the patient identifier and at least a portion of the first electronic medical record, at least one protected electronic medical record corresponding to the first electronic medical record. In some embodiments, at least a portion of the first electronic medical record may be in plaintext. Additionally, or alternatively, at least a portion of the first electronic medical record may be in plaintext and may be further protected by one or more privacy enhancing technologies (PETs). Additionally, or alternatively, the first electronic medical record may be fully protected by one or more PETs.

For example, the systems and methods described herein may be configured to execute and be controlled by a PET engine that uses one or more PETs that control access to personally identifiable information (PII) associated with the first electronic medical record. Controlling access may refer to defining access, enabling access, disabling access, etc. "Access," as used in the foregoing, and as further explicated below, may further comprise means of de-identification or re-identification. In some embodiments, the PET engine may be configured to pseudonymize or anonymize the PII associated with the patient. In some embodiments, the PET engine may enable de-identification and/or re-identification of the PII associated with the patient. PETs, as used by the PET engine herein, may include, without limitation, differential privacy, homomorphic encryption, public key encryption, digital notarization, pseudonymization, pseudonymisation, Anonymization, anonymisation, digital rights management, k-anonymity, 1-diversity, synthetic data generation, suppression, generalization, identity management, and the introduction of noise into existing data or systems. Further, the foregoing may apply in either or both of classical and quantum computing environments, or in any mix thereof. In some embodiments, the one or more PETs may be configured to support aspects of at least one of the Health Insurance Portability and Accountability Act (HIPAA) requirements, Gramm-Leach-Bliley Act (GLBA) requirements, European General Data Protection Regulation (GDPR) requirements, other suitable requirements, or a combination thereof.

In some embodiments, the at least one protected electronic medical record may be associated with at least the portion of the first electronic medical record in plaintext. In some embodiments, the at least one protected electronic medical record may configured to be used in place of at least the portion of the first electronic medical record in plaintext. Additionally, or alternatively, the first electronic medical record may be fully protected by one or more PETs.

In some embodiments, the systems and methods described herein may be configured to identify, based on at least one healthcare service indicated by the patient, a healthcare provider associated with providing the at least one healthcare service. The at least one healthcare service may be included in the first medical record, indicated by the patient using a user interface, or otherwise indicated by the patient.

In some embodiments, the at least one healthcare service may include any of the healthcare services described herein, any other suitable healthcare services, or a combination thereof. In some embodiments, the systems and methods described herein may be configured to identify, based on at least one of the at least one healthcare service and the identified healthcare provider, relevant information associated with the first electronic medical record. The relevant information may correspond to the at least one portion of the first electronic medical record used to generate the at least one protected electronic medical record.

In some embodiments, the systems and methods described herein may be configured to provide, at least at a healthcare provider interface of the healthcare provider, at least one of the patient identifier and at least a portion of the first electronic medical record. In some embodiments, the systems and methods described herein may be configured to provide, at least at the healthcare provider interface during a telemedicine session, the at least one of the patient identifier and at least the portion of the at least one protected electronic medical record.

In some embodiments, the systems and methods described herein may be configured to receive input from the patient, wherein the input indicates a selected portion of the first electronic medical record. For example, the patient may desire to provide further information related to the first electronic medical record to the healthcare provider. The input may indicate the further information to be provided to the healthcare provider.

The systems and methods described herein may be configured to generate, using the input indicating the selected portion of the electronic medical record, at least one other protected medical record. The systems and methods described herein may be configured to provide, at least at the healthcare provider interface, at least a portion of the at least one other protected electronic medical record. The systems and methods described herein may be configured to provide, at least at the healthcare provider interface during a telemedicine session, at least a portion of the at least one other protected electronic medical record.

In some embodiments, the healthcare provider may generate, for the patient, a treatment plan corresponding to one or more conditions of the patient. Typically, the patient may perform, using the treatment device, various aspects of the treatment plan to treat one or more conditions of the patient. For example, the patient may be recovering from an orthopedic surgery, a cardiac surgery, a neurological surgery, a gastrointestinal surgery, a genito-urological surgery, a gynecological surgery, or other surgery and may use the treatment device to rehabilitate one or more affected portions of the patient's body. Alternatively, the patient may be recovering from a neurological surgery or a program to treat mental unwellness and may use the treatment device to rehabilitate neurological or other mental responses or brain functions which have a physical manifestation with regard to one or more directly or indirectly affected portions of the patient's body. Alternatively, the patient may be being treated for physical and/or mental conditions associated with post-traumatic stress disorder (PTSD) and may use the treatment device to rehabilitate neurological or other mental responses or brain functions, which have a physical manifestation. Further, the patient, while recovering from post-traumatic stress disorder, may use the treatment device to improve general mental health (e.g., through exercise, goal-oriented activity and achievement, and the like). Alternatively, the patient may be being treated for a somatoform disorder associated with PTSD or other trauma, injury, and the like. The patient may use the treatment device to rehabilitate neurological or other mental responses or brain functions, which have a physical manifestation and/or other mental manifestation. Such conditions may be referred to as primary conditions (e.g., conditions for which the patient uses the treatment device to perform the treatment plan). Similarly, the patient may use the treatment device to strength training aspects of the treatment plan or other strength training plan.

Figure 13:
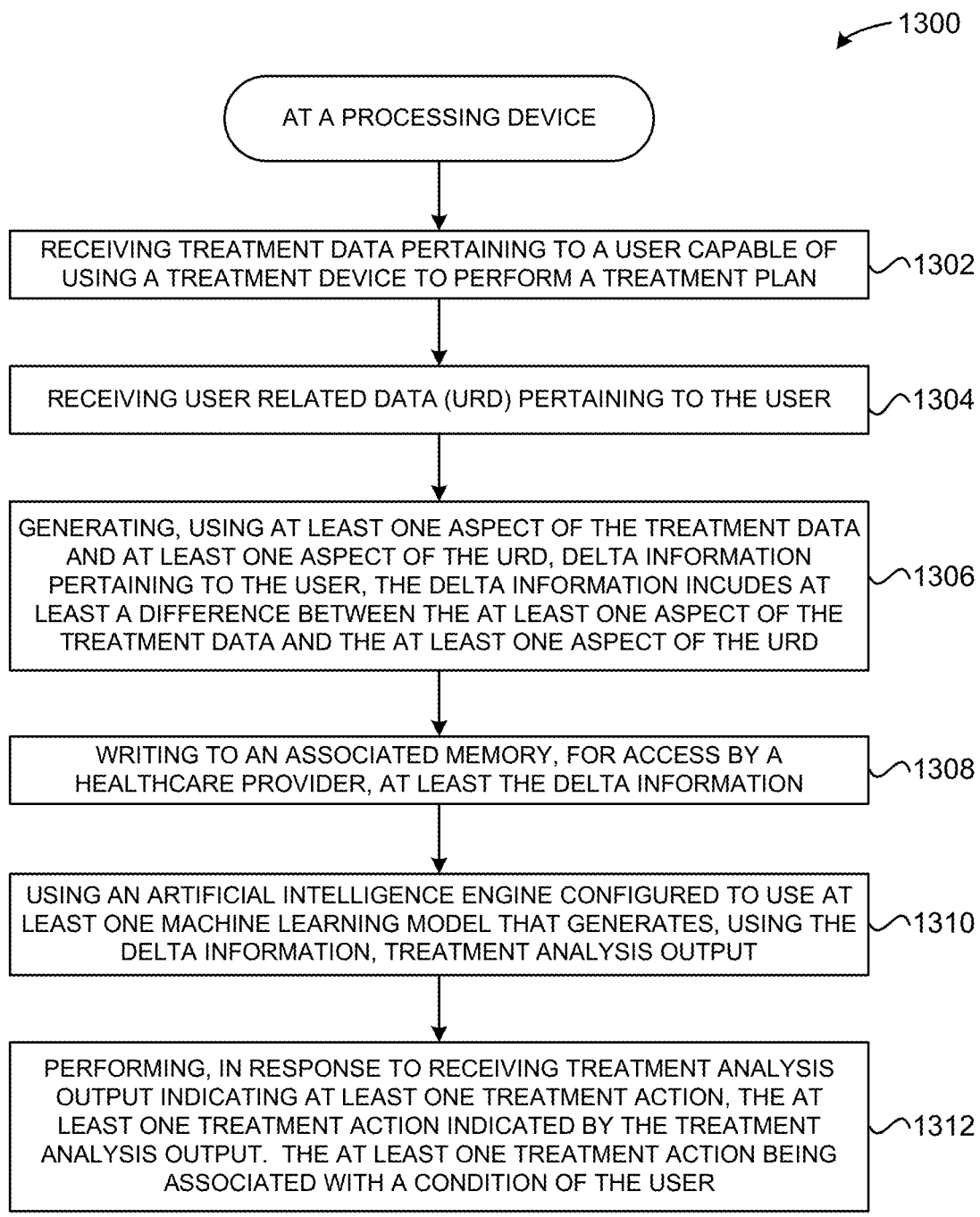
FIG. 13 is a flow diagram generally illustrating an alternative method for predicting, based on treatment data received while a user uses the treatment device of FIG. 2, a condition of the user according to the principles of the present disclosure.

FIG. 13 is a flow diagram generally illustrating an alternative method 1300 for predicting, based on treatment data received while a user uses a treatment device, a condition of the user, according to the present disclosure. Method 1300 includes operations performed by processors of a computing device (e.g., any component of FIG. 1, such as server 30 executing the artificial intelligence engine 11). In some embodiments, one or more operations of the method 1300 are implemented in computer instructions stored on a memory device and executed by a processing device. The method 1300 may be performed in the same or a similar manner as described above in regard to method 1200. The operations of the method 1300 may be performed in some combination with any of the operations of any of the methods described herein.

At 1302, the processing device may receive treatment data pertaining to a user capable of using a treatment device to perform a treatment plan. The treatment data may comprise at least one aspect of the treatment plan, at least one of characteristics of the user, treatment measurement information pertaining to the user while the user uses the treatment device, performance measurement information pertaining to the use of the treatment device by the user, and characteristics of the treatment device.

At 1304, the processing device may receive URD pertaining to the user.

At 1306, the processing device may generate, using at least one aspect of the treatment data and at least one aspect of the URD, delta information pertaining to the user. The delta information may include at least a difference between the at least one aspect of the treatment data and the at least one aspect of the URD.

At 1308, the processing device may write to an associated memory, for access by a healthcare professional, at least the delta information.

At 1310, the processing device may use an artificial intelligence engine configured to use at least one machine learning model that generates, using the delta information, treatment analysis output.

At 1312, the processing device may perform, in response to receiving treatment analysis output indicating at least one treatment action, the at least one treatment action indicated by the treatment analysis output, wherein the at least one treatment action is associated with a condition of the user.

Figure 14:
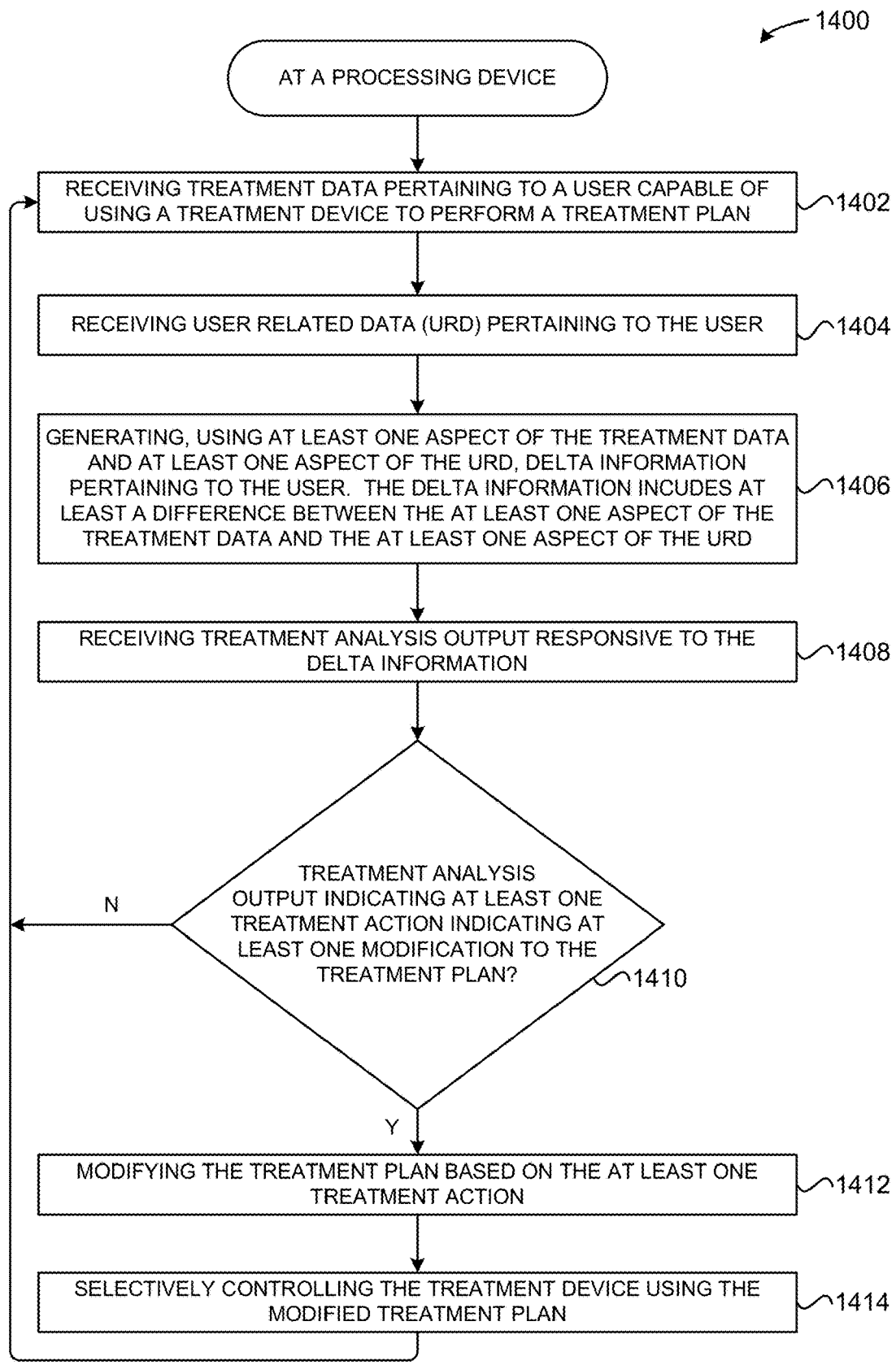
FIG. 14 is a flow diagram generally illustrating an alternative method for predicting, based on treatment data received while a user uses the treatment device of FIG. 2, a condition of the user according to the principles of the present disclosure.

FIG. 14 is a flow diagram generally illustrating an alternative method 1400 for predicting, based on treatment data received while a user uses a treatment device, a condition of the user, according to the present disclosure. Method 1400 includes operations performed by processors of a computing device (e.g., any component of FIG. 1, such as server 30 executing the artificial intelligence engine 14). In some embodiments, one or more operations of the method 1400 are implemented in computer instructions stored on a memory device and executed by a processing device. The method 1400 may be performed in the same or a similar manner as described above in regard to method 1200 and/or method 1300. The operations of the method 1400 may be performed in some combination with any of the operations of any of the methods described herein.

At 1402, the processing device may receive treatment data pertaining to a user capable of using a treatment device to perform a treatment plan. The treatment data may comprise at least one aspect of the treatment plan, at least one of characteristics of the user, treatment measurement information pertaining to the user while the user uses the treatment device, performance measurement information pertaining to the use of the treatment device by the user, and characteristics of the treatment device.

At 1404, the processing device may receive URD pertaining to the user.

At 1406, the processing device may generate, using at least one aspect of the treatment data and at least one aspect of the URD, delta information pertaining to the user. The delta information may include at least a difference between the at least one aspect of the treatment data and the at least one aspect of the URD.

At 1408, the processing device may receive treatment analysis output responsive to the delta information.

At 1410, the processing device may determine whether the treatment analysis output indicates at least one treatment action including at least one modification to the treatment plan. If the processing device determines that the treatment analysis output indicates at least one treatment action including at least one modification to the treatment plan, the processing device continues at 1412. Alternatively, if the processing device determines that the treatment analysis output does not indicate at least one treatment action including at least one modification to the treatment plan, the processing device continues at 1402.

At 1412, the processing device may modify, based on the at least one treatment action and/or the treatment analysis output, at least one aspect of the treatment plan.

At 1414, the processing device may selectively control, using the modified treatment plan, the treatment device 70. In some embodiments, the processing device may control, during a telemedicine session and while the user uses the treatment device 70, the treatment device 70.

Figure 15:
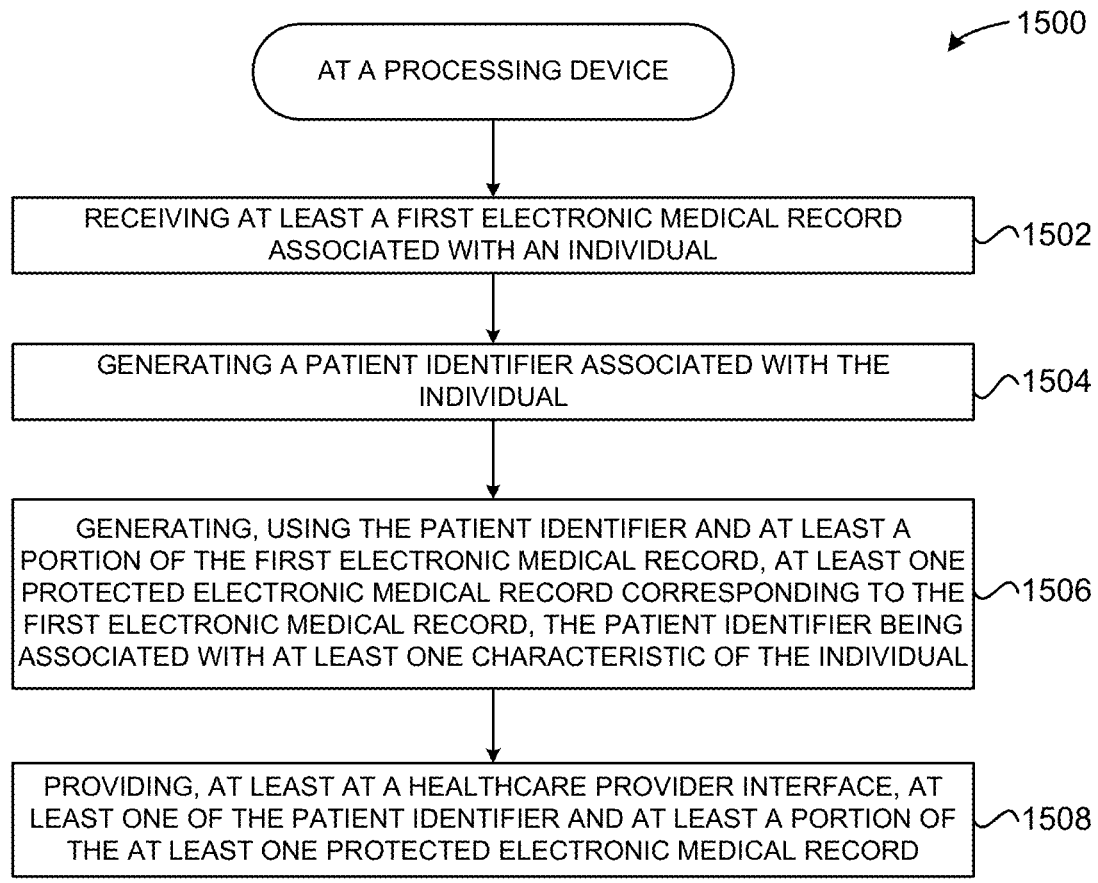
FIG. 15 is a flow diagram generally illustrating a method for protecting healthcare information associated with an individual according to the principles of the present disclosure.

FIG. 15 is a flow diagram generally illustrating a method 1500 for protecting healthcare information associated with an individual according to the principles of the present disclosure. The method 1500 is performed by processing logic that may include hardware (circuitry, dedicated logic, etc.), software (such as is run on a general-purpose computer system or a dedicated machine), or a combination of both. The method 1500 and/or each of its individual functions, routines, subroutines, or operations may be performed by one or more processors of a computing device (e.g., any component of FIG. 1, such as server 30 executing the artificial intelligence engine 11). In some embodiments, the method 1500 may be performed by a single processing thread. Alternatively, the method 1500 may be performed by two or more processing threads, each thread implementing one or more individual functions, routines, subroutines, or operations of the methods.

For simplicity of explanation, the method 1500 is depicted and described as a series of operations. However, operations in accordance with this disclosure can occur in various orders and/or concurrently, and/or with other operations not presented and described herein. For example, the operations depicted in the method 1500 may occur in combination with any other operation of any other method disclosed herein. Furthermore, not all illustrated operations may be required to implement the method 1500 in accordance with the disclosed subject matter. In addition, those skilled in the art will understand and appreciate that the method 1500 could alternatively be represented as a series of interrelated states via a state diagram or events.

At 1502, the processing device may receive at least a first electronic medical record associated with an individual. At 1504, the processing device may generate a patient identifier associated with the individual. At 1506, the processing device may generate, using the patient identifier and at least a portion of the first electronic medical record, at least one protected electronic medical record corresponding to the first electronic medical record. The patient identifier may be associated with at least one characteristic of the individual. At 1508, the processing device may provide, at least at a healthcare provider interface, at least one of the patient identifier and at least a portion of the at least one protected electronic medical record.

Figure 16:
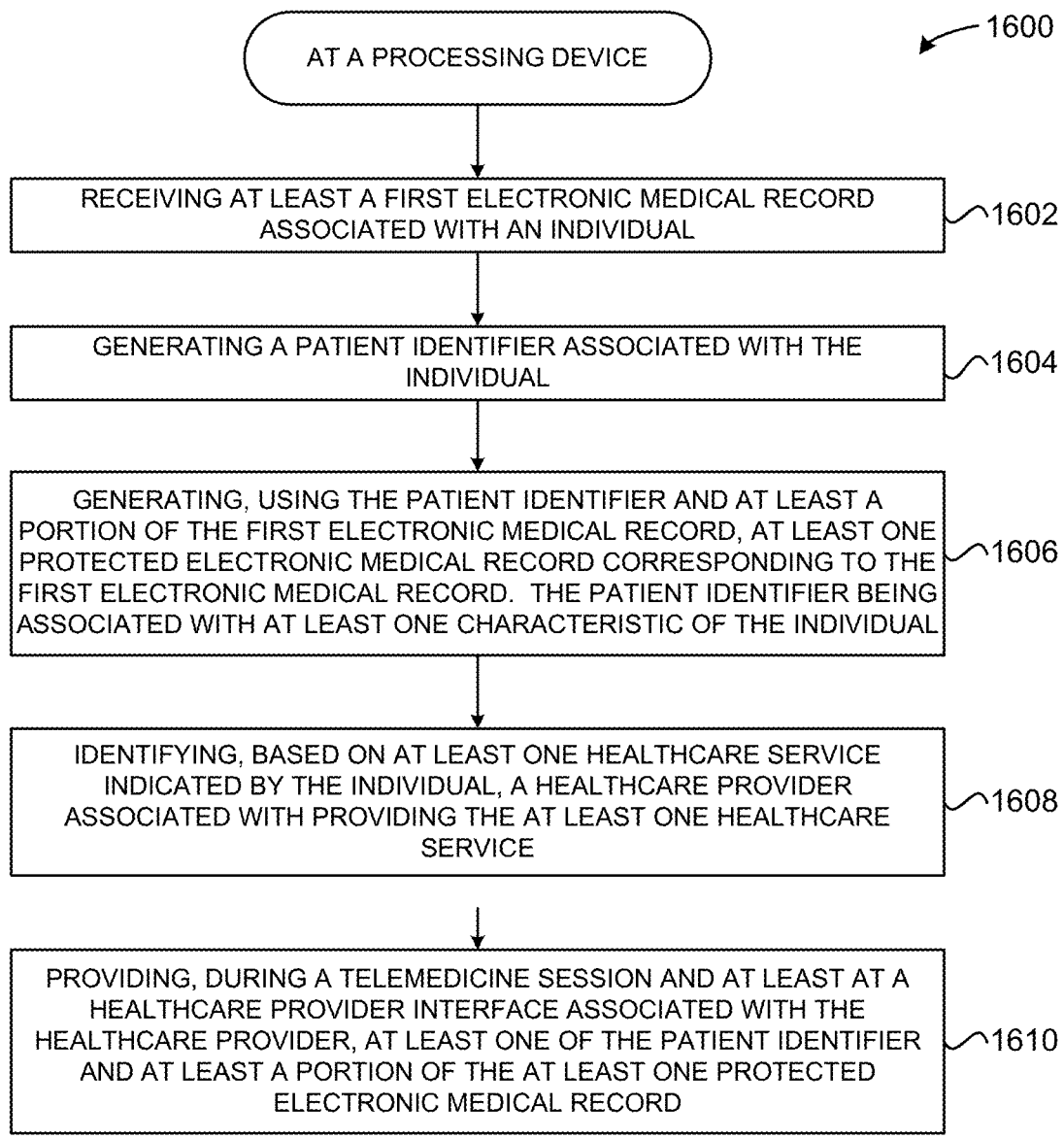
FIG. 16 is a flow diagram generally illustrating an alternative method for protecting healthcare information associated with an individual according to the principles of the present disclosure.

FIG. 16 is a flow diagram generally illustrating an alternative method 1600 for protecting healthcare information associated with an individual according to the principles of the present disclosure. Method 1600 includes operations performed by processors of a computing device (e.g., any component of FIG. 1, such as server 30 executing the artificial intelligence engine 11). In some embodiments, one or more operations of the method 1600 are implemented in computer instructions stored on a memory device and executed by a processing device. The method 1600 may be performed in the same or a similar manner as described above in regard to method 900. The operations of the method 1600 may be performed in some combination with any of the operations of any of the methods described herein.

At 1602, receive at least a first electronic medical record associated with an individual. At 1604, the processing device may generate a patient identifier associated with the individual. At 1606, the processing device may generate, using the patient identifier and at least a portion of the first electronic medical record, at least one protected electronic medical record corresponding to the first electronic medical record. The patient identifier may be associated with at least one characteristic of the individual.

At 1608, the processing device may identify, based on at least one healthcare service indicated by the individual, a healthcare provider associated with providing the at least one healthcare service. At 1610, the processing device may provide, during a telemedicine session and at least at a healthcare provider interface associated with the healthcare provider, at least one of the patient identifier and at least a portion of the at least one protected electronic medical record.

Figure 17:
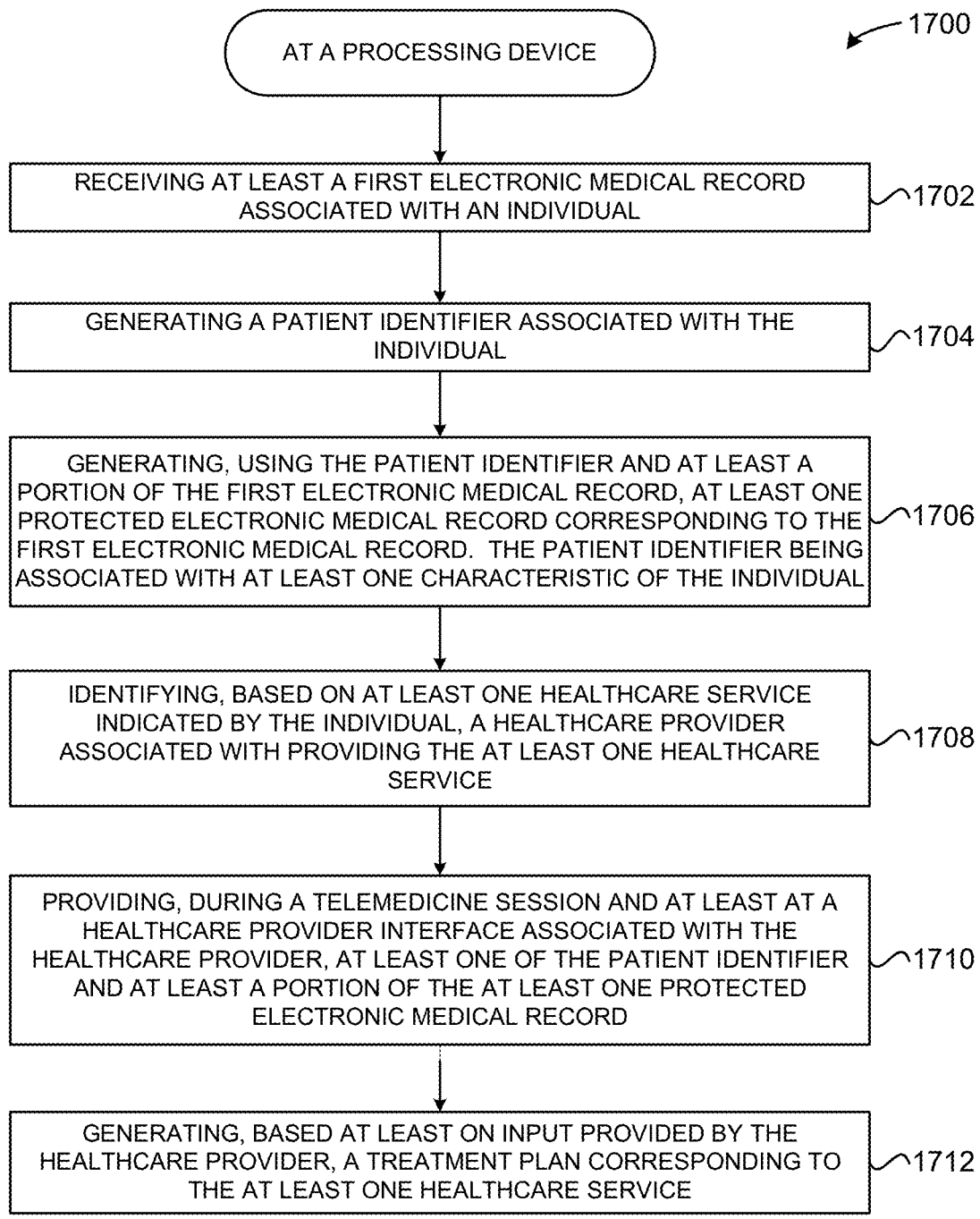
FIG. 17 is a flow diagram generally illustrating an alternative method for protecting healthcare information associated with an individual according to the principles of the present disclosure.

FIG. 17 is a flow diagram generally illustrating an alternative method 1700 for protecting healthcare information associated with an individual according to the principles of the present disclosure. Method 1700 includes operations performed by processors of a computing device (e.g., any component of FIG. 1, such as server 30 executing the artificial intelligence engine 17). In some embodiments, one or more operations of the method 1700 are implemented in computer instructions stored on a memory device and executed by a processing device. The method 1700 may be performed in the same or a similar manner as described above in regard to method 900 and/or method 1000. The operations of the method 1700 may be performed in some combination with any of the operations of any of the methods described herein.

At 1702, receive at least a first electronic medical record associated with an individual. At 1704, the processing device may generate a patient identifier associated with the individual. At 1706, the processing device may generate, using the patient identifier and at least a portion of the first electronic medical record, at least one protected electronic medical record corresponding to the first electronic medical record. The patient identifier may be associated with at least one characteristic of the individual.

At 1708, the processing device may identify, based on at least one healthcare service indicated by the individual, a healthcare provider associated with providing the at least one healthcare service. At 1710, the processing device may provide, during a telemedicine session and at least at a healthcare provider interface associated with the healthcare provider, at least one of the patient identifier and at least a portion of the at least one protected electronic medical record.

At 1712, the processing device may generate, based at least on input provided by the healthcare provider, a treatment plan corresponding to the at least one healthcare service. The individual may use the treatment device 70 to perform the treatment plan.

Figure 18:
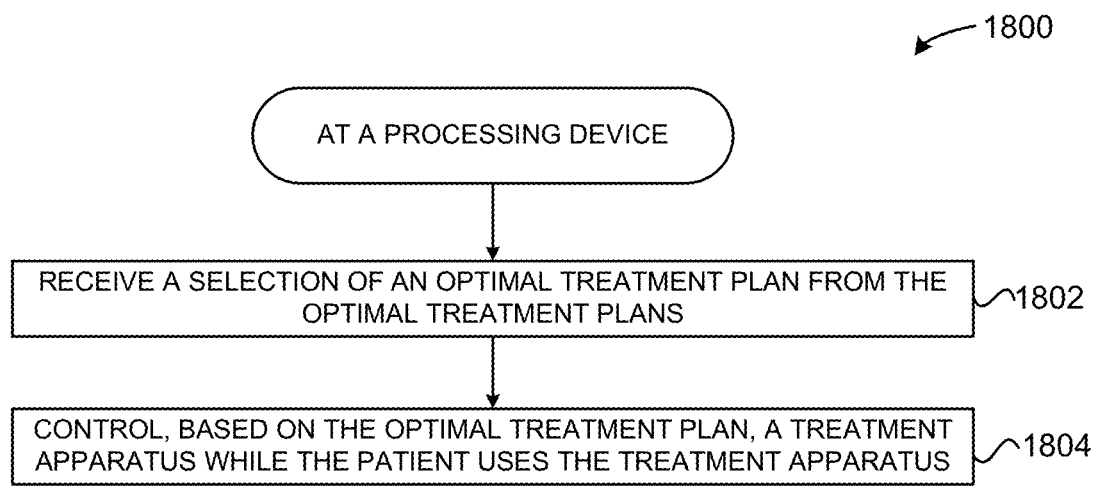
FIG. 18 is a flow diagram generally illustrating a method for receiving a selection of an optimal treatment plan and controlling, based on the optimal treatment plan, a treatment device while the patient uses the treatment device according to the present disclosure.

FIG. 18 generally illustrates an example embodiment of a method 1800 for receiving a selection of an optimal treatment plan and controlling a treatment device while the patient uses the treatment device according to the present disclosure, based on the optimal treatment plan. Method 1800 includes operations performed by processors of a computing device (e.g., any component of FIG. 1, such as server 30 executing the artificial intelligence engine 11). In some embodiments, one or more operations of the method 1800 are implemented in computer instructions stored on a memory device and executed by a processing device. The method 1800 may be performed in the same or a similar manner as described above in regard to method 900. The operations of the method 1800 may be performed in some combination with any of the operations of any of the methods described herein.

Prior to the method 1800 being executed, various optimal treatment plans may be generated by one or more trained machine learning models 13 of the artificial intelligence engine 11. For example, based on a set of treatment plans pertaining to a medical condition of a patient, the one or more trained machine learning models 13 may generate the optimal treatment plans. The various treatment plans may be transmitted to one or more computing devices of a patient and/or medical professional.

At 1802 of the method 1800, the processing device may receive a selection of an optimal treatment plan from the optimal treatment plans. The selection may have been entered on a user interface presenting the optimal treatment plans on the patient interface 50 and/or the assistant interface 94.

At 1804, the processing device may control, while the patient uses the treatment device 70, based on the selected optimal treatment plan, the treatment device 70. In some embodiments, the controlling is performed distally by the server 30. For example, if the selection is made using the patient interface 50, one or more control signals may be transmitted from the patient interface 50 to the treatment device 70 to configure, according to the selected treatment plan, a setting of the treatment device 70 to control operation of the treatment device 70. Further, if the selection is made using the assistant interface 94, one or more control signals may be transmitted from the assistant interface 94 to the treatment device 70 to configure, according to the selected treatment plan, a setting of the treatment device 70 to control operation of the treatment device 70.

It should be noted that, as the patient uses the treatment device 70, the sensors 76 may transmit measurement data to a processing device. The processing device may dynamically control, according to the treatment plan, the treatment device 70 by modifying, based on the sensor measurements, a setting of the treatment device 70. For example, if the force measured by the sensor 76 indicates the user is not applying enough force to a pedal 102, the treatment plan may indicate to reduce the required amount of force for an exercise.

It should be noted that, as the patient uses the treatment device 70, the user may use the patient interface 50 to enter input pertaining to a pain level experienced by the patient as the patient performs the treatment plan. For example, the user may enter a high degree of pain while pedaling with the pedals 102 set to a certain range of motion on the treatment device 70. The pain level may cause the range of motion to be dynamically adjusted based on the treatment plan. For example, the treatment plan may specify alternative range of motion settings if a certain pain level is indicated when the user is performing an exercise at a certain range of motion.

Figure 19:
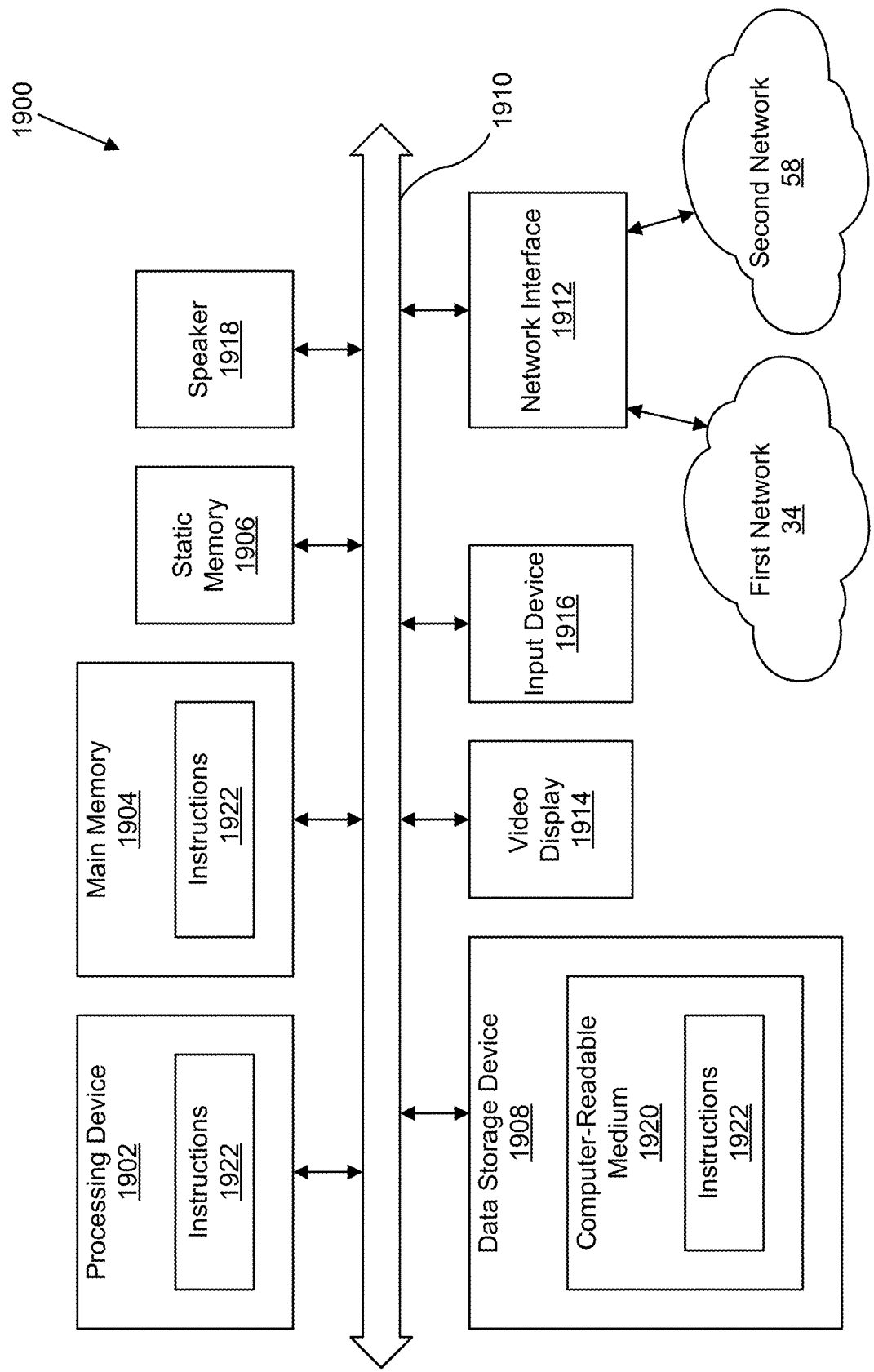
FIG. 19 generally illustrates a computer system according to the principles of the present disclosure.

FIG. 19 generally illustrates an example computer system 1900 that can perform any one or more of the methods described herein, in accordance with one or more aspects of the present disclosure. In one example, computer system 1900 may include a computing device and correspond to the assistance interface 94, reporting interface 92, supervisory interface 90, clinician interface 20, server 30 (including the AI engine 11), patient interface 50, ambulatory sensor 82, goniometer 84, treatment device 70, pressure sensor 86, or any suitable component of FIG. 1. The computer system 1900 may be capable of executing instructions implementing the one or more machine learning models 13 of the artificial intelligence engine 11 of FIG. 1. The computer system may be connected (e.g., networked) to other computer systems in a LAN, an intranet, an extranet, or the Internet, including via the cloud or a peer-to-peer network.

The computer system may operate in the capacity of a server in a client-server network environment. The computer system may be a personal computer (PC), a tablet computer, a wearable (e.g., wristband), a set-top box (STB), a personal Digital Assistant (PDA), a mobile phone, a camera, a video camera, an Internet of Things (IoT) device, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The computer system 1900 includes a processing device 1902, a main memory 1904 (e.g., read-only memory (ROM), flash memory, solid state drives (SSDs), dynamic random access memory (DRAM) such as synchronous DRAM (SDRAM)), a static memory 1906 (e.g., flash memory, solid state drives (SSDs), static random access memory (SRAM)), and a data storage device 1908, which communicate with each other via a bus 1910.

Processing device 1902 represents one or more general-purpose processing devices such as a microprocessor, central processing unit, or the like. More particularly, the processing device 1902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1402 may also be one or more special-purpose processing devices such as an application specific integrated circuit (ASIC), a system on a chip, a field programmable gate array (FPGA), a digital signal processor (DSP), network processor, or the like. The processing device 1402 is configured to execute instructions for performing any of the operations and steps discussed herein.

The computer system 1900 may further include a network interface device 1912. The computer system 1900 also may include a video display 1914 (e.g., a liquid crystal display (LCD), a light-emitting diode (LED), an organic light-emitting diode (OLED), a quantum LED, a cathode ray tube (CRT), a shadow mask CRT, an aperture grille CRT, a monochrome CRT), one or more input devices 1916 (e.g., a keyboard and/or a mouse or a gaming-like control), and one or more speakers 1918 (e.g., a speaker). In one illustrative example, the video display 1914 and the input device(s) 1916 may be combined into a single component or device (e.g., an LCD touch screen).

The data storage device 1916 may include a computer-readable medium 1920 on which the instructions 1922 embodying any one or more of the methods, operations, or functions described herein is stored. The instructions 1922 may also reside, completely or at least partially, within the main memory 1904 and/or within the processing device 1902 during execution thereof by the computer system 1900. As such, the main memory 1904 and the processing device 1902 also constitute computer-readable media. The instructions 1922 may further be transmitted or received over a network via the network interface device 1912.

While the computer-readable storage medium 1220 is generally illustrated in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Clause 1. A method comprising: receiving treatment data pertaining to a user capable of using a treatment device to perform a treatment plan, wherein the treatment data comprises at least one of characteristics of the user, treatment measurement information pertaining to the user while the user uses the treatment device, characteristics of the treatment device, and at least one aspect of the treatment plan; receiving activity data pertaining to the user while the user engages in at least one activity; generating treatment information using the treatment data and the activity data; writing to an associated memory, for access by a healthcare professional, the treatment information; and modifying at least one aspect of the treatment plan in response to receiving, from the healthcare professional, treatment plan input including at least one modification to the at least one aspect of the treatment plan.

Clause 2. The method of any clause herein, wherein the at least one activity includes an activity other than using the treatment device.

Clause 3. The method of any clause herein, wherein the healthcare professional includes at least an artificial intelligence engine configured to use at least one machine learning model that generates, using the treatment information, the treatment plan input.

Clause 4. The method of any clause herein, wherein the artificial intelligence engine is disposed on at least one of the treatment device, a remotely located server computing device, and a computing device of a healthcare professional.

Clause 5. The method of any clause herein, wherein the healthcare professional includes a human healthcare professional at least partially responsible for treatment of the user.

Clause 6. The method of any clause herein, further comprising communicating with an interface, at a computing device of the healthcare professional, wherein the interface is configured to receive the treatment plan input.

Clause 7. The method of any clause herein, further comprising controlling, while the user uses the treatment device, and based on the modified the at least one of the at least one aspect and any other aspect of the treatment plan, the treatment device.

Clause 8. The method of any clause herein, wherein the user uses the treatment device during a telemedicine session.

Clause 9. The method of any clause herein, wherein the treatment measurement information includes, while the user uses the treatment device, at least one of a vital sign of the user, a respiration rate of the user, a heart rate of the user, a temperature of the user, and a blood pressure of the user.

Clause 10. The method of any clause herein, wherein at least some of the treatment data corresponds to at least some of the sensor data from a sensor associated with the treatment device.

Clause 11. The method of any clause herein, wherein, while the user uses the treatment device, at least some of the treatment data corresponds to at least some of the sensor data from a sensor associated with a wearable device worn by the user.

Clause 12. The method of any clause herein, wherein, while the user engages in the at least one activity, at least some of the activity data corresponds to at least some sensor data from a one sensor associated with at least one wearable device worn by the user.

Clause 13. The method of any clause herein, wherein the at least one wearable device includes a goniometer.

Clause 14. The method of any clause herein, wherein the at least one wearable device includes a pedometer.

Clause 15. The method of any clause herein, wherein the at least one wearable device includes a goniometer and a pedometer.

Clause 16. The method of any clause herein, wherein generating the treatment information using the treatment data and the activity data includes: using an artificial intelligence engine configured to use at least one machine learning model to generate, based on the treatment data and the activity data, at least one output indicating at least a treatment progress of the user; and generating the treatment information using the at least one output.

Clause 17. The method of any clause herein, wherein the at least one output further includes at least one treatment recommendation associated with the treatment progress of the user.

Clause 18. The method of any clause herein, wherein the treatment plan input is associated with the at least one treatment recommendation of the at least one output.

Clause 19. The method of any clause herein, wherein generating the treatment information further includes using cohort data, the cohort data including at least treatment data and activity data for at least one user having at least one characteristic similar to at least one corresponding characteristic of the user.

Clause 20. A tangible, non-transitory computer-readable medium storing instructions that, when executed, cause a processing device to: receive treatment data pertaining to a user capable of using a treatment device to perform a treatment plan, wherein the treatment data comprises at least one of characteristics of the user, treatment measurement information pertaining to the user while the user uses the treatment device, characteristics of the treatment device, and at least one aspect of the treatment plan; receive activity data pertaining to the user while the user engages in at least one activity; generate treatment information using the treatment data and the activity data; write to an associated memory, for access by a healthcare professional, the treatment information; and modify at least one aspect of the treatment plan in response to receiving, from the healthcare professional, treatment plan input including at least one modification to the at least one aspect of the treatment plan.

Clause 21. The computer-readable medium of any clause herein, wherein the at least one activity includes an activity other than using the treatment device.

Clause 22. The computer-readable medium of any clause herein, wherein the healthcare professional includes at least an artificial intelligence engine configured to use at least one machine learning model that generates, using the treatment information, the treatment plan input.

Clause 23. The computer-readable medium of any clause herein, wherein the artificial intelligence engine is disposed on at least one of the treatment device, a remotely located server computing device, and a computing device of a healthcare professional.

Clause 24. The computer-readable medium of any clause herein, wherein the healthcare professional includes a human healthcare professional at least partially responsible for treatment of the user.

Clause 25. The computer-readable medium of any clause herein, wherein the instructions further cause the processor to communicate with an interface, at a computing device of the healthcare professional, wherein the interface is configured to receive the treatment plan input.

Clause 26. The computer-readable medium of any clause herein, wherein the instructions further cause the processor to control, while the user uses the treatment device, and based on the modified the at least one of the at least one aspect and any other aspect of the treatment plan, the treatment device.

Clause 27. The computer-readable medium of any clause herein, wherein the user uses the treatment device during a telemedicine session.

Clause 28. The computer-readable medium of any clause herein, wherein the treatment measurement information includes, while the user uses the treatment device, at least one of a vital sign of the user, a respiration rate of the user, a heart rate of the user, a temperature of the user, and a blood pressure of the user.

Clause 29. The computer-readable medium of any clause herein, wherein at least some of the treatment data corresponds to at least some of the sensor data from a sensor associated with the treatment device.

Clause 30. The computer-readable medium of any clause herein, wherein, while the user uses the treatment device, at least some of the treatment data corresponds to at least some of the sensor data from a sensor associated with a wearable device worn by the user.

Clause 31. The computer-readable medium of any clause herein, wherein, while the user engages in the at least one activity, at least some of the activity data corresponds to at least some sensor data from a one sensor associated with at least one wearable device worn by the user.

Clause 32. The computer-readable medium of any clause herein, wherein the at least one wearable device includes a goniometer.

Clause 33. The computer-readable medium of any clause herein, wherein the at least one wearable device includes a pedometer.

Clause 34. The computer-readable medium of any clause herein, wherein the at least one wearable device includes a goniometer and a pedometer.

Clause 35. The computer-readable medium of any clause herein, wherein the instructions further cause the processor to generate the treatment information by: using an artificial intelligence engine configured to use at least one machine learning model to generate, based on the treatment data and the activity data, at least one output indicating at least a treatment progress of the user; and generating the treatment information using the at least one output.

Clause 36. The computer-readable medium of any clause herein, wherein the at least one output further includes at least one treatment recommendation associated with the treatment progress of the user.

Clause 37. The computer-readable medium of any clause herein, wherein the treatment plan input is associated with the at least one treatment recommendation of the at least one output.

Clause 38. The computer-readable medium of any clause herein, wherein the instructions further cause the processor to generate the treatment information further using cohort data, the cohort data including at least treatment data and activity data for at least one user having at least one characteristic similar to at least one corresponding characteristic of the user.

Clause 39. A system comprising: a processor; and a memory that includes instructions that, when executed by the processor, cause the processor to: receive treatment data pertaining to a user capable of using a treatment device to perform a treatment plan, wherein the treatment data comprises at least one of characteristics of the user, treatment measurement information pertaining to the user while the user uses the treatment device, characteristics of the treatment device, and at least one aspect of the treatment plan; receive activity data pertaining to the user while the user engages in at least one activity; generate treatment information using the treatment data and the activity data; write to an associated memory, for access by a healthcare professional, the treatment information; and modify at least one aspect of the treatment plan in response to receiving, from the healthcare professional, treatment plan input including at least one modification to the at least one aspect of the treatment plan.

Clause 40. The system of any clause herein, wherein the at least one activity includes an activity other than using the treatment device.

Clause 41. The system of any clause herein, wherein the healthcare professional includes at least an artificial intelligence engine configured to use at least one machine learning model that generates, using the treatment information, the treatment plan input.

Clause 42. The system of any clause herein, wherein the artificial intelligence engine is disposed on at least one of the treatment device, a remotely located server computing device, and a computing device of a healthcare professional.

Clause 43. The system of any clause herein, wherein the healthcare professional includes a human healthcare professional at least partially responsible for treatment of the user.

Clause 44. The system of any clause herein, wherein the instructions further cause the processor to communicate with an interface, at a computing device of the healthcare professional, wherein the interface is configured to receive the treatment plan input.

Clause 45. The system of any clause herein, wherein the instructions further cause the processor to control, while the user uses the treatment device, and based on the modified the at least one of the at least one aspect and any other aspect of the treatment plan, the treatment device.

Clause 46. The system of any clause herein, wherein the user uses the treatment device during a telemedicine session.

Clause 47. The system of any clause herein, wherein the treatment measurement information includes, while the user uses the treatment device, at least one of a vital sign of the user, a respiration rate of the user, a heart rate of the user, a temperature of the user, and a blood pressure of the user.

Clause 48. The system of any clause herein, wherein at least some of the treatment data corresponds to at least some of the sensor data from a sensor associated with the treatment device.

Clause 49. The system of any clause herein, wherein, while the user uses the treatment device, at least some of the treatment data corresponds to at least some of the sensor data from a sensor associated with a wearable device worn by the user.

Clause 50. The system of any clause herein, wherein, while the user engages in the at least one activity, at least some of the activity data corresponds to at least some sensor data from a one sensor associated with at least one wearable device worn by the user.

Clause 51. The system of any clause herein, wherein the at least one wearable device includes a goniometer.

Clause 52. The system of any clause herein, wherein the at least one wearable device includes a pedometer.

Clause 53. The system of any clause herein, wherein the at least one wearable device includes a goniometer and a pedometer.

Clause 54. The system of any clause herein, wherein the instructions further cause the processor to generate the treatment information by: using an artificial intelligence engine configured to use at least one machine learning model to generate, based on the treatment data and the activity data, at least one output indicating at least a treatment progress of the user; and generating the treatment information using the at least one output.

Clause 55. The system of any clause herein, wherein the at least one output further includes at least one treatment recommendation associated with the treatment progress of the user.

Clause 56. The system of any clause herein, wherein the treatment plan input is associated with the at least one treatment recommendation of the at least one output.

Clause 57. The system of any clause herein, wherein the instructions further cause the processor to generate the treatment information further using cohort data, the cohort data including at least treatment data and activity data for at least one user having at least one characteristic similar to at least one corresponding characteristic of the user.

Clause 58. A method comprising: receiving treatment data pertaining to a user capable of using a treatment device to perform a treatment plan, wherein the treatment data comprises at least one aspect of the treatment plan, at least one of characteristics of the user, treatment measurement information pertaining to the user while the user uses the treatment device, performance measurement information pertaining to the use of the treatment device by the user, and characteristics of the treatment device; receiving user related data (URD) pertaining to the user; generating, using at least one aspect of the treatment data and at least one aspect of the URD, delta information pertaining to the user, the delta information indicating at least a difference between the at least one aspect of the treatment data and the at least one aspect of the URD; and performing, in response to receiving treatment analysis output indicating at least one treatment action, the at least one treatment action indicated by the treatment analysis output, the at least one treatment action being associated with a condition of the user.

Clause 59. The method of any clause herein, wherein the at least one treatment action includes modifying at least one aspect of the treatment plan.

Clause 60. The method of any clause herein, wherein the at least one treatment action includes controlling, while the user uses the treatment device, at least one aspect of the treatment device.

Clause 61. The method of any clause herein, wherein the at least one treatment action includes generating, based on the treatment analysis output, a notification.

Clause 62. The method of any clause herein, wherein the at least one treatment action further includes transmitting, to at least one of the user and an agent of the user, the notification.

Clause 63. The method of any clause herein, wherein the notification includes at least an indication of the condition associated with the user.

Clause 64. The method of any clause herein, wherein the notification comprises an aspect that includes sound.

Clause 65. The method of any clause herein, wherein the notification comprises an aspect that includes a visual display or projection.

Clause 66. The method of any clause herein, wherein the at least one condition associated with the user includes at least one of an active orthopedic condition, an incipient orthopedic condition, an active non-orthopedic condition, an incipient non-orthopedic condition, a condition related to an infection, a cardiac-related condition, a neurological-related condition, a condition related to one or more physiological structures in the human body, and a condition related to one or more anatomical structures in the human body.

Clause 67. The method of any clause herein, wherein, during a telemedicine session, the user uses the treatment device.

Clause 68. The method of any clause herein, wherein the treatment measurement information includes, while the user uses the treatment device, at least one of a vital sign of the user, a respiration rate of the user, a heart rate of the user, a temperature of the user, and a blood pressure of the user.

Clause 69. The method of any clause herein, wherein the performance measurement information includes at least one of a pedal pressure measurement of a first pedal of the treatment device, a pedal rotational angle of the first pedal of the treatment device for a respective pedal pressure measurement, a pedal pressure measurement of a second pedal of the treatment device, and a pedal rotational angle of the second pedal of the treatment device for a respective pedal pressure measurement.

Clause 70. The method of any clause herein, wherein at least some of the treatment data corresponds to at least some of the sensor data from a sensor associated with the treatment device.

Clause 71. The method of any clause herein, wherein at least some of the treatment data corresponds to at least some of the sensor data from a sensor associated with a wearable device worn by the user while the user uses the treatment device.

Clause 72. A tangible, non-transitory computer-readable medium storing instructions that, when executed, cause a processing device to: receive treatment data pertaining to a user capable of using a treatment device to perform a treatment plan, wherein the treatment data comprises at least one aspect of the treatment plan, at least one of characteristics of the user, treatment measurement information pertaining to the user while the user uses the treatment device, performance measurement information pertaining to the use of the treatment device by the user, and characteristics of the treatment device; receive user related data (URD) pertaining to the user; generate, using at least one aspect of the treatment data and at least one aspect of the URD, delta information pertaining to the user, the delta information indicating at least a difference between the at least one aspect of the treatment data and the at least one aspect of the URD; and perform, in response to receiving treatment analysis output indicating at least one treatment action, the at least one treatment action indicated by the treatment analysis output, the at least one treatment action being associated with a condition of the user.

Clause 73. The system of any clause herein, wherein the at least one treatment action includes modifying at least one aspect of the treatment plan.

Clause 74. The system of any clause herein, wherein the at least one treatment action includes controlling, while the user uses the treatment device, at least one aspect of the treatment device.

Clause 75. The system of any clause herein, wherein the at least one treatment action includes generating, based on the treatment analysis output, a notification.

Clause 76. The system of any clause herein, wherein the at least one treatment action further includes transmitting, to at least one of the user and an agent of the user, the notification.

Clause 77. The system of any clause herein, wherein the notification includes at least an indication of the condition associated with the user.

Clause 78. The system of any clause herein, wherein the notification comprises an aspect that includes sound.

Clause 79. The system of any clause herein, wherein the notification comprises an aspect that includes a visual display or projection.

Clause 80. The system of any clause herein, wherein the at least one condition associated with the user includes at least one of an active orthopedic condition, an incipient orthopedic condition, an active non-orthopedic condition, an incipient non-orthopedic condition, a condition related to an infection, a cardiac-related condition, a neurological-related condition, a condition related to one or more physiological structures in the human body, and a condition related to one or more anatomical structures in the human body.

Clause 81. The system of any clause herein, wherein, during a telemedicine session, the user uses the treatment device.

Clause 82. The system of any clause herein, wherein the treatment measurement information includes, while the user uses the treatment device, at least one of a vital sign of the user, a respiration rate of the user, a heart rate of the user, a temperature of the user, and a blood pressure of the user.

Clause 83. The system of any clause herein, wherein the performance measurement information includes at least one of a pedal pressure measurement of a first pedal of the treatment device, a pedal rotational angle of the first pedal of the treatment device for a respective pedal pressure measurement, a pedal pressure measurement of a second pedal of the treatment device, and a pedal rotational angle of the second pedal of the treatment device for a respective pedal pressure measurement.

Clause 84. The system of any clause herein, wherein at least some of the treatment data corresponds to at least some of the sensor data from a sensor associated with the treatment device.

Clause 85. The system of any clause herein, wherein at least some of the treatment data corresponds to at least some of the sensor data from a sensor associated with a wearable device worn by the user while the user uses the treatment device.

Clause 86. A system comprising: a processor; and a memory including instructions that, when executed by the processor, cause the processor to: receive treatment data pertaining to a user capable of using a treatment device to perform a treatment plan, wherein the treatment data comprises at least one aspect of the treatment plan, at least one of characteristics of the user, treatment measurement information pertaining to the user while the user uses the treatment device, performance measurement information pertaining to the use of the treatment device by the user, and characteristics of the treatment device; receive user related data (URD) pertaining to the user; generate, using at least one aspect of the treatment data and at least one aspect of the URD, delta information pertaining to the user, the delta information indicating at least a difference between the at least one aspect of the treatment data and the at least one aspect of the URD; and perform, in response to receiving treatment analysis output indicating at least one treatment action, the at least one treatment action indicated by the treatment analysis output, the at least one treatment action being associated with a condition of the user.

Clause 87. The system of any clause herein, wherein the at least one treatment action includes modifying at least one aspect of the treatment plan.

Clause 88. The system of any clause herein, wherein the at least one treatment action includes controlling, while the user uses the treatment device, at least one aspect of the treatment device.

Clause 89. The system of any clause herein, wherein the at least one treatment action includes generating, based on the treatment analysis output, a notification.

Clause 90. The system of any clause herein, wherein the at least one treatment action further includes transmitting, to at least one of the user and an agent of the user, the notification.

Clause 91. The system of any clause herein, wherein the notification includes at least an indication of the condition associated with the user.

Clause 92. The system of any clause herein, wherein the notification comprises an aspect that includes sound.

Clause 93. The system of any clause herein, wherein the notification comprises an aspect that includes a visual display or projection.

Clause 94. The system of any clause herein, wherein the at least one condition associated with the user includes at least one of an active orthopedic condition, an incipient orthopedic condition, an active non-orthopedic condition, an incipient non-orthopedic condition, a condition related to an infection, a cardiac-related condition, a neurological-related condition, a condition related to one or more physiological structures in the human body, and a condition related to one or more anatomical structures in the human body.

Clause 95. The system of any clause herein, wherein, during a telemedicine session, the user uses the treatment device.

Clause 96. The system of any clause herein, wherein the treatment measurement information includes, while the user uses the treatment device, at least one of a vital sign of the user, a respiration rate of the user, a heart rate of the user, a temperature of the user, and a blood pressure of the user.

Clause 97. The system of any clause herein, wherein the performance measurement information includes at least one of a pedal pressure measurement of a first pedal of the treatment device, a pedal rotational angle of the first pedal of the treatment device for a respective pedal pressure measurement, a pedal pressure measurement of a second pedal of the treatment device, and a pedal rotational angle of the second pedal of the treatment device for a respective pedal pressure measurement.

Clause 98. The system of any clause herein, wherein at least some of the treatment data corresponds to at least some of the sensor data from a sensor associated with the treatment device.

Clause 99. The system of any clause herein, wherein at least some of the treatment data corresponds to at least some of the sensor data from a sensor associated with a wearable device worn by the user while the user uses the treatment device.

Clause 100. A method for protecting healthcare information associated with an individual, the method comprising: receiving at least a first electronic medical record associated with the individual; generating a patient identifier associated with the individual; generating, using the patient identifier and at least a portion of the first electronic medical record, at least one protected electronic medical record corresponding to the first electronic medical record, wherein the patient identifier is associated with at least one characteristic of the individual; and providing, at least at a healthcare provider interface, at least one of the patient identifier and at least a portion of the first electronic medical record.

Clause 101. The method of any clause herein, wherein at least a portion of the first electronic medical record is in plaintext and at least a portion of the first electronic medical record in plaintext is further protected by one or more privacy enhancing technologies.

Clause 102. The method of any clause herein, wherein the at least one protected electronic medical record is associated with at least the portion of the first electronic medical record in plaintext.

Clause 103. The method of any clause herein, wherein the at least one protected electronic medical record is configured to be used in place of at least the portion of the first electronic medical record in plaintext.

Clause 104. The method of any clause herein, wherein the one or more privacy enhancing technologies is configured to support aspects of at least one of health insurance portability and accountability act requirements, Gramm-Leach-Bliley act requirements, and general data protection regulation requirements.

Clause 105. The method of any clause herein, further comprising providing, at least at the healthcare provider interface during a telemedicine session, the at least one of the patient identifier and at least the portion of the first electronic medical record.

Clause 106. The method of any clause herein, further comprising identifying, based on at least one healthcare service indicated by the individual, a healthcare provider associated with providing the at least one healthcare service.

Clause 107. The method of any clause herein, wherein the at least one healthcare service includes at least one of erectile dysfunction, sexual transmitted disease test results or diagnoses, hemorrhoids, ulcerative colitis, irritable bowel syndrome or disorder, Crohn's disease, diseases or conditions related to the genitourinary systems of males, female or other genders, gender reassignment surgery or medications and hormones prescribed and associated therewith, neurodegenerative diseases, and cancer diagnoses, treatments or conditions.

Clause 108. The method of any clause herein, wherein the at least one healthcare service includes one or more orthopedic condition.

Clause 109. The method of any clause herein, further comprising identifying, based on at least one of the at least one healthcare service and the identified healthcare provider, relevant information of the first electronic medical record.

Clause 110. The method of any clause herein, wherein the relevant information corresponds to the at least the portion of the first electronic medical record used to generate the at least one protected electronic medical record.

Clause 111. The method of any clause herein, further comprising receiving input, from the individual, indicating a selected portion of the first electronic medical record.

Clause 112. The method of any clause herein, further comprising generating, using the input indicating the selected portion of the electronic medical record, at least one other protected medical record.

Clause 113. The method of any clause herein, further comprising providing, at least at the healthcare provider interface, at least a portion of the at least one other protected electronic medical record.

Clause 114. The method of any clause herein, further comprising providing, at least at the healthcare provider interface during a telemedicine session, at least a portion of the at least one other protected electronic medical record.

Clause 115. A tangible, non-transitory computer-readable medium storing instructions that, when executed, cause a processing device to: receive at least a first electronic medical record associated with an individual; generate a patient identifier associated with the individual; generate, using the patient identifier and at least a portion of the first electronic medical record, at least one protected electronic medical record corresponding to the first electronic medical record, wherein the patient identifier is associated with at least one characteristic of the individual; and provide, at least at a healthcare provider interface, at least one of the patient identifier and at least a portion of the first electronic medical record.

Clause 116. The computer-readable medium of any clause herein, wherein at least a portion of the first electronic medical record is in plaintext and at least a portion of the first electronic medical record in plaintext is further protected by one or more privacy enhancing technologies.

Clause 117. The computer-readable medium of any clause herein, wherein the at least one protected electronic medical record is associated with at least the portion of the first electronic medical record in plaintext.

Clause 118. The computer-readable medium of any clause herein, wherein the at least one protected electronic medical record is configured to be used in place of at least the portion of the first electronic medical record in plaintext.

Clause 119. The computer-readable medium of any clause herein, wherein the one or more privacy enhancing technologies is configured to support aspects of at least one of health insurance portability and accountability act requirements, Gramm-Leach-Bliley act requirements, and general data protection regulation requirements.

Clause 120. The computer-readable medium of any clause herein, wherein the instructions further cause the processor to provide, at least at the healthcare provider interface during a telemedicine session, the at least one of the patient identifier and at least the portion of the first electronic medical record.

Clause 121. The computer-readable medium of any clause herein, wherein the instructions further cause the processor to identify, based on at least one healthcare service indicated by the individual, a healthcare provider associated with providing the at least one healthcare service.

Clause 122. The computer-readable medium of any clause herein, wherein the at least one healthcare service includes at least one of erectile dysfunction, sexual transmitted disease test results or diagnoses, hemorrhoids, ulcerative colitis, irritable bowel syndrome or disorder, Crohn's disease, diseases or conditions related to the genitourinary systems of males, female or other genders, gender reassignment surgery or medications and hormones prescribed and associated therewith, neurodegenerative diseases, and cancer diagnoses, treatments or conditions.

Clause 123. The computer-readable medium of any clause herein, wherein the at least one healthcare service includes one or more orthopedic condition.

Clause 124. The computer-readable medium of any clause herein, wherein the instructions further cause the processor to identify, based on at least one of the at least one healthcare service and the identified healthcare provider, relevant information of the first electronic medical record.

Clause 125. The computer-readable medium of any clause herein, wherein the relevant information corresponds to the at least the portion of the first electronic medical record used to generate the at least one protected electronic medical record.

Clause 126. The computer-readable medium of any clause herein, wherein the instructions further cause the processor to receive input, from the individual, indicating a selected portion of the first electronic medical record.

Clause 127. The computer-readable medium of any clause herein, wherein the instructions further cause the processor to generate, using the input indicating the selected portion of the electronic medical record, at least one other protected medical record.

Clause 128. The computer-readable medium of any clause herein, wherein the instructions further cause the processor to provide, at least at the healthcare provider interface, at least a portion of the at least one other protected electronic medical record.

Clause 129. The computer-readable medium of any clause herein, wherein the instructions further cause the processor to provide, at least at the healthcare provider interface during a telemedicine session, at least a portion of the at least one other protected electronic medical record.

Clause 130. A system comprising: a processing device; and a memory including instructions that, when executed by the processor, cause the processor to: receive at least a first electronic medical record associated with an individual; generate a patient identifier associated with the individual; generate, using the patient identifier and at least a portion of the first electronic medical record, at least one protected electronic medical record corresponding to the first electronic medical record, wherein the patient identifier is associated with at least one characteristic of the individual; and provide, at least at a healthcare provider interface, at least one of the patient identifier and at least a portion of the first electronic medical record.

Clause 131. The system of any clause herein, wherein at least a portion of the first electronic medical record is in plaintext and at least a portion of the first electronic medical record in plaintext is further protected by one or more privacy enhancing technologies.

Clause 132. The system of any clause herein, wherein the at least one protected electronic medical record is associated with at least the portion of the first electronic medical record in plaintext.

Clause 133. The system of any clause herein, wherein the at least one protected electronic medical record is configured to be used in place of at least the portion of the first electronic medical record in plaintext.

Clause 134. The system of any clause herein, wherein the one or more privacy enhancing technologies is configured to support aspects of at least one of health insurance portability and accountability act requirements, Gramm-Leach-Bliley act requirements, and general data protection regulation requirements.

Clause 135. The system of any clause herein, wherein the instructions further cause the processor to provide, at least at the healthcare provider interface during a telemedicine session, the at least one of the patient identifier and at least the portion of the first electronic medical record.

Clause 136. The system of any clause herein, wherein the instructions further cause the processor to identify, based on at least one healthcare service indicated by the individual, a healthcare provider associated with providing the at least one healthcare service.

Clause 137. The system of any clause herein, wherein the at least one healthcare service includes at least one of erectile dysfunction, sexual transmitted disease test results or diagnoses, hemorrhoids, ulcerative colitis, irritable bowel syndrome or disorder, Crohn's disease, diseases or conditions related to the genitourinary systems of males, female or other genders, gender reassignment surgery or medications and hormones prescribed and associated therewith, neurodegenerative diseases, and cancer diagnoses, treatments or conditions.

Clause 138. The system of any clause herein, wherein the at least one healthcare service includes one or more orthopedic condition.

Clause 139. The system of any clause herein, wherein the instructions further cause the processor to identify, based on at least one of the at least one healthcare service and the identified healthcare provider, relevant information of the first electronic medical record.

Clause 140. The system of any clause herein, wherein the relevant information corresponds to the at least the portion of the first electronic medical record used to generate the at least one protected electronic medical record.

Clause 141. The system of any clause herein, wherein the instructions further cause the processor to receive input, from the individual, indicating a selected portion of the first electronic medical record.

Clause 142. The system of any clause herein, wherein the instructions further cause the processor to generate, using the input indicating the selected portion of the electronic medical record, at least one other protected medical record.

Clause 143. The system of any clause herein, wherein the instructions further cause the processor to provide, at least at the healthcare provider interface, at least a portion of the at least one other protected electronic medical record.

Clause 144. The system of any clause herein, wherein the instructions further cause the processor to provide, at least at the healthcare provider interface during a telemedicine session, at least a portion of the at least one other protected electronic medical record.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

The various aspects, embodiments, implementations, or features of the described embodiments can be used separately or in any combination. The embodiments disclosed herein are modular in nature and can be used in conjunction with or coupled to other embodiments.

Consistent with the above disclosure, the examples of assemblies enumerated in the following clauses are specifically contemplated and are intended as a non-limiting set of examples.

What is claimed is:

1. A method comprising:
receiving treatment data pertaining to a user capable of using a treatment device to perform a treatment plan, wherein the treatment device comprises at least one rotating pedal, and further wherein the treatment data comprises at least one aspect of the treatment plan, at least one of characteristics of the user, treatment measurement information pertaining to the user while the user uses the treatment device, performance measurement information pertaining to the use of the treatment device by the user, and characteristics of the treatment device;
receiving user related data (URD) pertaining to the user;
generating, using at least one aspect of the treatment data and at least one aspect of the URD, delta information pertaining to the user, the delta information indicating at least a difference between the at least one aspect of the treatment data and the at least one aspect of the URD; and
performing, in response to receiving treatment analysis output indicating at least one treatment action, the at least one treatment action indicated by the treatment analysis output, the at least one treatment action being associated with a condition of the user.

2. The method of claim 1, wherein the at least one treatment action includes modifying at least one aspect of the treatment plan.

3. The method of claim 1, wherein the at least one treatment action includes controlling, while the user uses the treatment device, at least one aspect of the treatment device.

4. The method of claim 1, wherein the at least one treatment action includes generating, based on the treatment analysis output, a notification.

5. The method claim 4, wherein the at least one treatment action further includes transmitting, to at least one of the user and an agent of the user, the notification.

6. The method of claim 4, wherein the notification includes at least an indication of the condition associated with the user.

7. The method of claim 4, wherein the notification comprises an aspect that includes sound.

8. The method of claim 4, wherein the notification comprises an aspect that includes a visual display or projection.

9. The method of claim 1, wherein the at least one condition associated with the user includes at least one of an active orthopedic condition, an incipient orthopedic condition, an active non-orthopedic condition, an incipient non-orthopedic condition, a condition related to an infection, a cardiac-related condition, a neurological-related condition, a condition related to one or more physiological structures in the human body, and a condition related to one or more anatomical structures in the human body.

10. The method of claim 1, wherein, during a telemedicine session, the user uses the treatment device.

11. The method of claim 1, wherein the treatment measurement information includes, while the user uses the treatment device, at least one of a vital sign of the user, a respiration rate of the user, a heartrate of the user, a temperature of the user, a blood pressure of the user, an SpO2-measurement of the blood oxygen level of the user, a glucose level of the user, and microbiome related data pertaining to the user.

12. The method of claim 1, wherein the performance measurement information includes at least one of a pedal pressure measurement of a first pedal of the treatment device, a pedal rotational angle of the first pedal of the treatment device for a respective pedal pressure measurement, a pedal pressure measurement of a second pedal of the treatment device, and a pedal rotational angle of the second pedal of the treatment device for a respective pedal pressure measurement.

13. The method of claim 1, wherein at least some of the treatment data corresponds to at least some of the sensor data from a sensor associated with the treatment device.

14. The method of claim 1, wherein at least some of the treatment data corresponds to at least some of the sensor data from a sensor associated with a wearable device worn by the user while the user uses the treatment device.

15. A tangible, non-transitory computer-readable medium storing instructions that, when executed, cause a processing device to:
receive treatment data pertaining to a user capable of using a treatment device to perform a treatment plan, wherein the treatment device comprises at least one rotating pedal, and further wherein the treatment data comprises at least one aspect of the treatment plan, at least one of characteristics of the user, treatment measurement information pertaining to the user while the user uses the treatment device, performance measurement information pertaining to the use of the treatment device by the user, and characteristics of the treatment device;

receive user related data (URD) pertaining to the user;

generate, using at least one aspect of the treatment data and at least one aspect of the URD, delta information pertaining to the user, the delta information indicating at least a difference between the at least one aspect of the treatment data and the at least one aspect of the URD; and perform, in response to receiving treatment analysis output indicating at least one treatment action, the at least one treatment action indicated by the treatment analysis output, the at least one treatment action being associated with a condition of the user.

16. The computer-readable medium of claim 15, wherein the at least one treatment action includes modifying at least one aspect of the treatment plan.

17. The computer-readable medium of claim 15, wherein the at least one treatment action includes controlling, while the user uses the treatment device, at least one aspect of the treatment device.

18. The computer-readable medium of claim 15, wherein the at least one treatment action includes generating, based on the treatment analysis output, a notification.

19. The computer-readable medium of claim 18, wherein the at least one treatment action further includes transmitting, to at least one of the user and an agent of the user, the notification.

20. A system comprising:
a processor; and
a memory including instructions that, when executed by the processor, cause the processor to:
  receive treatment data pertaining to a user capable of using a treatment device to perform a treatment plan, wherein the treatment device comprises at least one rotating pedal, and further wherein the treatment data comprises at least one aspect of the treatment plan, at least one of characteristics of the user, treatment measurement information pertaining to the user while the user uses the treatment device, performance measurement information pertaining to the use of the treatment device by the user, and characteristics of the treatment device;
  receive user related data (URD) pertaining to the user;
  generate, using at least one aspect of the treatment data and at least one aspect of the URD, delta information pertaining to the user, the delta information indicating at least a difference between the at least one aspect of the treatment data and the at least one aspect of the URD; and
perform, in response to receiving treatment analysis output indicating at least one treatment action, the at least one treatment action indicated by the treatment analysis output, the at least one treatment action being associated with a condition of the user.

* * * * *